United States Patent
de Jong

(10) Patent No.: US 7,415,618 B2
(45) Date of Patent: Aug. 19, 2008

(54) PERMUTATION OF OPCODE VALUES FOR APPLICATION PROGRAM OBFUSCATION

(75) Inventor: Eduard K. de Jong, Bristol (GB)

(73) Assignee: Sun Microsystems, Inc., Santa Clara, CA (US)

(*) Notice: Subject to any disclaimer, the term of this patent is extended or adjusted under 35 U.S.C. 154(b) by 715 days.

(21) Appl. No.: 10/672,700

(22) Filed: Sep. 25, 2003

(65) Prior Publication Data

US 2005/0071655 A1   Mar. 31, 2005

(51) Int. Cl.
G06F 11/30 (2006.01)
H04L 9/32 (2006.01)
G06F 7/00 (2006.01)

(52) U.S. Cl. .................. 713/190; 726/26; 707/101; 717/127; 713/194; 711/163; 711/164

(58) Field of Classification Search .................. 713/189, 713/190; 726/26; 711/163–164
See application file for complete search history.

(56) References Cited

U.S. PATENT DOCUMENTS

| 4,434,436 | A |  | 2/1984 | Kleykamp et al. .......... 380/209 |
| 5,057,997 | A |  | 10/1991 | Chang et al. |
| 5,136,705 | A |  | 8/1992 | Stubbs et al. |
| 5,367,687 | A |  | 11/1994 | Tarsy et al. |
| 5,463,746 | A |  | 10/1995 | Brodnax et al. |
| 5,524,256 | A |  | 6/1996 | Turkowski |
| 5,636,352 | A |  | 6/1997 | Bealkowski et al. |
| 5,659,754 | A |  | 8/1997 | Grove et al. |
| 5,819,117 | A |  | 10/1998 | Hansen |
| 5,828,853 | A |  | 10/1998 | Regal |
| 5,887,161 | A |  | 3/1999 | Cheong et al. |
| 5,905,876 | A |  | 5/1999 | Pawlowski et al. |
| 5,913,064 | A |  | 6/1999 | Chen .......................... 717/108 |
| 5,968,164 | A |  | 10/1999 | Loen et al. |
| 5,999,732 | A |  | 12/1999 | Bak et al. |
| 6,006,328 | A | * | 12/1999 | Drake .......................... 726/23 |

(Continued)

FOREIGN PATENT DOCUMENTS

EP    0 605 872 A1   12/1993

(Continued)

OTHER PUBLICATIONS

Chi-Keung Luk et al., "*Compiler-Based Prefetching for Recursive Data Structures*", Department of Computer Science, 1996, pp. 222-233.

(Continued)

Primary Examiner—Klmyen Vu
Assistant Examiner—April Y Shan
(74) Attorney, Agent, or Firm—Gunnison, McKay & Hodgson, L.L.P.; Forrest Gunnison

(57) ABSTRACT

Obfuscating an application program comprises reading an application program comprising code, transforming the application program code into transformed application program code that uses one of multiple opcode value encoding schemes of a dispatch table associated with the application program, and sending the transformed application program code. Executing an obfuscated application program comprises receiving an obfuscated application program comprising at least one instruction opcode value encoded using one of multiple instruction set opcode value encoding schemes, determining a dispatch table associated with the application program, and executing the application program using the associated dispatch table. The dispatch table corresponds to the one of multiple instruction set opcode value encoding schemes.

28 Claims, 39 Drawing Sheets

U.S. PATENT DOCUMENTS

| | | | |
|---|---|---|---|
| 6,081,665 A | 6/2000 | Nilsen et al. | |
| 6,098,056 A | 8/2000 | Rusnak et al. | 705/75 |
| 6,101,606 A | 8/2000 | Diersch et al. | 726/27 |
| 6,175,925 B1 | 1/2001 | Nardone et al. | 726/22 |
| 6,178,509 B1 | 1/2001 | Nardone et al. | 726/22 |
| 6,205,550 B1 | 3/2001 | Nardone et al. | 726/22 |
| 6,266,416 B1 | 7/2001 | Sigbjørnsen et al. | 380/255 |
| 6,272,616 B1 | 8/2001 | Fernando et al. | 712/20 |
| 6,289,455 B1 | 9/2001 | Kocher et al. | 713/194 |
| 6,308,256 B1 | 10/2001 | Folmsbee | 712/209 |
| 6,334,189 B1 | 12/2001 | Granger et al. | 726/26 |
| 6,374,402 B1 | 4/2002 | Schmeidler et al. | 717/167 |
| 6,449,721 B1 | 9/2002 | Pensak et al. | 713/194 |
| 6,480,959 B1 | 11/2002 | Granger et al. | 713/189 |
| 6,594,761 B1 | 7/2003 | Chow et al. | 713/190 |
| 6,598,166 B1 | 7/2003 | Folmsbee | 713/190 |
| 6,609,201 B1 | 8/2003 | Folmsbee | 713/187 |
| 6,615,350 B1 | 9/2003 | Schell et al. | 713/168 |
| 6,640,305 B2 | 10/2003 | Kocher et al. | 713/194 |
| 6,643,775 B1 | 11/2003 | Granger et al. | 713/190 |
| 6,665,796 B1 | 12/2003 | Folmsbee | 713/190 |
| 6,668,325 B1 | 12/2003 | Collberg et al. | 713/194 |
| 6,675,298 B1 | 1/2004 | Folmsbee | 713/190 |
| 6,694,435 B2 * | 2/2004 | Kiddy | 713/189 |
| 6,757,831 B1 | 6/2004 | Folmsbee | 713/190 |
| 6,779,114 B1 | 8/2004 | Chow et al. | 713/189 |
| 6,789,177 B2 | 9/2004 | Okada | 711/164 |
| 6,842,862 B2 | 1/2005 | Chow et al. | 713/190 |
| 6,862,683 B1 | 3/2005 | Wille et al. | 713/151 |
| 6,871,298 B1 | 3/2005 | Cavanaugh et al. | 714/33 |
| 6,966,002 B1 | 11/2005 | Torrubia-Saez | 726/29 |
| 6,981,217 B1 | 12/2005 | Knauft et al. | 715/531 |
| 7,017,188 B1 | 3/2006 | Schmeidler et al. | 726/26 |
| 7,054,443 B1 | 5/2006 | Jakubowski et al. | 380/28 |
| 7,065,652 B1 | 6/2006 | Xu et al. | 713/190 |
| 7,073,713 B2 | 7/2006 | Silverbrook et al. | 235/462.01 |
| 7,080,039 B1 | 7/2006 | Marsh | 705/51 |
| 7,089,594 B2 | 8/2006 | Lal et al. | 726/31 |
| 7,124,445 B2 | 10/2006 | Cronce et al. | 726/26 |
| 7,127,712 B1 | 10/2006 | Noble et al. | 717/173 |
| 7,150,008 B2 | 12/2006 | Naumovich et al. | 717/108 |
| 7,170,999 B1 | 1/2007 | Kessler et al. | 380/277 |
| 7,193,482 B2 | 3/2007 | Silverbrook | 331/78 |
| 7,201,319 B2 | 4/2007 | Silverbrook et al. | 235/454 |
| 2002/0120854 A1 | 8/2002 | LeVine et al. | 713/189 |
| 2002/0184618 A1 | 12/2002 | Bala et al. | 717/148 |
| 2003/0093685 A1 | 5/2003 | Tobin | 713/190 |
| 2003/0123664 A1 | 7/2003 | Pedlow et al. | 380/218 |
| 2003/0172270 A1 | 9/2003 | Newcombe et al. | 713/168 |
| 2003/0177391 A1 | 9/2003 | Ofek et al. | 726/4 |
| 2003/0188187 A1 | 10/2003 | Uchida | 726/26 |
| 2003/0191938 A1 | 10/2003 | Woods et al. | 713/165 |
| 2003/0233542 A1 | 12/2003 | Benaloh | 713/156 |
| 2004/0003264 A1 * | 1/2004 | Zeman et al. | 713/190 |
| 2004/0003278 A1 | 1/2004 | Chen et al. | 726/21 |
| 2004/0039932 A1 | 2/2004 | Elazar et al. | 726/26 |
| 2004/0103404 A1 | 5/2004 | Naumovich et al. | 717/136 |
| 2004/0151306 A1 | 8/2004 | Kiddy | 380/28 |
| 2004/0260933 A1 | 12/2004 | Lee | 713/193 |
| 2005/0002053 A1 | 1/2005 | Meador et al. | 358/1.14 |
| 2005/0015454 A1 | 1/2005 | Goodman et al. | 709/207 |
| 2005/0021995 A1 | 1/2005 | Lal et al. | 726/4 |
| 2005/0044359 A1 | 2/2005 | Eriksson et al. | 713/165 |
| 2005/0055564 A1 | 3/2005 | Haselden et al. | 726/26 |
| 2005/0102264 A1 | 5/2005 | Nason et al. | 707/1 |
| 2006/0026430 A1 | 2/2006 | Luo | 713/176 |
| 2006/0048228 A1 | 3/2006 | Takemori et al. | 726/22 |
| 2006/0218539 A1 | 9/2006 | Stiemens et al. | 717/140 |
| 2006/0271921 A1 | 11/2006 | Cronce et al. | 717/151 |

FOREIGN PATENT DOCUMENTS

| | | |
|---|---|---|
| EP | 0 751 458 A1 | 5/1996 |
| EP | 0 821 305 A2 | 7/1997 |
| EP | 1 063 585 A2 | 6/2000 |
| WO | WO 97/45817 | 12/1997 |
| WO | WO 98/59292 | 12/1998 |
| WO | WO 99/08188 | 2/1999 |
| WO | WO 99/08191 | 2/1999 |
| WO | WO 00/75760 | 12/2000 |
| WO | WO 01/79972 | 10/2001 |
| WO | WO 02/079955 | 10/2002 |
| WO | WO 2004/027678 | 4/2004 |

OTHER PUBLICATIONS

Borislav Deianov, "*Authentication—Lamport hash and biometrics*", printed from http://www.cs.cornell.edu/html/cs513-sp99/NL12.html, Mar. 4, 1999, pp. 1-3.

Oded Goldreich, "*The Foundations of Modern Cryptography*", Version Nr. 3.1, Department of Computer Science and Applied Mathematics, May 2, 1998, pp. 0-41.

Moni Naor et al., "*Universal One-Way Hash Functions and their Cryptographic Applications*", Mar. 13, 1995, pp. 1-14.

George C. Necula et al., "*Proof-Carrying Code*", School of Computer Science, Nov. 1996, pp. 1-60.

R. Rivest, "*The MD4 Message Digest Algorithm*", Request for Comments (RFC) 1320, MIT Laboratory for Computer Science and RSA Data Security , Inc., Apr. 1992, pp. 1-20.

R. Rivest, "*The MD5 Message-Digest Algorithm*", Request for Comments (RFC) 1321 MIT Laboratory for Computer Science and RSA Data Security, Inc., Apr. 1992.

"*Secure Hash Standard*", Federal Information Processing Standard Publication 180-1, Apr. 17, 1995.

"*Smart Card Stage I Description*", Version 1.1, CDMA Development Group—Smart Card Team Document, May 22, 1996.

"*Digital Cellular Telecommunications Systems (Phase 2+); AT Command Set for GSM Mobile Equipment (ME)*", ETSI TS 100 916 V7.4.0, 1998.

"*Wireless Identity Module Pert: Security*" Version 12, Wireless Application Protocol WAP-260-WIM-20010712-a, Jul. 2001.

"*3rd Generation Partnership Project; Technical Specification Group Terminals; USIM and IC Card Requirements (Release 4)*", 3GPP TS 21.111 V4.0.0, 2001.

"*3rd Generation Partnership Project 2: Removable User Identity Module for Spread Spectum Systems*" 3GPP2 C.S0023-A, Version 1.0, Sep. 13, 2002, pp. 1-1-5-2, A1-A4.

Dean, Jeffrey, "*ProfileMe: Hardware Support for Instruction-Level Profiling on Out-of-Order Processors*", IEEE 1072-4451/97(SUN-P4929).

Collberg et al., "Breaking Abstractions and Unstructuring Data Structures", IEEE 2005, pp. 1-12 [Online]. Retrieved on Sep. 13, 2005 from the Internet: URL:<http://ieeexplore.ieee.org/xpl/absprintf.jsp?arnumber=674154>.

Collberg et al., "A Taxonomy of Obfuscating Transformations", 1997, pp. 1-36.

Mambo et al., "A Tentative Approach to Constructing Tamper-Resistant Software", ACM 1998, pp. 23-33.

Low, "Protecting Java Code via Code Obfuscation", pp. 1-5 [online]. Retrieved on May 12, 2007 from the Internet: <URL:http//www.acm.org/crossroads/xrds4-3/codeob.html>.

Collberg et al., "Software Watermarking: Models and Dynamic Embeddings", ACM, 1999, pp. 311-324.

* cited by examiner

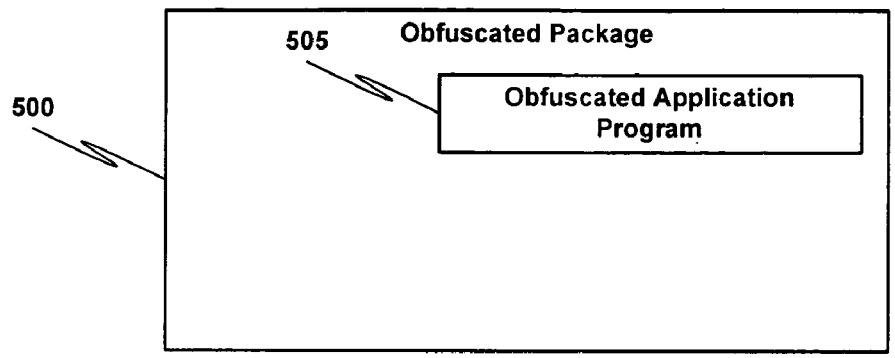
FIG. 5A
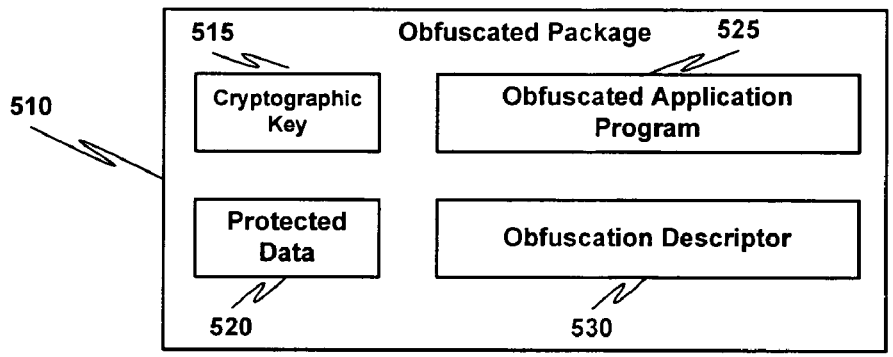
FIG. 5B
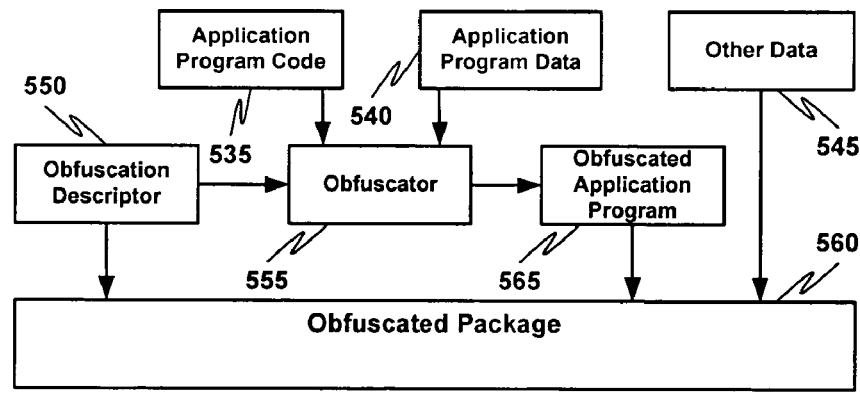
FIG. 5C
FIG. 5

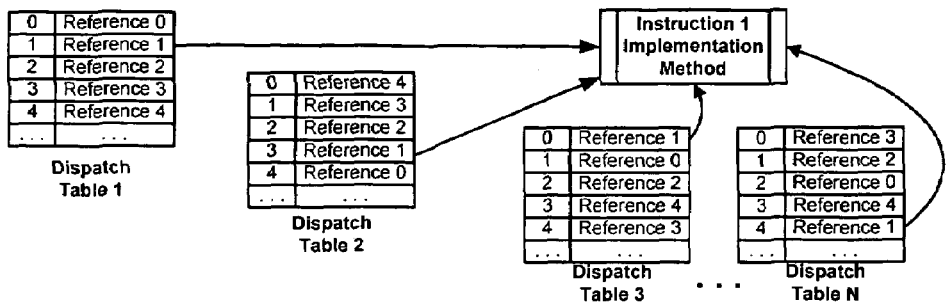
FIG. 6A
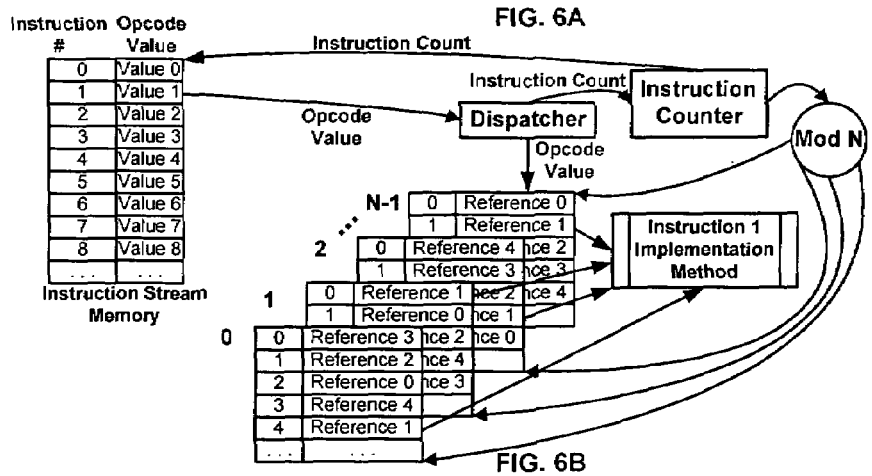
FIG. 6B
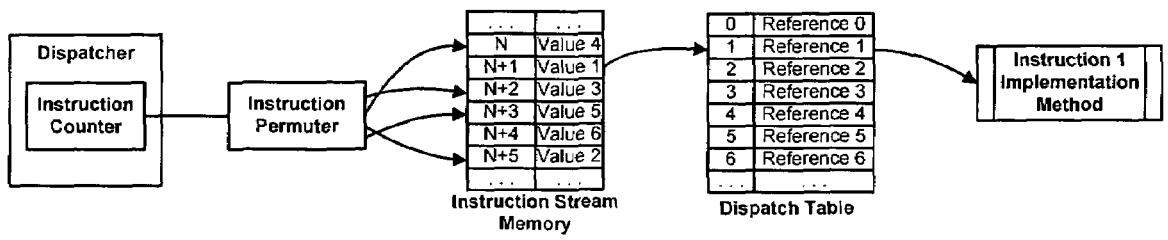
FIG. 6C
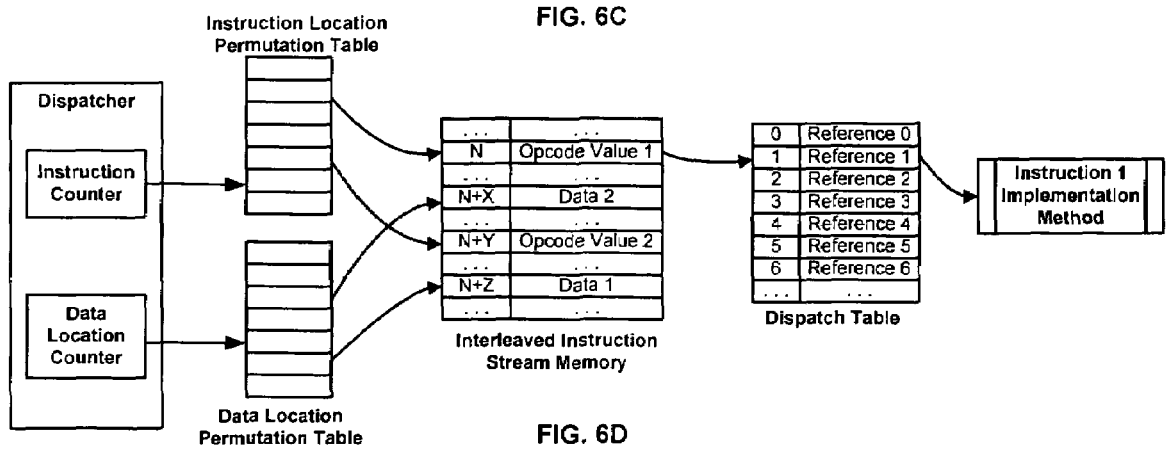
FIG. 6D
FIG. 6

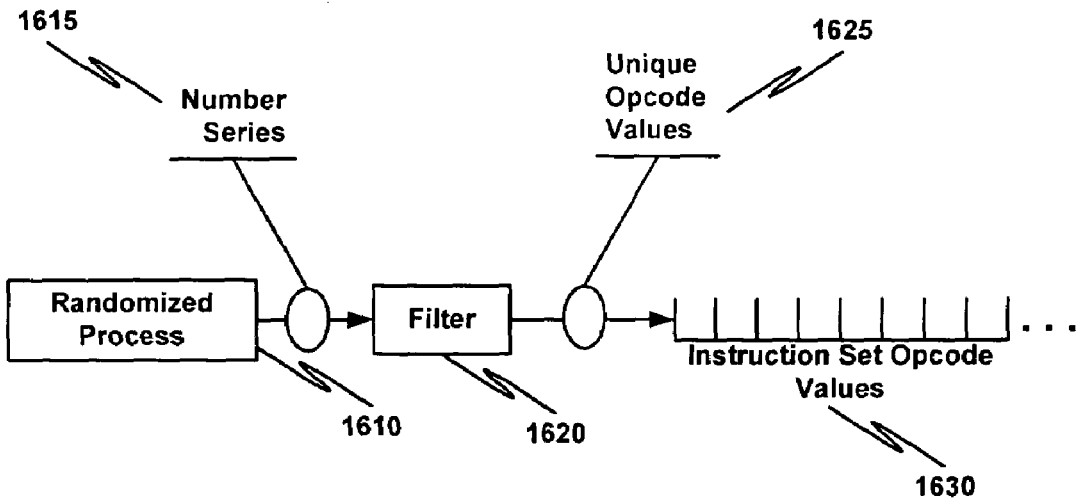
FIG. 16A
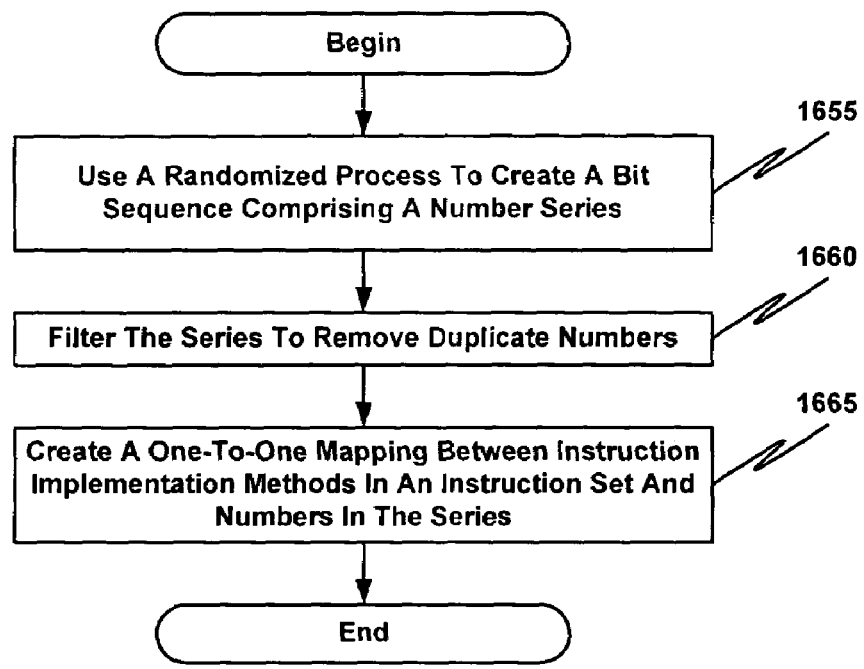
FIG. 16B
FIG. 16

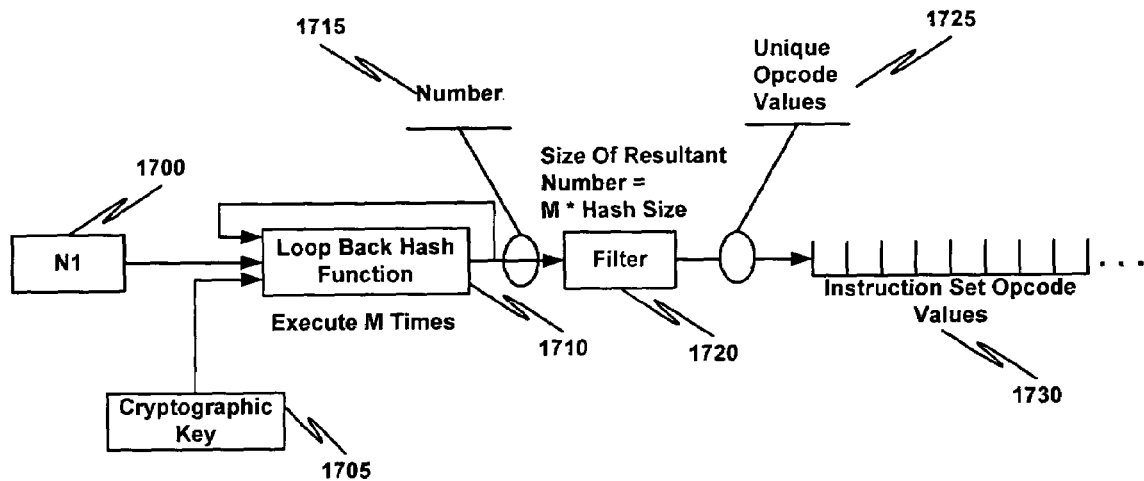
FIG. 17A
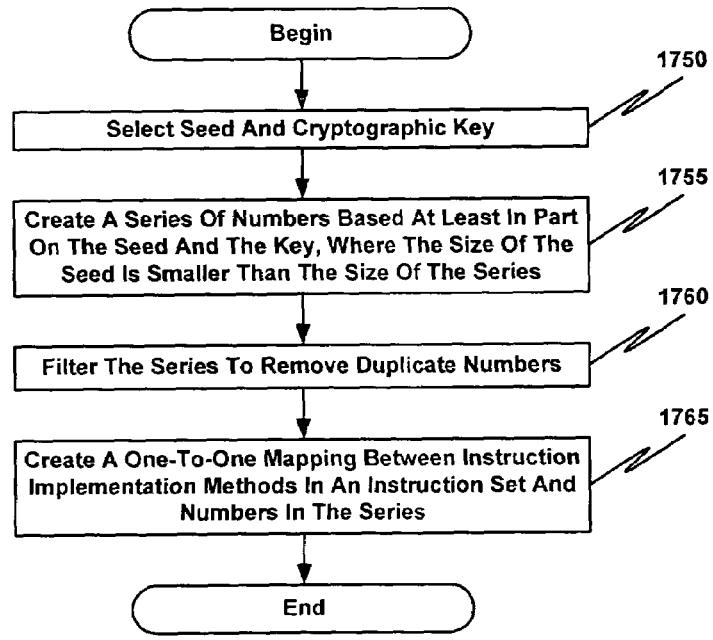
FIG. 17B
FIG. 17

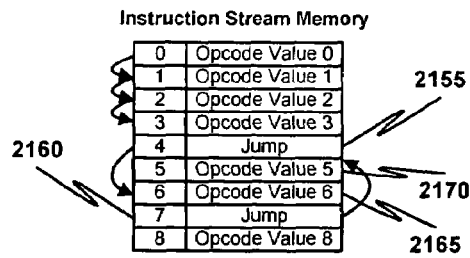
FIG. 21A
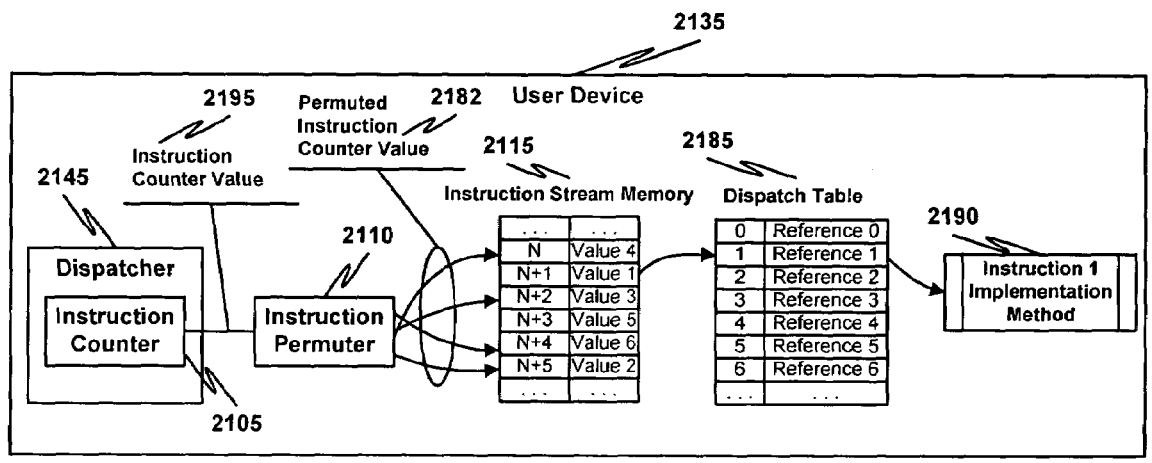
FIG. 21B
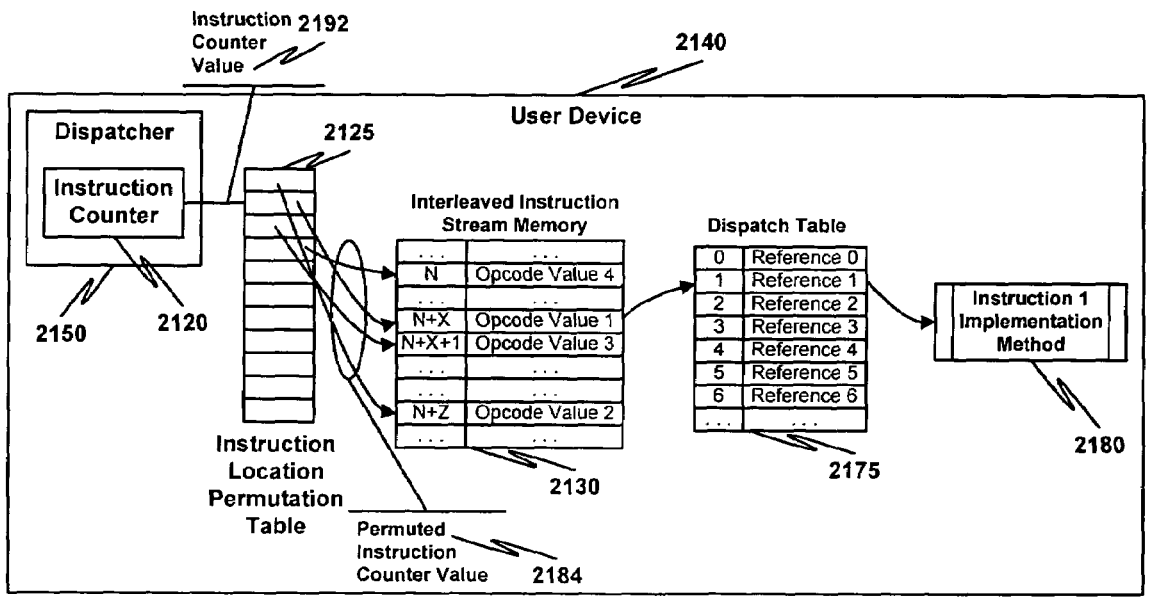
FIG. 21C
FIG. 21

PERMUTATION OF OPCODE VALUES FOR APPLICATION PROGRAM OBFUSCATION

CROSS REFERENCE TO RELATED APPLICATIONS

This application is related to the following:

U.S. patent application Ser. No. 10/672,698, filed Sep. 25, 2003 in the name of inventor Eduard K. de Jong, entitled "Application Program Obfuscation", commonly assigned herewith.

U.S. patent application Ser. No. 10/672,183, filed Sep. 25, 2003 in the name of inventor Eduard K. de Jong, entitled "Multiple Instruction Dispatch Tables for Application Program Obfuscation", commonly assigned herewith.

U.S. patent application Ser. No. 10/672,836, filed Sep. 25, 2003 in the name of inventor Eduard K. de Jong, entitled "Non-Linear Execution of Application Program Instructions for Application Program Obfuscation", commonly assigned herewith.

U.S. patent application Ser. No. 10/673,021, filed Sep. 25, 2003 in the name of inventor Eduard K. de Jong, entitled "Interleaved Data and Instruction Streams for Application Program Obfuscation", commonly assigned herewith.

U.S. patent application Ser. No. 10/672,184, filed Sep. 25, 2003 in the name of inventor Eduard K. de Jong, entitled "Rendering and Encryption Engine for Application Program Obfuscation", commonly assigned herewith.

FIELD OF THE INVENTION

The present invention relates to the field of computer science. More particularly, the present invention relates to a method and apparatus for permutation of opcode values ofr application program obfuscation.

BACKGROUND OF THE INVENTION

Digital content such as application programs and associated data are frequently communicated by service providers to user devices such as digital music players via a network. The user device executes the application programs to obtain a service. For example, the user of a digital music player may subscribe to a fee-based service that allows the user to download one or more digital recordings from a service provider to the user's digital music player. Unauthorized access to data communicated to such user devices, stored on the user devices, or both, may enable unauthorized use of a service, resulting in loss of revenues for the service provider. Such unauthorized access may also result in the disclosure of private user data.

One solution is to embed a cryptographic key in application program code sent to the user device. The application program code itself may also be encrypted with additional cryptographic keys. One-time code obfuscation and part wise decryption may also be applied to the application program code to make reverse engineering difficult. But if the application program code is stored on an unsecured device, it may be subject to long-lasting, extensive attempts to determine its secrets. This susceptibility reduces the effectiveness of the protection mechanisms.

FIG. 1 is a block diagram that illustrates a user device 120 comprising a processor configured to dispatch application program instructions based at least in part on an instruction set with a single opcode value encoding scheme. As shown in FIG. 1, a dispatcher 100 includes an instruction counter 125, an instruction executor 130, and an instruction fetcher 135. Instruction counter 125 maintains a reference to the next instruction to execute in an instruction stream 105 of an executable application program.

As shown in FIG. 1, instruction stream 105 is represented as a table of (instruction number 155, opcode value 160) pairs, where the instruction number 155 is an index into the instruction stream 105, and the corresponding opcode value 160, 140 is the opcode value stored at the location referenced by the instruction number 155. A single dispatch table 110 includes a reference 170 to the instruction implementation method 115 (the code that implements the instruction) for each opcode value 165 of instructions in an instruction set. Instruction fetcher 135 receives an opcode value 175 from instruction counter 125 and uses the opcode value 175 to obtain a reference to the corresponding instruction implementation method (150) from dispatch table 110. Instruction fetcher 135 determines the instruction implementation method to execute (150) by performing a table lockup in the dispatch table 110 based at least in part on the opcode value 145 of the instruction. Instruction executor 130 receives an instruction implementation method reference 150 from instruction fetcher 135 and executes the instruction implementation method. Unfortunately, the susceptibility of executable application programs 105 stored on unsecured devices means that an attacker knowing the instruction mapping used by the dispatch table 110 may obtain the executable application program 105. The executable application program 105 may then be executed on a user device controlled by the attacker, thus enabling unauthorized access to or use of a service.

Accordingly, a need exists in the art for a relatively secure way of protecting executable digital content communicated to an unsecured device. A further need exists for such a solution suitable for a resource-constrained device. Yet a further need exists for such a solution that requires relatively little overhead compared to typical public key cryptography systems.

SUMMARY OF THE INVENTION

Obfuscating an application program comprises reading an application program comprising code, transforming the application program code into transformed application program code that uses one of multiple opcode value encoding schemes of a dispatch table associated with the application program, and sending the transformed application program code. Executing an obfuscated application program comprises receiving an obfuscated application program comprising at least one instruction opcode value encoded using one of multiple instruction set opcode value encoding schemes, determining a dispatch table associated with the application program, and executing the application program using the associated dispatch table. The dispatch table corresponds to the one of multiple instruction set opcode value encoding schemes.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 5A is a block diagram that illustrates an obfuscated package data structure in accordance with one embodiment of the present invention.

FIG. 5B is a block diagram that illustrates an obfuscated package data structure in accordance with one embodiment of the present invention.

FIG. 5C is a block diagram that illustrates creating an obfuscated package in accordance with one embodiment of the present invention.

FIG. 6A is a high-level block diagram that illustrates execution of an application program obfuscated by transforming the application program into an application program having opcode values corresponding to one of multiple dispatch tables in accordance with one embodiment of the present invention.

FIG. 6B is a high-level block diagram that illustrates execution of an application program obfuscated by transforming the application program into an application program having opcode values encoded based at least in part on a instruction counter value in accordance with one embodiment of the present invention.

FIG. 6C is a high-level block diagram that illustrates nonlinear execution of an obfuscated application program in accordance with one embodiment of the present invention.

FIG. 6D is a high-level block diagram that illustrates nonlinear execution of an obfuscated application program having application program instructions interleaved with application program data in an instruction stream in accordance with one embodiment of the present invention.

FIG. 16A is a block diagram that illustrates generating a series of unique numbers for use as instruction set opcode values, using a randomized process in accordance with one embodiment of the present invention.

FIG. 16B is a flow diagram that illustrates a method for creating an instruction set opcode value encoding scheme, using a randomized process in accordance with one embodiment of the present invention.

FIG. 17A is a block diagram that illustrates generating a series of unique numbers for use as instruction set opcode values, using a loop back hash function in accordance with one embodiment of the present invention.

FIG. 17B is a flow diagram that illustrates a method for generating a series of unique numbers for use as instruction set opcode values, using a loop back hash function in accordance with one embodiment of the present invention.

FIG. 21A is a block diagram that illustrates a linear application program execution order.

FIG. 21B is a detailed block diagram that illustrates application program obfuscation by nonlinear application program execution order in accordance with one embodiment of the present invention.

FIG. 21C is a detailed block diagram that illustrates nonlinear execution of an obfuscated application program in accordance with one embodiment of the present invention.

DETAILED DESCRIPTION

Figure 1:
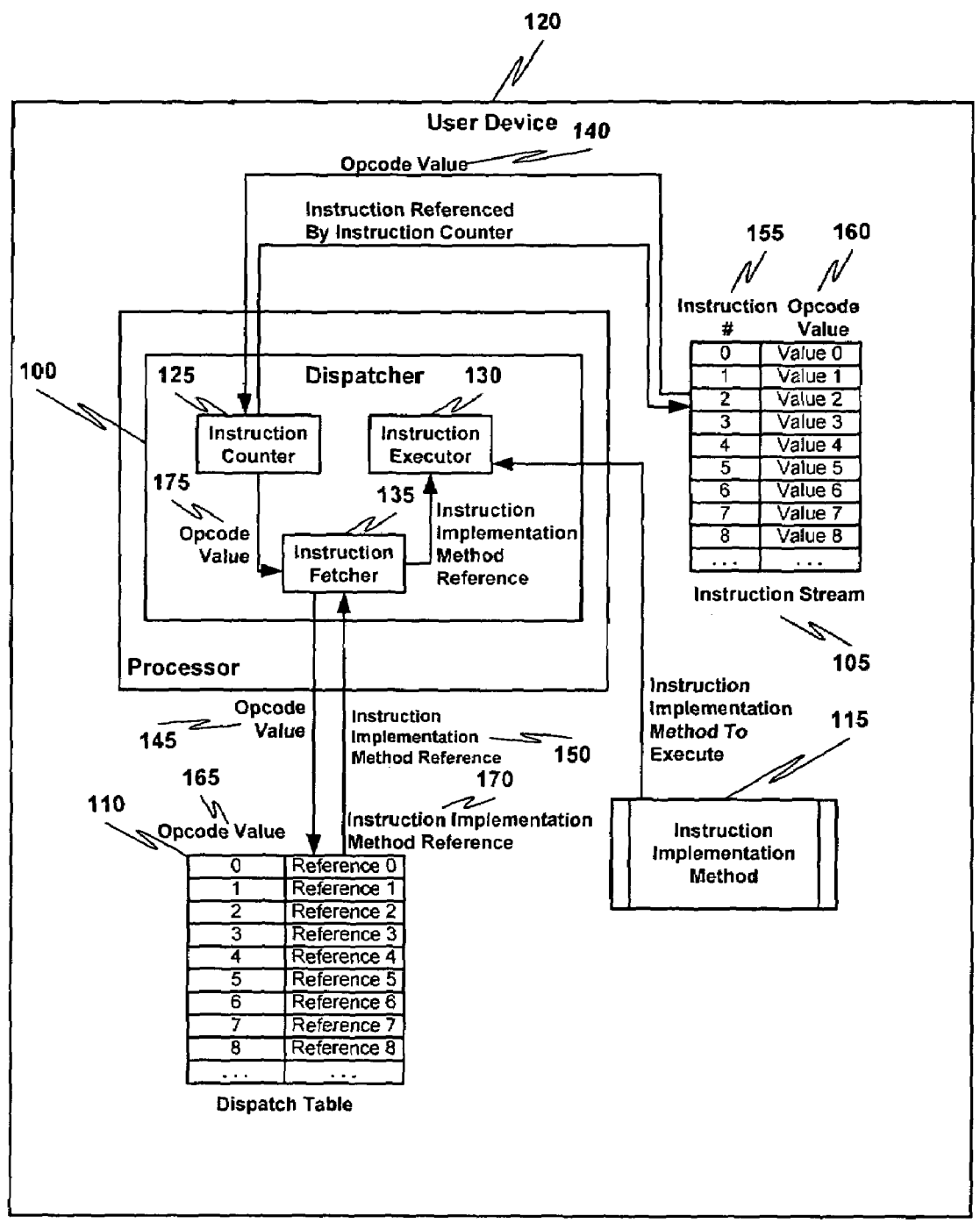
FIG. 1 is a block diagram that illustrates a user device comprising a processor configured to dispatch application program instructions based at least in part on an instruction set with a single opcode value encoding scheme.

Embodiments of the present invention are described herein in the context of a method and apparatus for permutation of opcode values for application program obfuscation. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer applications, computer languages, and/or general-purpose machines. The method can be run as an application programmed process running on processing circuitry. The processing circuitry can take the form of numerous combinations of processors and operating systems, or a stand-alone device. The process can be implemented as instructions executed by such hardware, hardware alone, or any combination thereof. The software may be stored on an application program storage device readable by a machine.

In addition, those of ordinary skill in the art will recognize that devices of a less general purpose nature, such as hardwired devices, field application programmable logic devices (FPLDs), including field application programmable gate arrays (FPGAs) and complex application programmable logic devices (CPLDs), application specific integrated circuits (ASICs), or the like, may also be used without departing from the scope and spirit of the inventive concepts disclosed herein.

In the context of the present invention, the term "network" includes local area networks, wide area networks, the Internet, cable television systems, telephone systems, wireless telecommunications systems, fiber optic networks, Asynchronous Transfer Mode (ATM) networks, frame relay networks, satellite communications systems, and the like. Such networks are well known in the art and consequently are not further described here.

In the context of the present invention, the term "unsecured device" is defined as a device protected by a relatively small amount of security measures, compared to trusted devices such as Java Card™ technology-enabled devices and the like. Java Card™ technology is described in Z. Chen, Java Card™ Technology for Smart Cards—Architecture and Application programmer's Guide, Boston, Addison-Wesley, (2000).

In the context of the present invention, the term "resource-constrained device" is defined as a device that is relatively restricted in memory, computing speed, or both, as compared to typical desktop computers and the like. By way of example, resource-constrained devices include mobile telephones, boundary scan devices, field application programmable devices, personal digital assistants, (PDAs), pagers, and other miniature or small footprint devices.

In the context of the present invention, the term "randomized" describes the result of a random or pseudo-random number generation process. A "randomized process" describes the application of such a result to a process. Methods of generating random and pseudo-random numbers are known by those skilled in the relevant art.

In the context of the present invention, the term "cryptographic one-way function" describes any cryptographic process that produces an output based upon an input, such that it is computationally infeasible to compute the input based upon the output. Exemplary cryptographic one-way functions comprise the MD4 algorithm, the MD5 algorithm, and the SHA-1 algorithm. The MD4 algorithm is described in R. Rivest, "The MD4 Message Digest Algorithm", Request for Comments (RFC) 1320, R. Rivest, MIT Laboratory for Computer Science and RSA Data Security, Inc., April 1992. The MD5 algorithm is described in Rivest. R. "The MD5 Message-Digest Algorithm", Request for Comments (RFC) 1321, R. Rivest, MIT Laboratory for Computer Science and RSA Data Security, Inc., April 1992. The SHA-1 algorithm is described in *Secure Hash Standard*, Federal Information Processing Publication 180-1, Apr. 17, 1995.

In the context of the present invention, the term "loop back hash function" describes a hash function that takes as an input at least part of the function's previous result, if any.

In the context of the present invention, the term "obfuscated package" describes an application program unit comprising at least one obfuscated application program.

In the context of the present invention, the term "obfuscation descriptor" describes an identifier that indicates an obfuscation method applied to an application program to create an obfuscated application program.

In the context of the present invention, the term "operand" describes a portion of a machine instruction that references data or a peripheral device.

In the context of the present invention, the term "opcode" or "operation code" describes a portion of a machine instruction that represents one or more operations of a computer.

In the context of the present invention, the term "opcode value" describes a numeric representation of an opcode. An opcode value may be used as an index into a dispatch table to obtain a reference to a corresponding instruction implementation method.

In the context of the present invention, the term "instruction" describes a machine instruction represented by an opcode and zero or more operands.

In the context of the present invention, the term "instruction implementation method" describes a sequence of one or more microinstructions or microopcodes that implement a machine instruction.

In the context of the present invention, the term "program generator" describes mechanism that receives a program as an input and generates a specialized version of the program.

Embodiments of the present invention apply one or more application program obfuscation methods to application programs communicated to an unsecured device, providing increased security of application programs while requiring relatively little overhead compared to typical public key cryptography systems. Multiple application program obfuscation methods and combinations of application program obfuscation methods are disclosed herein. Other embodiments of the present invention execute application programs that have been obfuscated using one or more application program obfuscation methods. Still other embodiments of the present invention use one or more application program obfuscation methods to create or use an application program that performs a decryption operation for a cryptographic key interleaved in its instruction stream, where the cryptographic key is for decrypting protected digital content communicated to an unsecured device.

Figure 2:
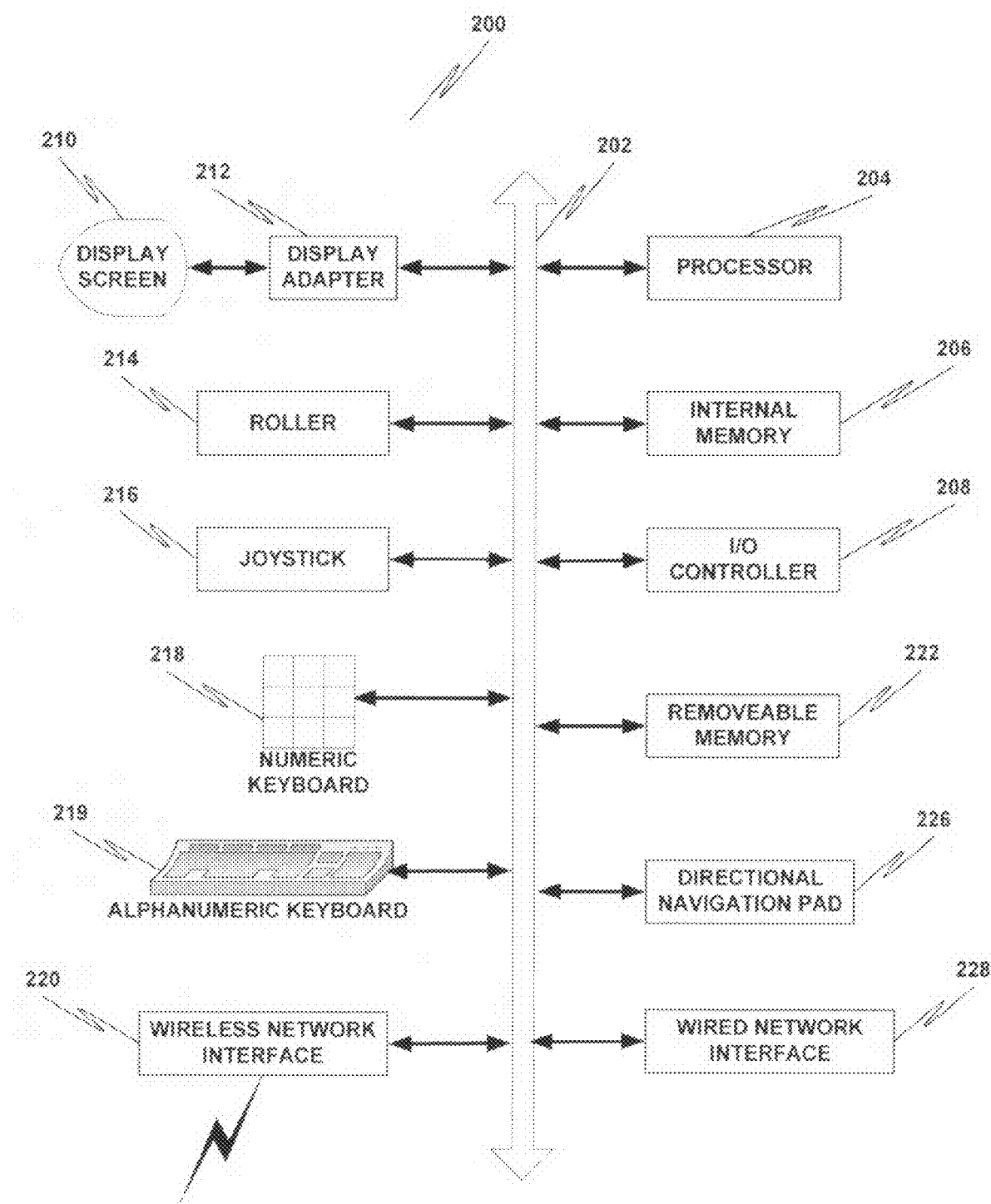
FIG. 2 is a block diagram of a computer system suitable for implementing aspects of the present invention.

FIG. 2 depicts a block diagram of a computer system 200 suitable for implementing aspects of the present invention. As shown in FIG. 2, system 200 includes a bus 202 which interconnects major subsystems such as a processor 204, an internal memory 206 (such as a RAM), an input/output (I/O) controller 208, a removable memory (such as a memory card), an external device such as a display screen 210 via display adapter 212, a roller-type input device 214, a joystick 216, a numeric keyboard 218, an alphanumeric keyboard 219, directional navigation pad 226 and a wireless interface 220. Many other devices can be connected. Wireless network interface 220, wired network interface 228, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 2 to be present to practice the present invention. Furthermore, the devices and subsystems may be interconnected in different ways from that shown in FIG. 2. Code to implement the present invention may be operably disposed in internal memory 206 or stored on storage media such as removable memory 222, a floppy disk or a CD-ROM.

Figure 3:
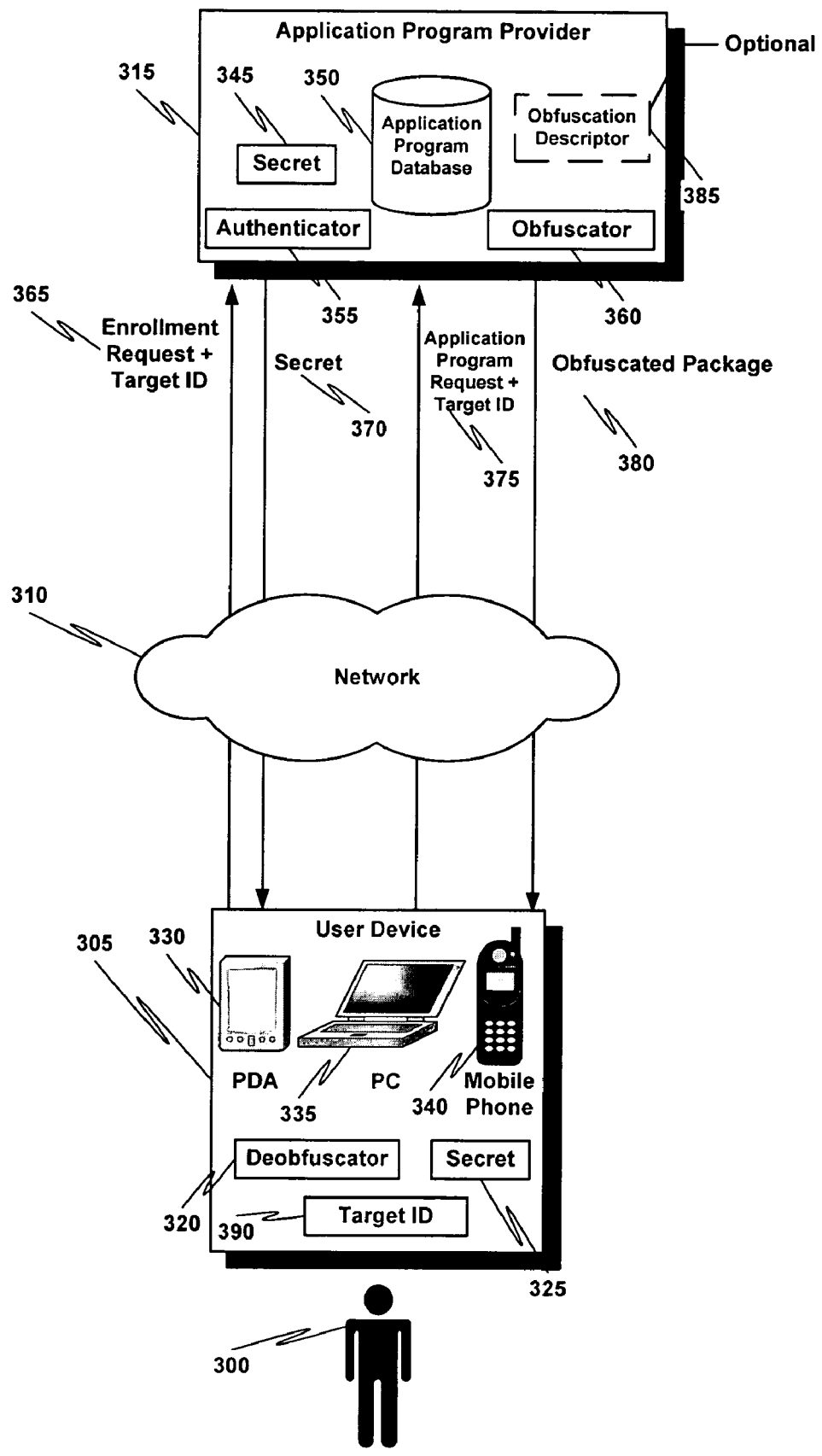
FIG. 3 is a block diagram that illustrates a system for application program obfuscation in accordance with one embodiment of the present invention.

Turning now to FIG. 3, a block diagram that illustrates a system for application program obfuscation in accordance with one embodiment of the present invention is presented. The system includes at least one user device 305 in communication with at least one application program provider 315 via network 310. User device 305 includes a deobfuscator 320 configured to deobfuscate obfuscated code stored on the user device 305. Application program provider 315 includes an authenticator 355 to authenticate enrollment requests. Application program provider 315 also includes an application program database 350 comprising at least one executable application program. Application program provider 315 also comprises an obfuscator 360 to obfuscate an executable application program stored on the application program provider 315. Application program provider 315 may also comprise an obfuscation descriptor 385 that describes the obfuscated data. Obfuscation descriptor 385 may include an indication of the obfuscation method used by obfuscator 360 to create an obfuscated application program. Secret 345 is used to encrypt the obfuscation descriptor 385.

In operation, user device 305 issues an enrollment request 365 that includes a target ID. The target ID specifies a user device that will execute an obfuscated application program. The target ID may specify the user device 305 that issued enrollment request 365. Alternatively, the target ID may specify a user device, other than user device 305 that issued enrollment request 365. Application program provider 315 receives enrollment request 365 and authenticator 355 authenticates user 300. If user 300 is authenticated, authenticator 355 associates a secret 345 with the target ID and sends secret 345, 370 to user device 305, which is saved as secret 325. According to one embodiment of the present invention, application program provider 315 and user device 305 determine at enrollment which obfuscation method to apply for each application program requested subsequently. According to another embodiment of the present invention, obfuscation methods are not determined during enrollment. Rather, in response to an application program request 375 comprising a target ID, application program provider 315 sends an obfuscated package 380 including an obfuscated application program and obfuscation descriptor 385 to user device 305 corresponding to the target ID.

Still referring to FIG. 3, an enrolled user device 305 obtains an obfuscated application program to execute by issuing an application program request 375 that includes the target ID 390. Application program provider 315 receives the application program request 375, determines which obfuscation method to apply based at least in part on the application program request 375, obtains the requested application program from application program database 350, and applies the obfuscation method to the application program. If the obfuscation methods to apply for each application program requested are determined during enrollment, application program provider 315 sends an obfuscated package 380 including an obfuscated application program to the user device 305 corresponding to the target ID 390. If the obfuscation methods are not determined during enrollment, application program provider 315 sends an obfuscated package 380 including an obfuscated application program and obfuscation descriptor 385 to the user device 305 corresponding to the target ID 390. The obfuscation descriptor 385 may indicate which obfuscation method was applied to the obfuscated application program 380. According to one embodiment of the present invention, secret 345 is used to encrypt the obfuscation descriptor 385. The obfuscation descriptor 385 may be sent separately from the obfuscated package 380. Alternatively, the obfuscation descriptor 385 may be embedded within the obfuscated application program.

According to one embodiment of the present invention, one or more application programs are obfuscated using one or more encodings of one or more obfuscation methods, and stored in application program database 350 in advance of a request for the one or more application programs.

According to another embodiment of the present invention, a cryptographic process is applied to obfuscated application program 380 prior to communicating the obfuscated application program 380 to user device 305. According to another embodiment of the present invention, obfuscated application program 380 is sent in the clear to user device 305.

User device 305 may be any device configured to render digital content to a user 305 using an obfuscated application program. The digital content may be rendered, by way of example, by visual, auditory, or tactile means. Exemplary user devices include one or more of the following devices configured to render digital content to a user 305 using an obfuscated application program: a personal digital assistant (PDA) 330, a personal computer (PC) 335, a mobile phone 340, a server computer in communication with a user display, or the like.

Figure 4:
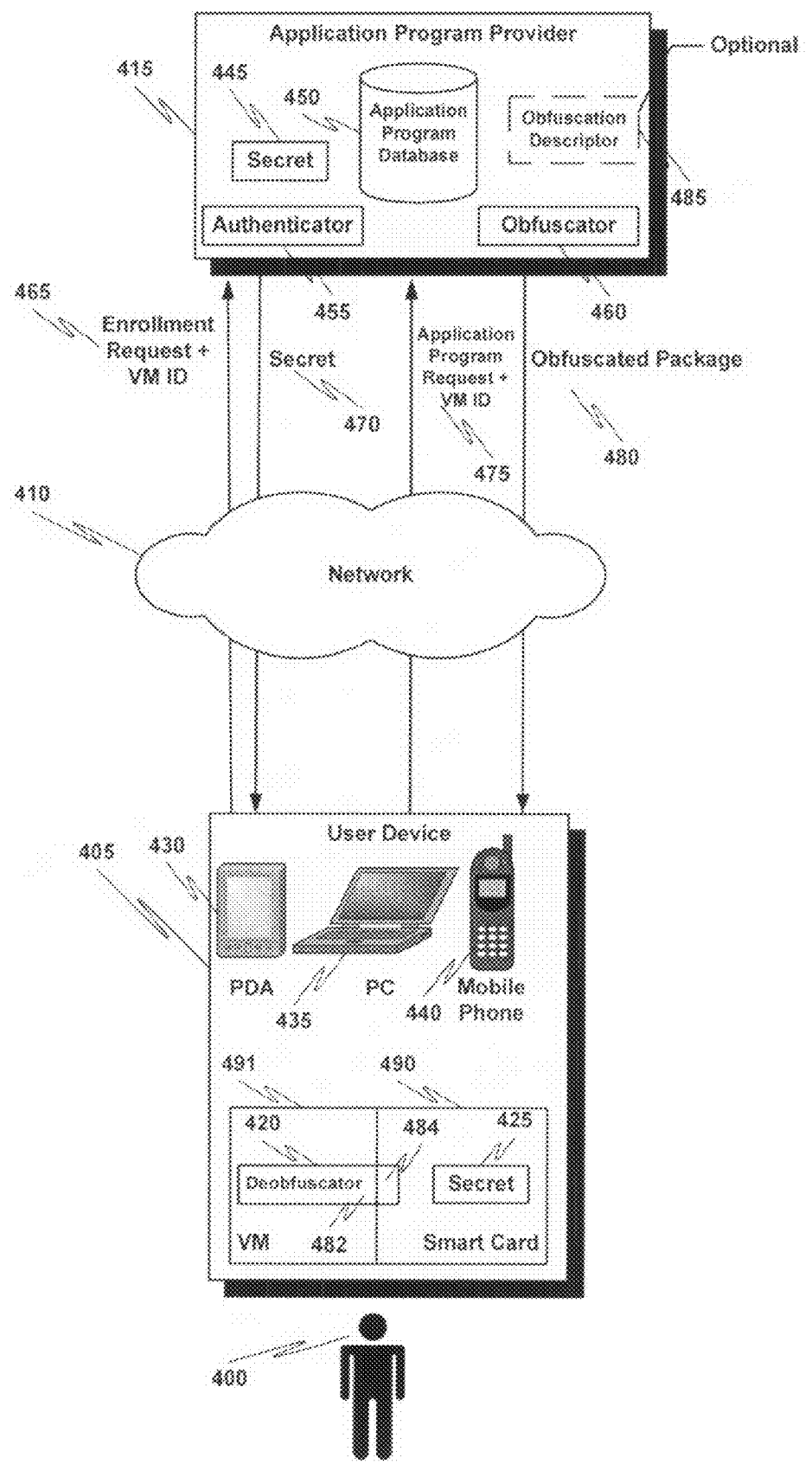
FIG. 4 is a block diagram that illustrates a system for application program obfuscation using a secure portable device in accordance with one embodiment of the present invention.

FIG. 4 is a block diagram that illustrates a system for application program obfuscation using a secure portable device in accordance with one embodiment of the present invention. As shown in FIG. 4, user device 405 comprises a secure portable device such as a Java Card™ technology-enabled device, or the like. The system illustrated by FIG. 4 includes at least one user device 405 in communication with at least one application program provider 415 via network 410. User device 405 includes a virtual machine 491 and a smart card 490. Smart card 490 also comprises a secret 425 established upon successful enrollment with application program provider 415. Deobfuscator 420 comprises a first portion 482 in virtual machine 491 and a second portion 484 in smart card 425. Second portion 484 uses secret 425 to create permuted dispatch tables. First portion 482 uses the permuted dispatch tables to execute the obfuscated code.

According to another embodiment of the present invention, smart card 490 comprises VM 491.

Application program provider 415 includes an authenticator 455 to authenticate enrollment requests. Application program provider 415 also includes an application program database 450 comprising at least one executable application program. Application program provider 415 also comprises an obfuscator 460 to obfuscate an executable application program stored on the application program provider 415. Application program provider 415 may also comprise an obfuscation descriptor 485 that describes the obfuscated data. Obfuscation descriptor 485 may include an indication of the obfuscation method used by obfuscator 460 to create an obfuscated application program. Secret 445 is used to encrypt the obfuscation descriptor 485.

In operation, user device 405, which can be, for example, any one of a personal digital assistant (PDA) 430, a personal computer (PC) 435, a mobile phone 440, issues an enrollment request 465 that includes a virtual machine identifier (VM ID). The VM ID specifies a user device that will execute an obfuscated application program. The VM ID may be based at least on a target ID, and secret 425 may be based at least in part on VM ID. The VM ID may specify the VM ID of the user device 405 that issued the enrollment request 465. Alternatively, the VM ID may specify a user device other than the user device 405 that issued the enrollment request 465. Application program provider 415 receives the enrollment request 465 and authenticator 455 authenticates user 400. If the user 400 is authenticated, authenticator associates a secret 445 with the VM ID and sends the secret 445, 470 to user device 405. According to one embodiment of the present invention, the application program provider 415 and the user device 405 determine at enrollment which obfuscation method to apply for each application program requested subsequently. According to another embodiment of the present invention, obfuscation methods are not determined during enrollment. Rather, in response to an application program request 475 comprising a VM ID, application program provider 415 sends an obfuscated package 480 including an obfuscated application program and obfuscation descriptor 485 to the user device 405 corresponding to the target ID.

Still referring to FIG. 4, an enrolled user device 405 obtains an obfuscated application program to execute by issuing an application program request 475 that includes the VM ID. Application program provider 415 receives the application program request 475, determines which obfuscation method to apply based at least in part on the application program request, obtains the requested application program from application program database 450, and applies the obfuscation method to the application program. The application program provider 415 and the user device 405 may establish which particular obfuscation method to apply for each application program requested. In this case, application program provider 415 sends an obfuscated package 480 including an obfuscated application program to the user device 405 corresponding to the VM ID. If the obfuscation methods are not determined during enrollment, application program provider 415 sends an obfuscated package 480 including an obfuscated application program and obfuscation descriptor 485 to the user device 405 corresponding to the VM ID. Additionally, a cryptographic key included in the application program may be embedded within the application program. The obfuscation descriptor 485 may indicate which obfuscation method was applied to the obfuscated application program 480. According to one embodiment of the present invention, secret 445 is used to encrypt the obfuscation descriptor. The obfuscation descriptor may be sent separately from the obfuscated package 480. Alternatively, the obfuscation descriptor may be embedded within the obfuscated package.

According to one embodiment of the present invention, user device 405 comprises a CDMA technology-enabled smart card. CDMA technology-enabled smart cards are described in Smart Card Stage I Description, Version 1.1, CDMA Development Group—Smart Card Team Document (May 22, 1996).

According to another embodiment of the present invention, user device 405 comprises a SIM (Subscriber Identity Module card) card. The term "SIM card" describes the smart card used in GSM (Global System for Mobile Communications) mobile telephones. The SIM includes the subscriber's personal cryptographic identity key and other information such as the current location of the phone and an address book of frequently called numbers. The SIM is described in Digital cellular telecommunications system (phase 2+); Specification of the Subscriber Identity Module—Mobile Equipment (SIM—ME) interface, ETSI, GSM 11.11 version 7.4.0, Release 1998.

According to another embodiment of the present invention, user device 405 comprises a WIM (Wireless Interface Module). A WIM is a smart card in a WAP (Wireless Application Protocol) phone. It is described in Wireless Identity Module Part: Security, WAP-260-WIM-20010712-a, Wireless Application Protocol Forum, Jul. 12, 2001.

According to another embodiment of the present invention, user device 405 comprises a USIM (Universal Subscriber Identity Module). A USIM is a smart card for a 3GPP (3rd Generation Partnership Project) mobile phone. It is described in 3rd Generation Partnership Project; Technical Specification Terminals; USIM and IC card requirements, Release 4, 3GPP TS 21.111 V4.0.0 (2001-03).

According to another embodiment of the present invention, user device 405 comprises a UIM (User Identity Module). A UIM is a smart card for a 3GPP Project 2 (3GPP2) mobile phone. The term "R-UIM" is used when the smart card is removable. A UIM is a super set of the SIM and allows CDMA (Code Division Multiple Access)-based cellular subscribers to roam across geographic and device boundaries. The R-UIM is described in a specification issued by the 3rd Generation Partnership Project 2 (3GPP2) and entitled 3rd Generation Partnership Project 2; Removable User Identity Module (R-UIM) for cdma2000 Spread Spectrum Systems, 3GPP2 C.S0023-0, Jun. 9, 2000.

The above description regarding various mobile phone technologies is not intended to be limiting in any way. Those of ordinary skill in the art will recognize that other user devices may be used.

FIGS. 5A and 5B are block diagrams that illustrate obfuscated package data structures in accordance with embodiments of the present invention. FIG. 5A illustrates an obfuscated package data structure 500 having an obfuscated application program 505. FIG. 5B illustrates an obfuscated package data structure 510 having an obfuscated application program 525, an obfuscation descriptor 530, protected data 520 and a cryptographic key 515. Obfuscation descriptor 530 includes information about the obfuscation method used to create obfuscated application program 525. A cryptographic process is applied to protected data 520 together with cryptographic key 515.

FIG. 5C is a block diagram that illustrates creating an obfuscated package in accordance with one embodiment of the present invention. An obfuscator 555 of an application program provider receives application program information comprising application program code 535 and application program data 540. The application program data 540 may comprise data referenced during execution of application program code 535. Application program data may also comprise data used to initialize the application program. Obfuscator 555 then applies an obfuscation method, identified by obfuscation descriptor 550, to the application program code 535, the application program data 540, or both, to create an obfuscated application program 565. The obfuscated application program 565 and possibly other data 545 together form an obfuscated package 560.

FIGS. 6A-6D illustrate mechanisms for application program obfuscation in accordance with embodiments of the invention. FIG. 6A illustrates execution of an application program obfuscated by transforming the application program into an application program having opcodes corresponding to one of multiple dispatch tables. This is described below in more detail with reference to FIGS. 11-15. FIG. 6B illustrates execution of an application program obfuscated by transforming the application program into an application program having opcodes encoded based at least in part on an instruction counter value. This is described below in more detail with reference to FIGS. 18-20. FIG. 6C illustrates nonlinear execution of an obfuscated application program. This is described below in more detail with reference to FIGS. 21A-30. FIG. 6D illustrates nonlinear execution of an obfuscated application program having application program instructions interleaved with application program data in an instruction stream. This is described below in more detail with reference to FIGS. 31-35.

Figure 7:
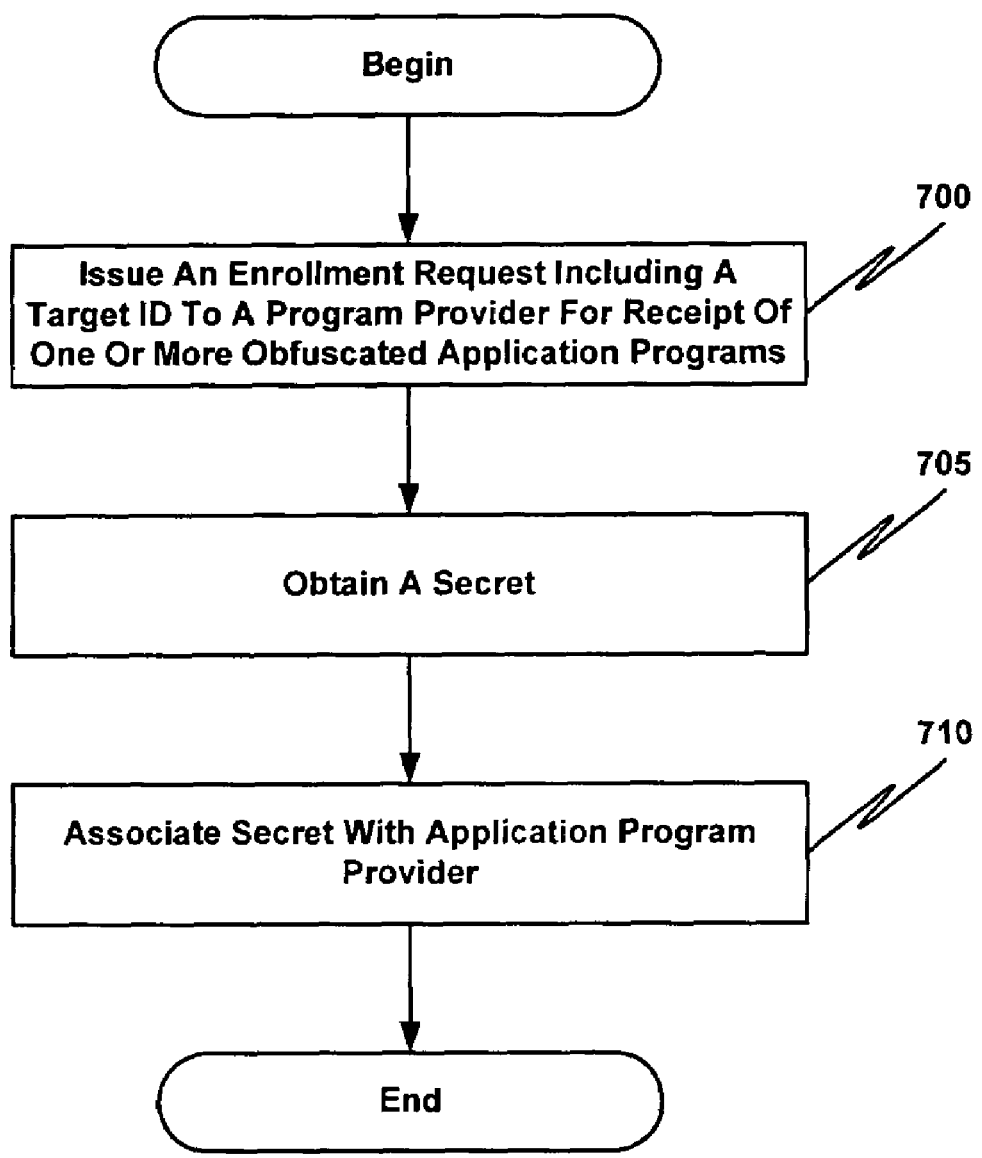
FIG. 7 is a flow diagram that illustrates a method for enrolling for receipt of one or more obfuscated application programs from the perspective of a user device in accordance with one embodiment of the present invention.
Figure 8:
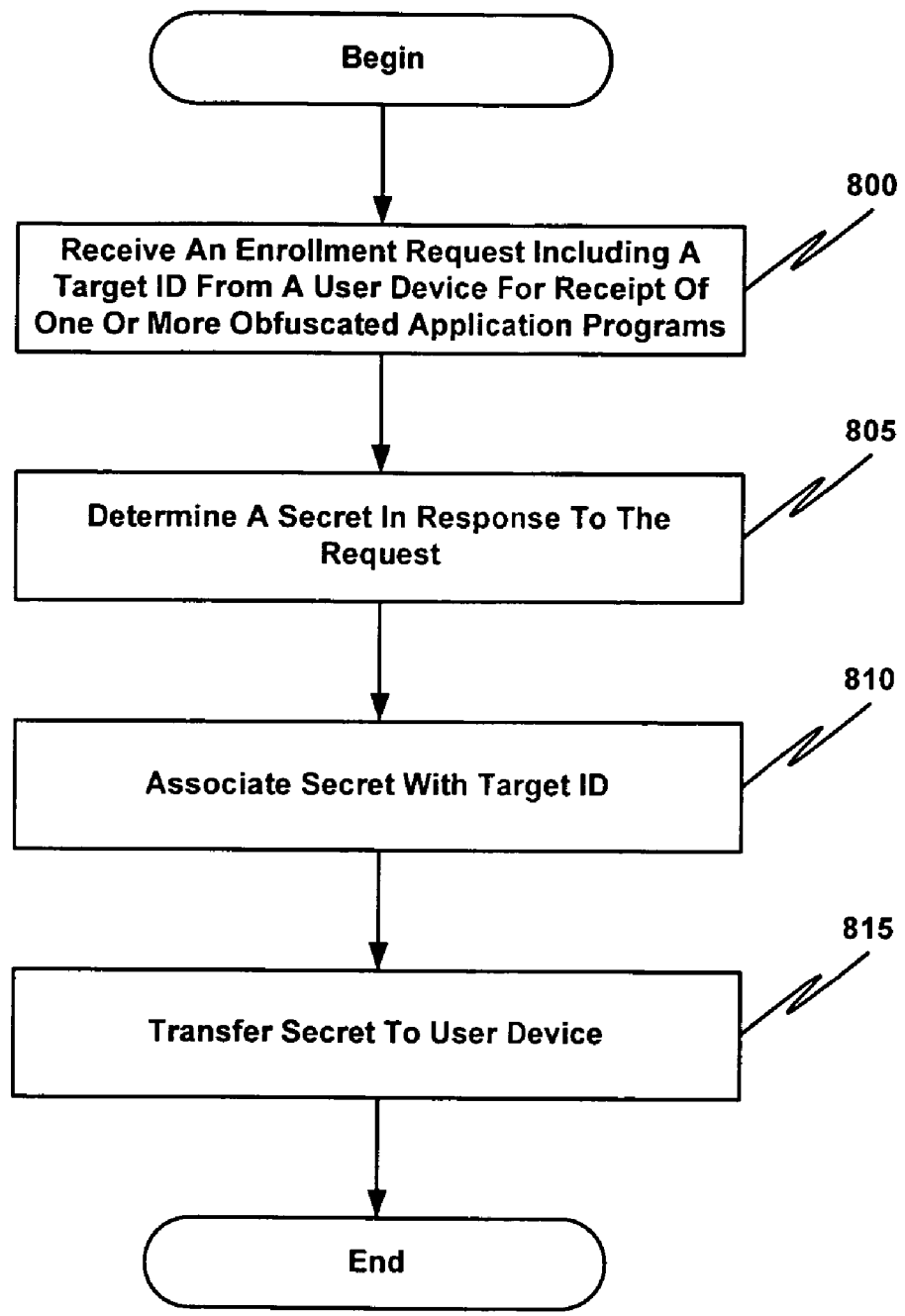
FIG. 8 is a flow diagram that illustrates a method for enrolling for receipt of one or more obfuscated application programs from the perspective of an application program provider in accordance with one embodiment of the present invention.
Figure 9:
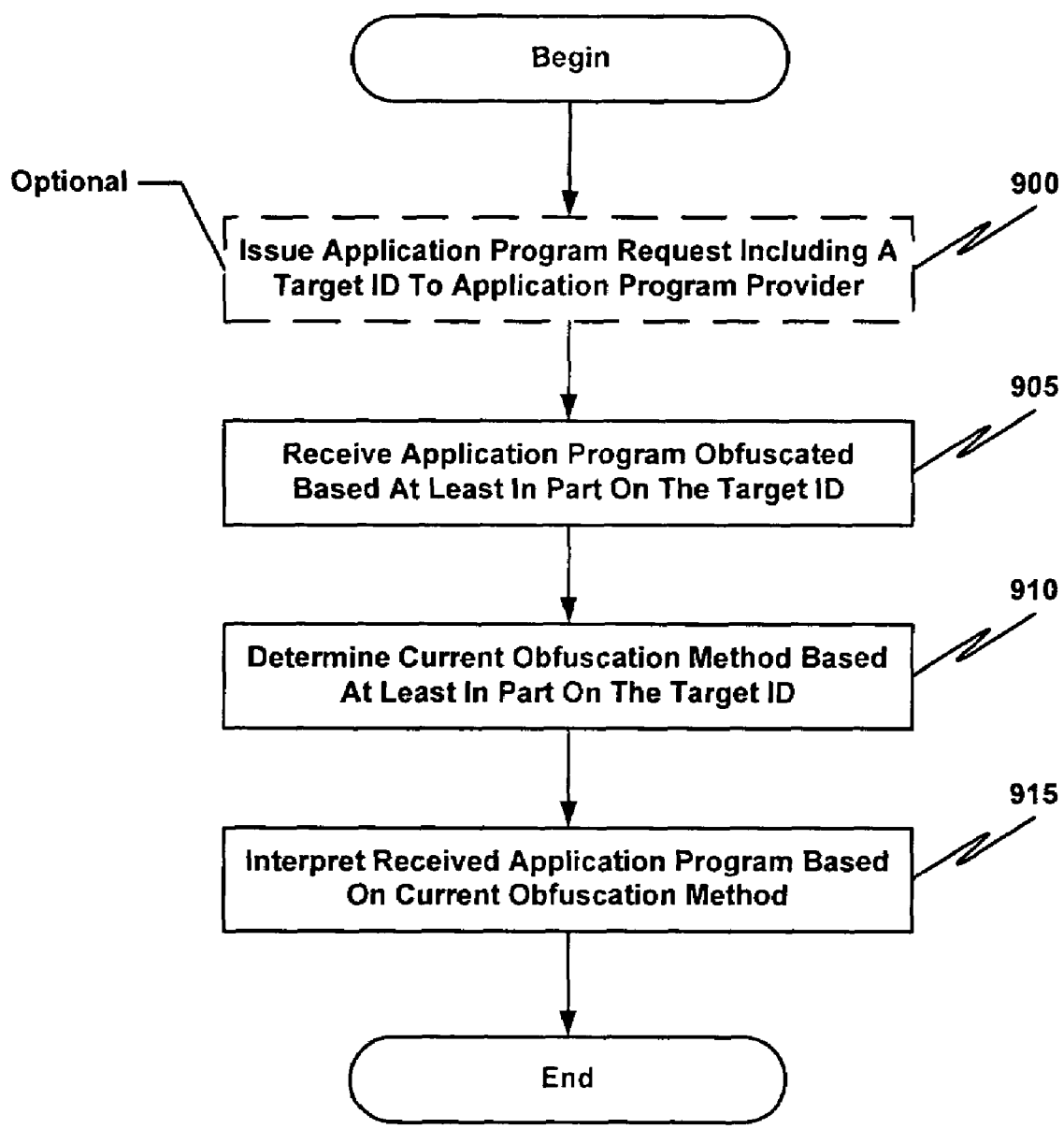
FIG. 9 is a flow diagram that illustrates a method for executing an obfuscated application program from the perspective of a user device in accordance with one embodiment of the present invention.
Figure 10:
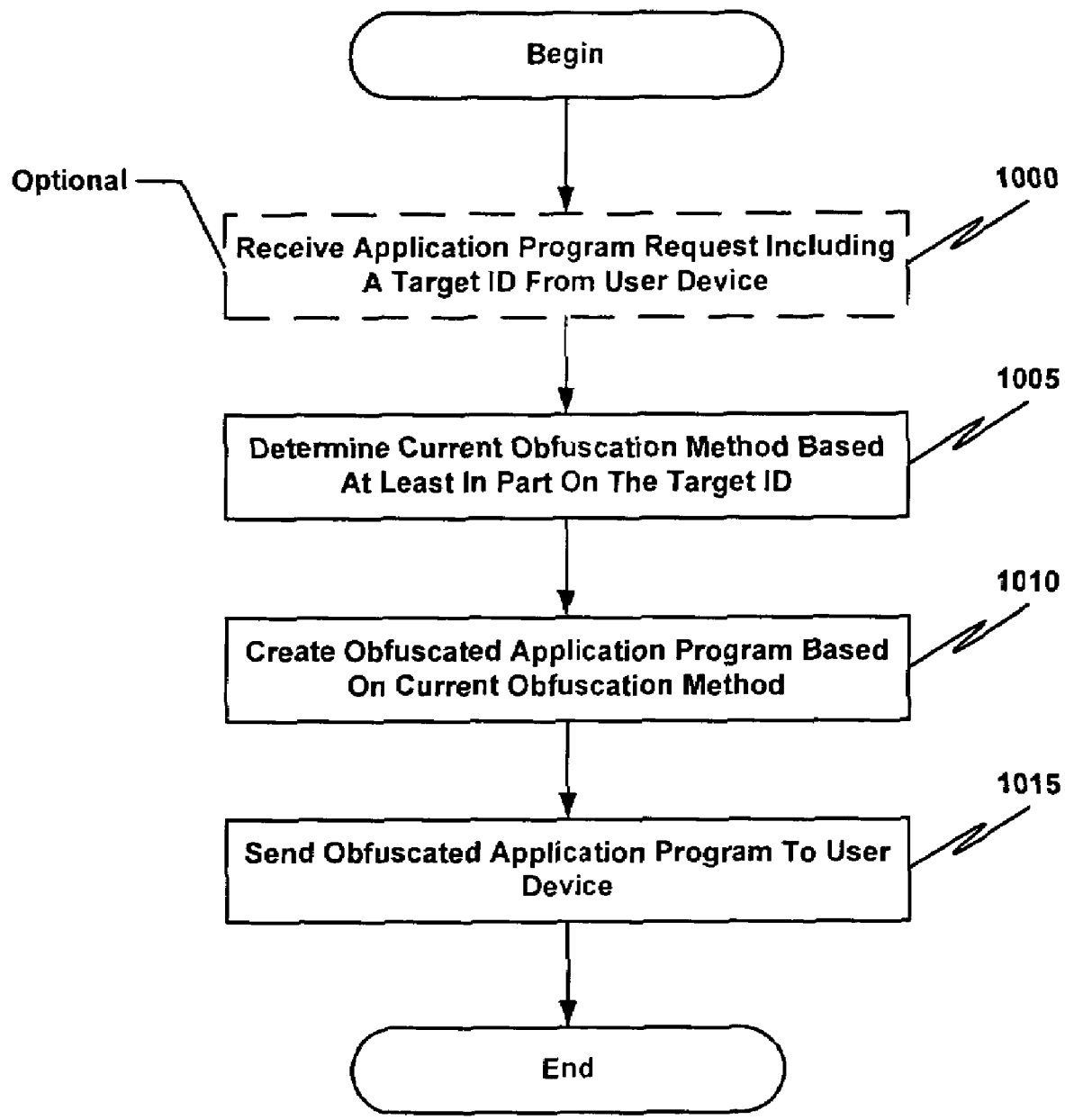
FIG. 10 is a flow diagram that illustrates a method for transforming an application program into an obfuscated application program from the perspective of an application program provider in accordance with one embodiment of the present invention.

FIGS. 7-10 are high-level flow diagrams that illustrate enrollment for receipt of one or more obfuscated application programs, and executing the one or more obfuscated application programs in accordance with embodiments of the present invention. FIGS. 7 and 8 illustrate how a user device may enroll for receipt of one or more obfuscated application programs in accordance with embodiments of the present invention. FIG. 7 illustrates the process from the perspective of a user device, and FIG. 8 illustrates the process from the perspective of an application program provider. FIGS. 9 and 10 illustrate use of an obfuscated application program in accordance with embodiments of the present invention. FIG. 9 illustrates executing an obfuscated application program from the perspective of a user device, and FIG. 10 illustrates transforming an application program into an obfuscated application program from the perspective of an application program provider.

Turning now to FIG. 7, a flow diagram that illustrates a method for enrolling for receipt of one or more obfuscated application programs from the perspective of a user device in accordance with one embodiment of the present invention is presented. At 700, an enrollment request including a target ID is issued to at least one application program provider for receipt of one or more obfuscated application programs. According to one embodiment of the present invention, the target ID comprises a VM ID. At 705, a secret is obtained from the application program provider if the application program provider authenticates the user device. At 710, the secret is associated with the application program provider. The secret may comprise, by way of example, one or more cryptographic keys. The secret may be used by one or more user device associated with the target ID to execute one or more obfuscated application programs. Additionally, an indication of what obfuscation methods will be used for a predetermined number of future application program requests may be communicated between the application program provider and the user device. A cryptographic process may be applied to this information together with one or more cryptographic keys.

Turning now to FIG. 8, a flow diagram that illustrates a method for enrolling for receipt of one or more obfuscated application programs from the perspective of an application program provider in accordance with one embodiment of the present invention is presented. At 800, an enrollment request including a target ID is received from a user device. At 805, a secret is determined in response to the enrollment request. The secret may comprise, by way of example, one or more cryptographic keys. At 810, the secret is associated with the target ID if the request is authenticated. Additionally, an indication of what obfuscation methods will be used for a predetermined number of future application program requests may be communicated between the application program provider and the user device. A cryptographic process may be applied to this information together with the one or more cryptographic keys. At 815, the secret is transferred to the user device. Processes 805 and 815 may form part of a key exchange protocol.

Turning now to FIG. 9, a flow diagram that illustrates a method for executing an obfuscated application program from the perspective of a user device in accordance with one embodiment of the present invention is presented. At 900, an application program request including a target ID is issued to at least one application program provider. At 905, an application program obfuscated based at least in part on the target ID is received. At 910, the current obfuscation method is determined. According to one embodiment of the present invention, the current obfuscation method is determined based at least in part on an obfuscation descriptor received in association with an obfuscated application program. According to another embodiment of the present invention, the current obfuscation method is determined based at least in part on a configuration established upon successful enrollment. At 915, the received code is interpreted based at least in part on the current obfuscation method.

According to one embodiment of the present invention, a user device receives an obfuscated application program (905) without requesting (900) the application program. By way of example, an application program provider may provide a particular user device with an obfuscated application program at predetermined intervals.

Turning now to FIG. 10, a flow diagram that illustrates a method for transforming an application program into an obfuscated application program from the perspective of an application program provider in accordance with one embodiment of the present invention is presented. At 1000, an application program request including a target ID is received from a user device. At 1005, a current obfuscation method is determined based at least in part on the target ID. At 1010, an obfuscated application program based at least in part on the current obfuscation method is created. According to one embodiment of the present invention, a cryptographic process is applied to the obfuscated application program together with a cryptographic key, to create an encrypted obfuscated application program. At 1015, the obfuscated application program is sent to the user device. According to one embodiment of the present invention, an application program provider performs processes 1005-1015 without receiving an application program request (1000). By way of example, the application program provider may provide a particular user device with an obfuscated application program at predetermined intervals.

FIGS. 11-15 illustrate application program obfuscation by using alternate opcode value encoding schemes in accordance with embodiments of the present invention. An application program provider determines the opcode value encoding scheme to use for an application program and transforms the application program using the chosen opcode value encoding scheme. A user device receives the obfuscated application program and associates a dispatch table with the application program based at least in part on the obfuscation method used to obfuscate the application program. The obfuscated application program is executed using the associated dispatch table.

Figure 11:
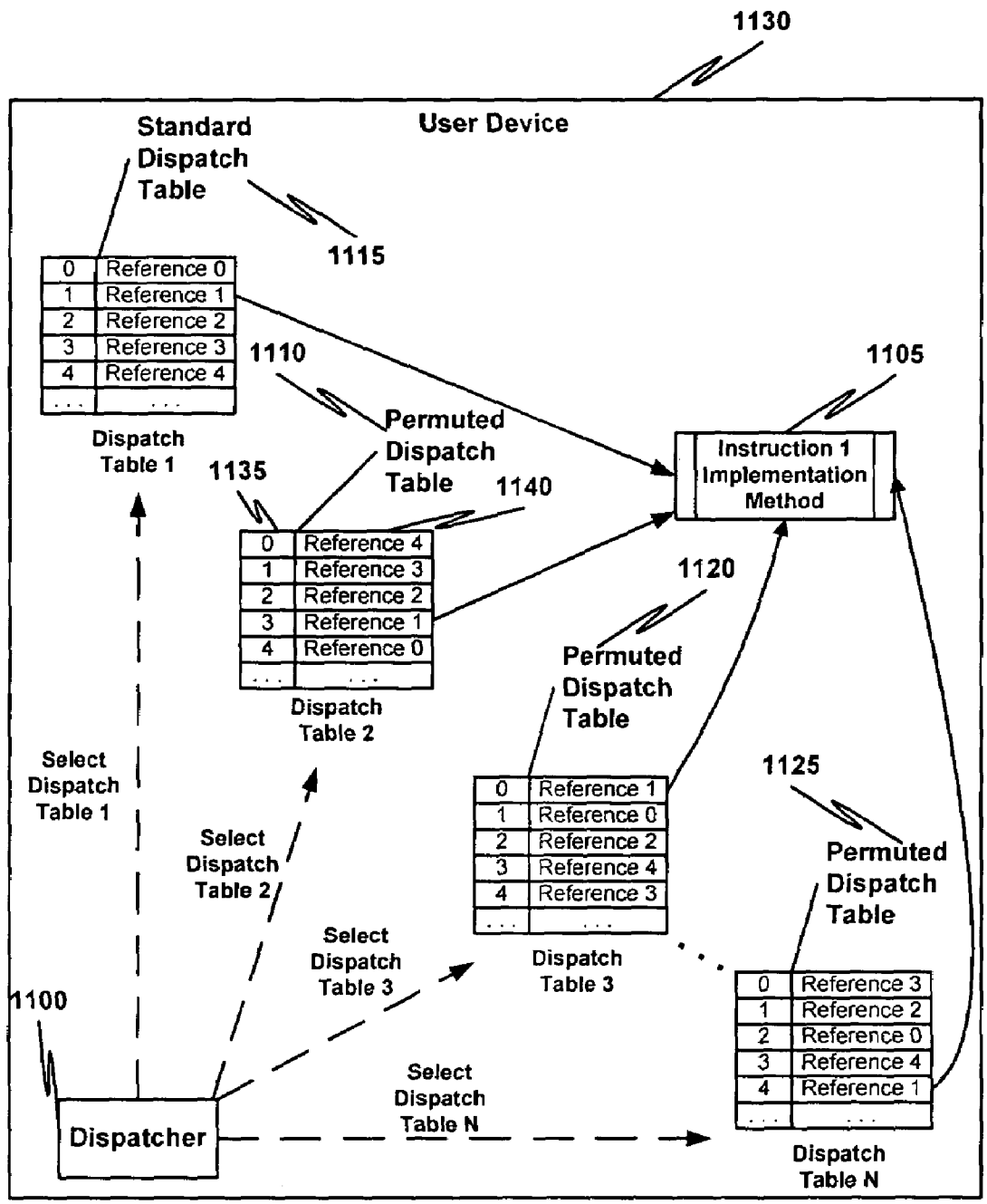
FIG. 11 is a detailed block diagram that illustrates execution of an application program obfuscated by transforming the application program into an application program having opcode values corresponding to one of multiple dispatch tables in accordance with one embodiment of the present invention.

Turning now to FIG. 11, a detailed block diagram that illustrates execution of an application program obfuscated by transforming the application program into an application program having opcodes corresponding to one of multiple dispatch tables in accordance with one embodiment of the present invention is presented. User device 1130 comprises a dispatcher 1100 configured to use one of multiple dispatch tables (1110-1125) to determine a correspondence between an opcode value and a reference to an instruction implementation method 1105. Using FIG. 11 as an example, dispatch tables 1110, 1115, 1120, and 1125 are shown. Each dispatch table 1110, 1115, 1120, and 1125 uses a different opcode value encoding scheme for at least one opcode in an instruction set. If dispatcher 1100 executes an obfuscated application program using the opcode value encoding scheme of permuted dispatch table 1110, permuted dispatch table 1110 is used to determine a correspondence between an opcode value 1135 and a reference 1140 to an instruction implementation method 1105.

A correspondence between a single instruction implementation method 1105 and opcode values from different dispatch tables (1110-1125) is shown in FIG. 11 to prevent obfuscation of the present invention. As shown in FIG. 11, there are multiple correspondences between different opcode values and a single instruction implementation method 1105. According to embodiments of the present invention, a dispatch table may include multiple associations between an opcode value and an instruction implementation method. Additionally, the associations may comprise a reference to an instruction implementation method. Alternatively, an instruction implementation method associated with an opcode value may be placed in-line in a dispatch table.

The dispatch tables and instruction implementation method shown in FIG. 11 are for illustrative purposes and are not intended to be limiting in any way. Those of ordinary skill in the art will recognize that a different number of dispatch tables may be used.

Figure 12:
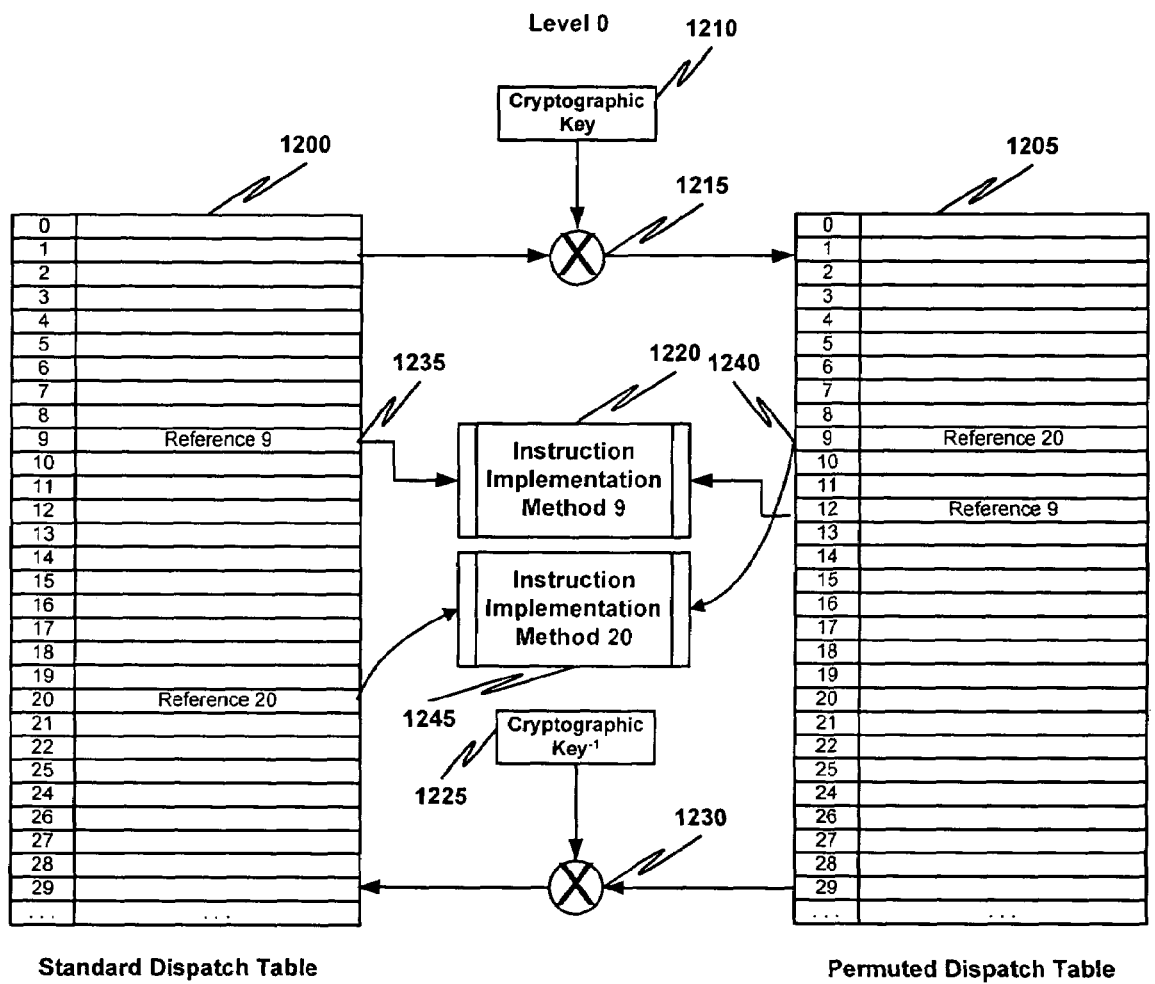
FIG. 12 is a block diagram that illustrates the relationship between multiple dispatch tables in accordance with one embodiment of the present invention.

Turning now to FIG. 12, a block diagram that illustrates the relationship between multiple dispatch tables in accordance with one embodiment of the present invention is presented. As shown in FIG. 12, a standard or default dispatch table 1200 may be permuted (1215) using a cryptographic key (1210) to obtain a permuted dispatch table 1205. Thus, permuted dispatch table 1205 may be generated in response to receiving an application program having opcode values encoded using an encoding scheme corresponding to the permuted dispatch table, rather than selecting a permuted dispatch table that was generated and stored previously. Each of dispatch tables 1200 and 1205 include the same instructions, but at least one of the opcode values in dispatch table 1200 refers to an instruction implementation method 1220 different from the instruction implementation method referred to by the same opcode value in dispatch table 1205. By way of example, the opcode value indicated by reference numeral 1235 in dispatch table 1200 refers to instruction implementation method 1220, while the opcode value indicated by reference numeral 1240 refers to a different instruction implementation method 1245.

Figure 13:
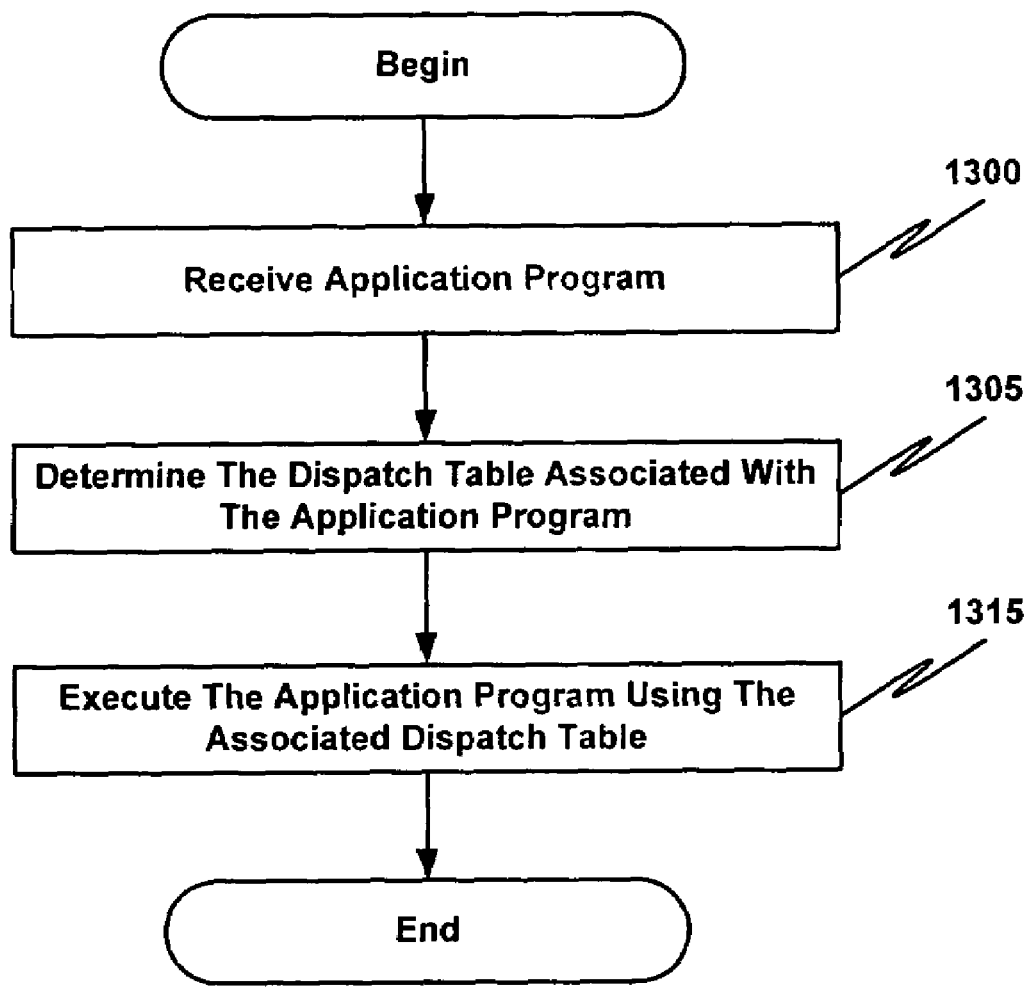
FIG. 13 is a flow diagram that illustrates a method for executing an application program obfuscated by transforming the application program into an application program having opcode values encoded corresponding to one of multiple dispatch tables in accordance with one embodiment of the present invention.

Turning now to FIG. 13, a flow diagram that illustrates a method for executing an application program obfuscated by transforming the application program into an application program having opcodes encoded corresponding to one of multiple dispatch tables in accordance with one embodiment of the present invention is presented. At 1300, an application program is received. At 1305, the dispatch table associated with the application program is determined. The associated dispatch table may be determined using any obfuscation descriptor included with the received application program. Alternatively, the associated dispatch table may be determined based at least in part on a configuration established at enrollment. Additionally, the associated dispatch table may be selected from one of multiple dispatch tables stored in a memory, or the dispatch table may be computed. At 1315, the application program is executed using the associated dispatch table.

Figure 14:
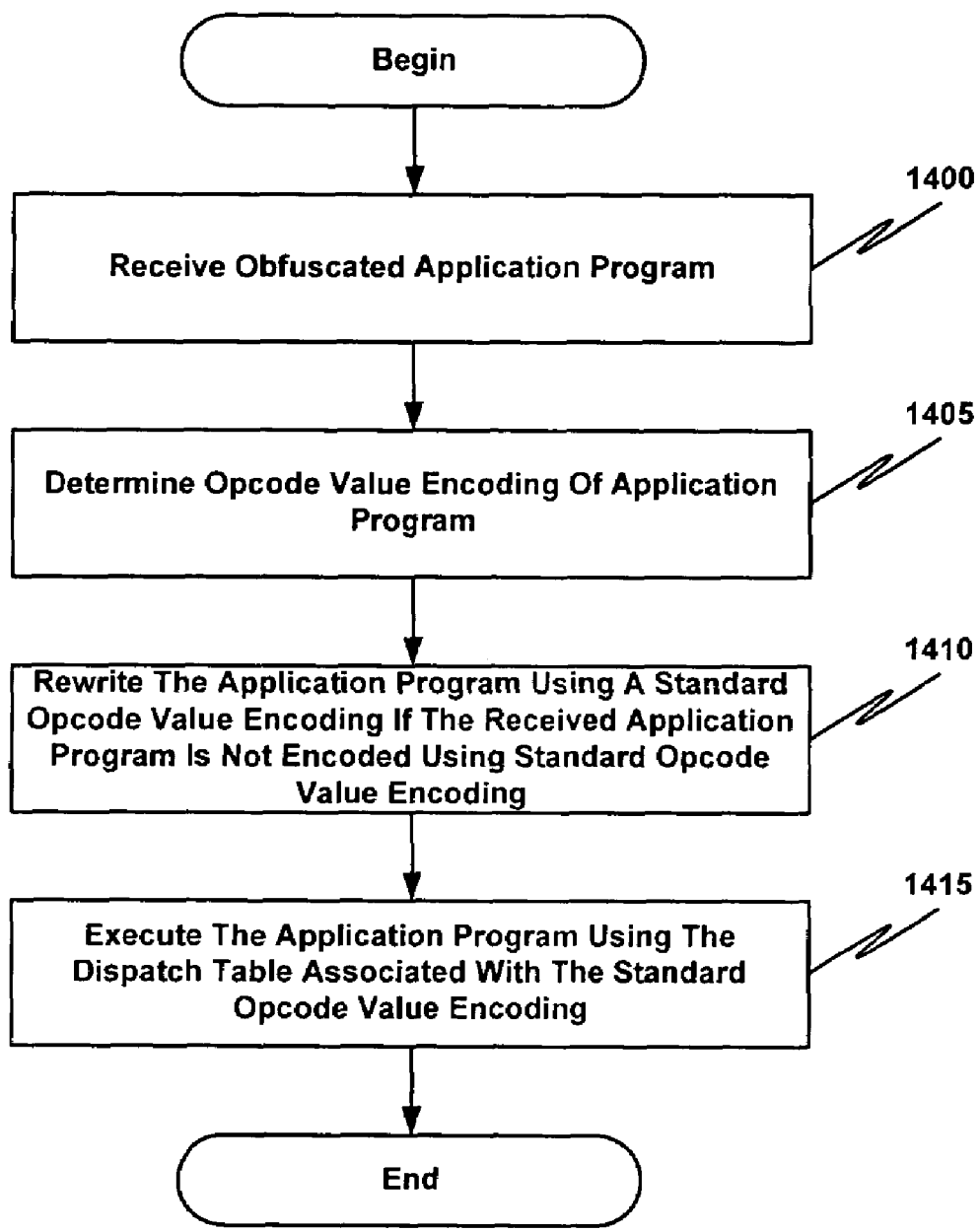
FIG. 14 is a flow diagram that illustrates a method for executing an application program obfuscated by transforming the application program into application program having opcode values encoded corresponding to one of multiple dispatch tables in accordance with one embodiment of the present invention.

Turning now to FIG. 14, a flow diagram that illustrates a method for executing an application program obfuscated by transforming the application program into application program having opcodes encoded corresponding to one of multiple non-standard dispatch tables in accordance with one embodiment of the present invention is presented. FIG. 14 illustrates modifying an obfuscated application program so that a standard dispatch table may be used to execute the application program, rather than using a non-standard dispatch table to execute the obfuscated application program. At 1400, an application program is received. At 1405, the opcode value encoding scheme of the application program is determined. The dispatch opcode value encoding scheme may be determined using any obfuscation descriptor included with the received application program. Alternatively, the associated dispatch table may be determined based at least in part on a configuration established at enrollment. At 1410, the application program is rewritten using a standard opcode value encoding scheme if the received application program is not encoded using the standard encoding. At 1415, the application program is executed using the dispatch table associated with the standard opcode value encoding scheme.

Figure 15:
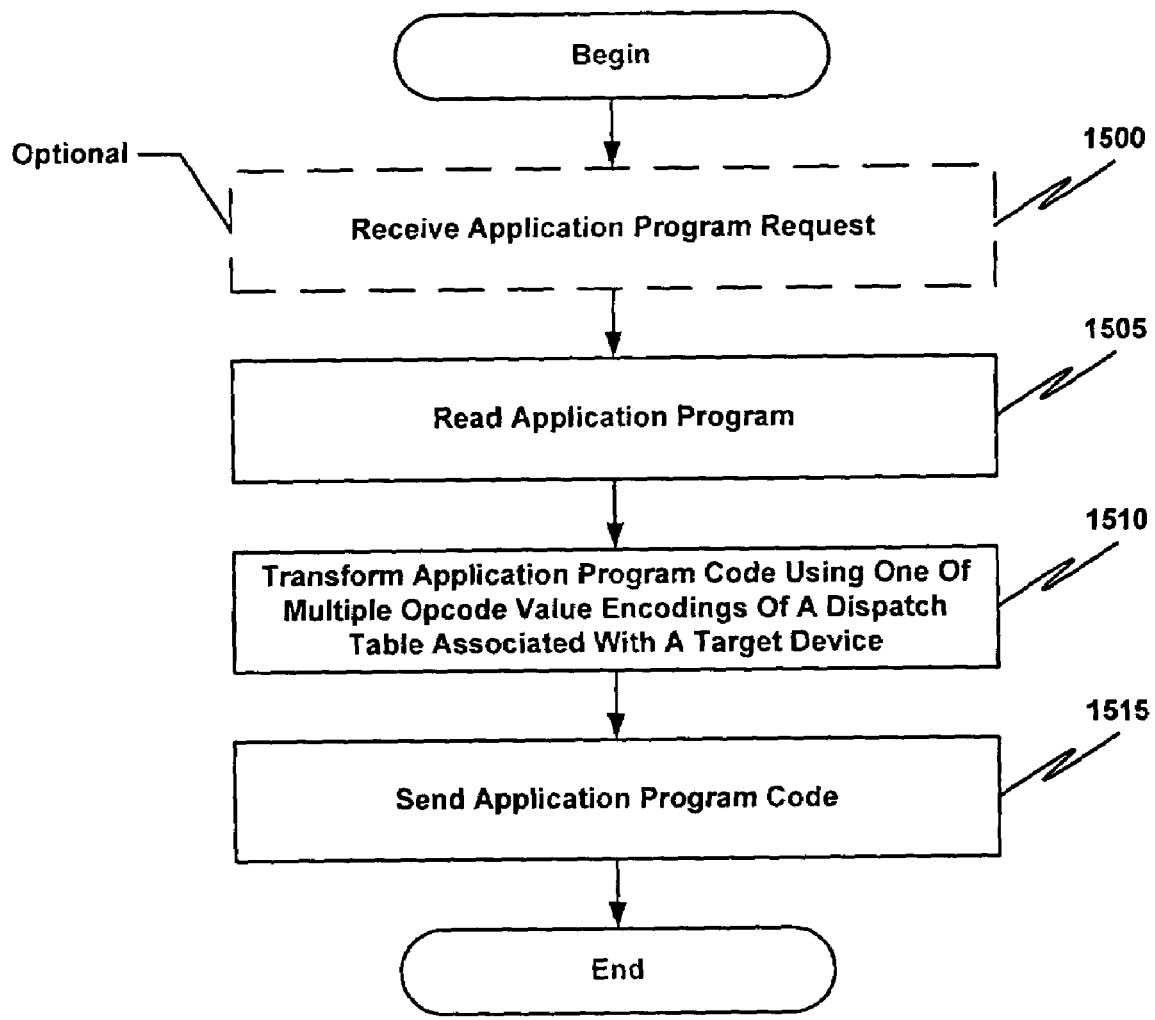
FIG. 15 is a flow diagram that illustrates a method for transforming an application program into an application program having opcode values encoded corresponding to one of multiple dispatch tables in accordance with one embodiment of the present invention.

Turning now to FIG. 15, a flow diagram that illustrates a method for transforming an application program into an application program having opcodes encoded corresponding to one of multiple dispatch tables in accordance with one embodiment of the present invention is presented. At 1500, an application program request is received. At 1505, application program code corresponding to the request is read. At 1510, the application program code is transformed using one of multiple opcode value encoding schemes of the dispatch table associated with the application program. If a configuration was established at enrollment, the agreed upon opcode value encoding scheme is used. Otherwise, the application program provider may select one of multiple opcode value encoding schemes known to both the application program provider and the user device. According to one embodiment of the present invention, a cryptographic process is applied to the obfuscated application program together with a cryptographic key, to create an encrypted obfuscated application program. At 1515, the application program code is sent. According to one embodiment of the present invention, an application program provider performs processes 1510-1515 without receiving an application program request (1500). By way of example, the application program provider may provide a particular user device with an obfuscated application program at predetermined intervals.

FIGS. 16A-17B illustrate using a randomized process to generate a series of unique numbers and mapping the numbers to opcode values of an instruction set, in accordance with embodiments of the present invention. FIGS. 16A and 16B illustrate this process at a high level. FIGS. 17A and 17B illustrate an embodiment where the randomized process comprises a loop back hash function.

Turning now to FIG. 16A, a block diagram that illustrates generating a series of unique numbers for use as instruction set opcode values, using a randomized process in accordance with one embodiment of the present invention is presented. A randomized number generation process 1610 is executed one or more times to produce a bit sequence comprising a number series 1615. Filter 1620 removes duplicate values from the number series 1615 and the resulting unique values 1625 are used to build instruction set opcode values 1630. The number of bits comprising the number series 1615 is numerous enough to be partitioned into a plurality of bit sequences that uniquely identify opcode values within an instruction set.

Turning now to FIG. 16B, a flow diagram that illustrates a method for creating an instruction set opcode value encoding scheme, using a randomized process in accordance with one embodiment of the present invention is presented. FIG. 16B corresponds with FIG. 16A. At 1655, a randomized process is used to produce a number series. At 1660 duplicate numbers, if any, are filtered out of the series. At 1665, a one-to-one mapping between instruction implementation methods in an instruction set and numbers in the series is created. Processes 1655-1665 may be performed additional times to create additional mappings.

Turning now to FIG. 17A, a block diagram that illustrates generating a series of unique numbers for use as instruction set opcode values, using a loop back hash function in accordance with one embodiment of the present invention is presented. A loop back hash function 1710 receives a first number N1 and a cryptographic key 1705 and outputs a second number (1715). The loop back hash function 1710 may comprise any cryptographic hash function, such as the MD5 algorithm, the MD4 algorithm, the SHA-1 algorithm, or the like. According to one embodiment of the present invention, the first number N1 1700 is public and the cryptographic key 1705 is private. The first number 1700 may also be private. Filter 1720 removes duplicate values from the second number (1715) and the resulting unique values (1725) are used to build instruction set opcode values (1730). More particularly, successive outputs of filter 1720 are appended to create a series of bits numerous enough to be partitioned into a plurality of bit sequences that uniquely identify opcode values within an instruction set. Processes 1710 and 1720 are repeated until enough unique opcode values have been generated to assign a unique opcode value to each opcode in an instruction set. Successive applications of loop back hash function 1710 use at least part of the number (1715) produced from the previous application of the loop back hash function 1710.

As an example, suppose an instruction set uses 200 8-bit opcode values and the size of the first number 1700 is 140 bits. In this case, the second number 1700 must be at least 1,600 bits long (200*8=1,600). Thus, loop back hash function 1610 would need to be executed at least 12 times (1,600/140=11.42) to obtain a second number 1715 that may be partitioned into 200 unique 8-bit opcode values.

Turning now to FIG. 17B, a flow diagram that illustrates a method for creating an instruction set opcode value encoding scheme, using a loop back hash function in accordance with one embodiment of the present invention is presented. FIG. 17B corresponds with FIG. 17A. At 1750, a seed and a cryptographic key are selected. The cryptographic key may be based at least in part on a target ID, such as a VM ID. At 1755, a series of numbers based at least in part on the seed and the cryptographic key, where the size of the seed is smaller than the size of the series is created. According to one embodiment of the present invention, a loop back hash function is used to create the series of numbers. The cryptographic key and the seed are inputs for the loop back hash function. At 1760 duplicate numbers, if any, are filtered out of the series. At 1765, a one-to-one mapping between instruction implementation methods in an instruction set and numbers in the series is created. Processes 1750-1765 may be performed additional times to create additional mappings.

Figure 18:
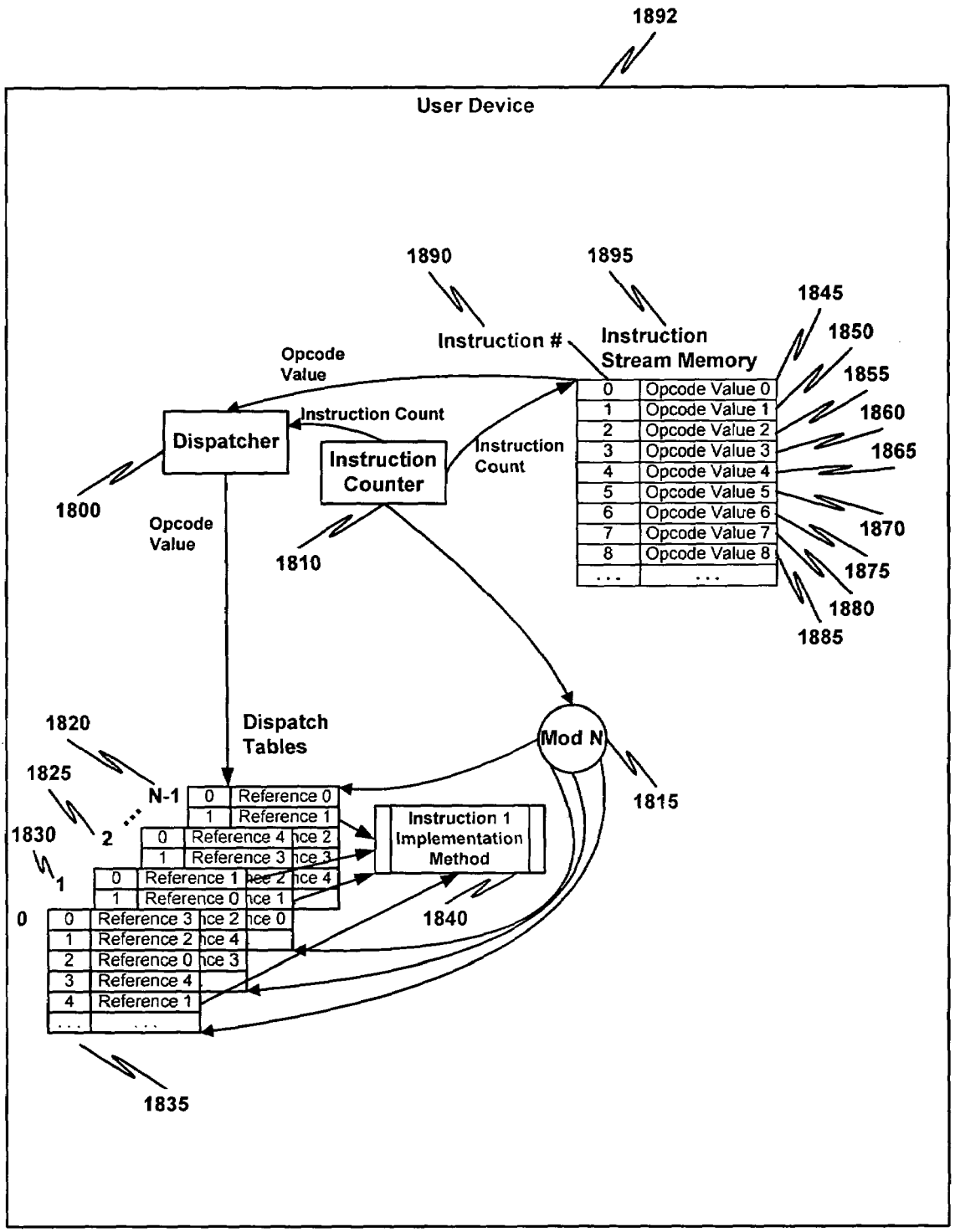
FIG. 18 is a detailed block diagram that illustrates execution of an application program obfuscated by transforming the application program into an application program having opcode values encoded based at least in part on an instruction counter value in accordance with one embodiment of the present invention.
Figure 19:
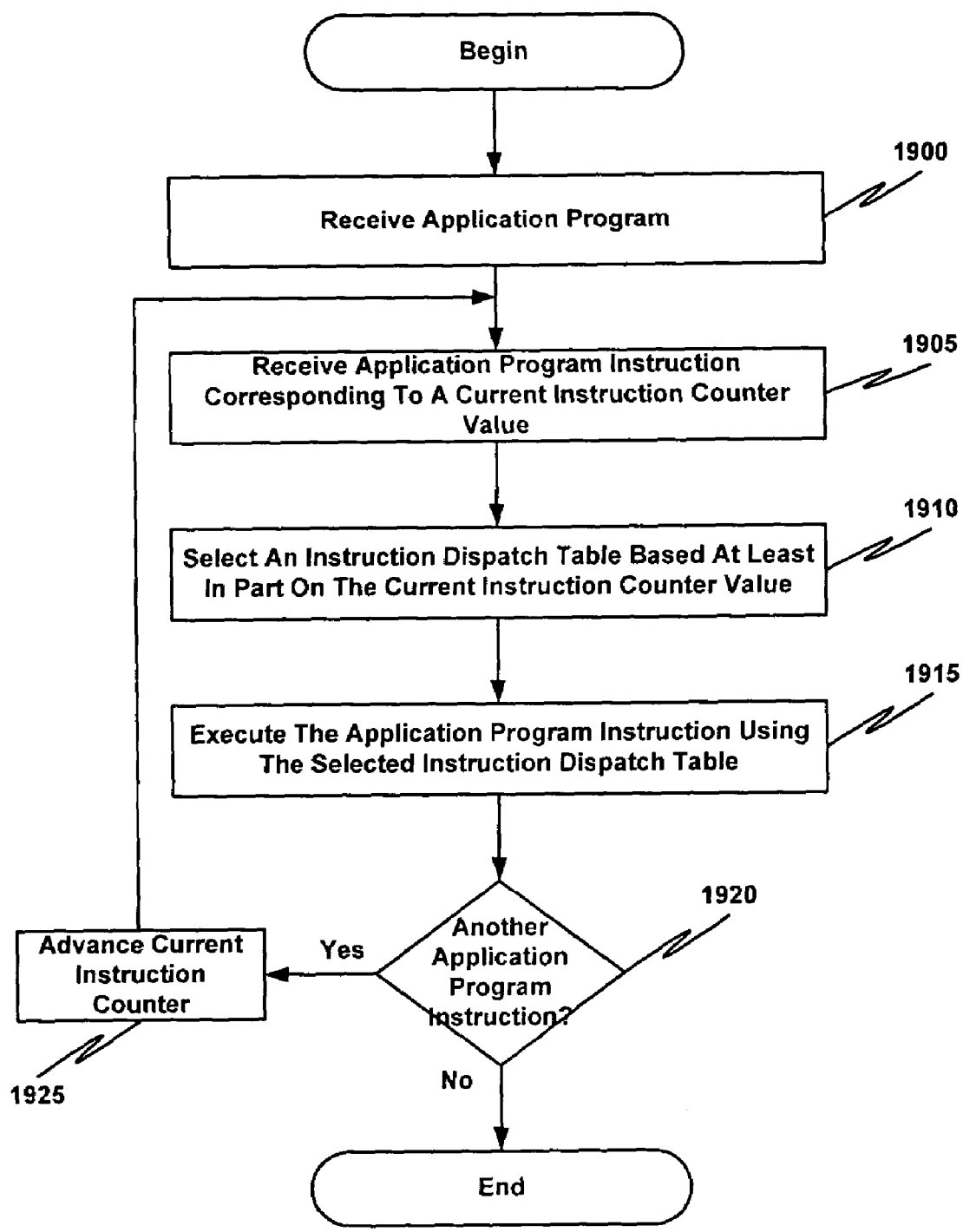
FIG. 19 is a flow diagram that illustrates a method for executing an application program obfuscated by transforming the application program into an application program having opcode values encoded based at least in part on an instruction counter value in accordance with one embodiment of the present invention.
Figure 20:
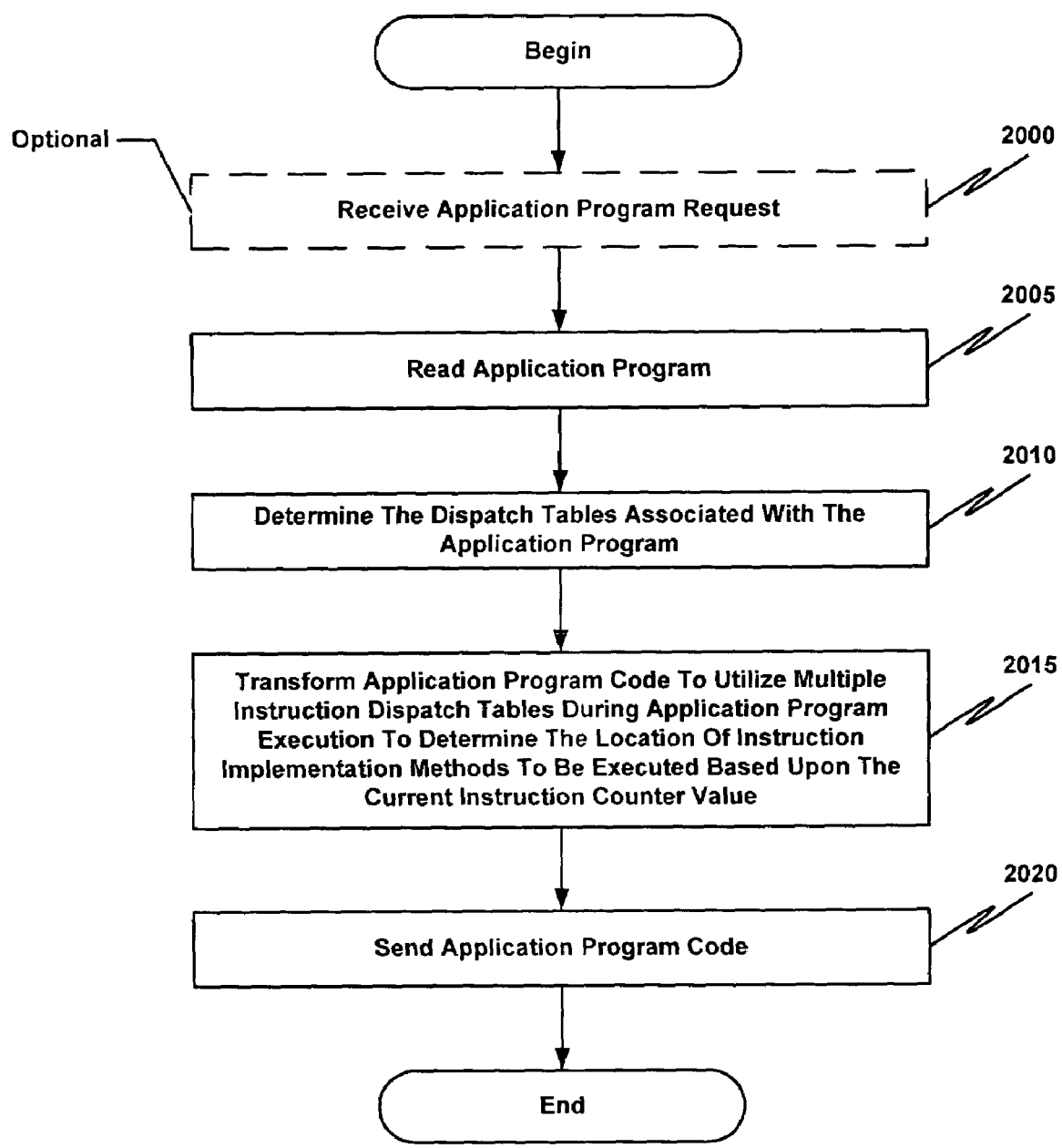
FIG. 20 is a flow diagram that illustrates a method for transforming an application program into an application program having opcode values encoded based at least in part on an instruction counter value in accordance with one embodiment of the present invention.

FIGS. 18-20 illustrate application program obfuscation by using alternate opcode value encoding schemes that are based at least in part on an instruction counter value in accordance with embodiments of the present invention. An application program provider determines the opcode value encoding scheme to use for different categories of instruction counter values and rewrites an application program using the chosen opcode value encoding scheme. A user device receives the obfuscated application program and associates dispatch tables with instruction counter categories based at least in part on the obfuscation method used to obfuscate the application program.

Turning now to FIG. 18, a detailed block diagram that illustrates execution of an application program obfuscated by transforming the application program into an application program having opcodes encoded based at least in part on an instruction counter value in accordance with one embodiment of the present invention is presented. User device 1892 comprises a dispatcher 1800 configured to determine which one of multiple dispatch tables (1820-1835) to use based at least in part on the value of an instruction counter 1810. According to one embodiment of the present invention, each dispatch table is associated with a number and the dispatch table to use for a particular instruction is determined by performing modulo-n arithmetic (1815) on the value of the instruction counter, where n is the number of dispatch tables. The table associated with the resulting number is used to obtain a reference to the instruction implementation method corresponding to the opcode value of the current instruction.

Using FIG. 18 as an example, four dispatch tables (1820-1835) are shown. The method body being executed 1895 includes opcode values 1845-1885, located at addresses indicated in column 1890. The dispatch table to use is determined by performing modulo-4 arithmetic on the addresses in column 1890. Thus, opcode values 1845, 1850, 1855, 1860, 1865, 1870, 1875, 1880, and 1885 use dispatch tables 1835, 1830, 1825, 1820, 1835, 1830, 1825, 1820, and 1835, respectively, to obtain a reference to a corresponding instruction implementation method.

The number of dispatch tables depicted in FIG. 18 is for purposes of illustration and is not intended to be limiting in any way. Those of ordinary skill in the art will recognize that a different number of dispatch tables may be used.

According to embodiments of the present invention, the number of dispatch tables (n) is based at least in part on the number of instructions in the largest method of an application program. According to one embodiment, the number of dispatch tables equals the number of instructions in the largest method of an application program. According to another embodiment, the number of dispatch tables is greater than or equal to the number of instructions in the largest method of an application program.

According to another embodiment of the present invention, the number of dispatch tables (n) is selected such that a predetermined percentage of methods are guaranteed to have a different dispatch table for each instruction.

According to another embodiment of the present invention, the number of dispatch tables (n) is based at least in part on the amount of available memory. By way of example, a first number of dispatch tables may be selected for use executing an application program when the amount of available memory is above a threshold, and second number of dispatch tables may be selected for use in executing the application program when the amount of available memory is below the threshold. The first number is greater than the second number.

Turning now to FIG. 19, a flow diagram that illustrates a method for executing an application program obfuscated by transforming the application program into an application program having opcodes encoded based at least in part on an instruction counter value in accordance with one embodiment of the present invention is presented. At 1900, an application program is received. At 1905, an application program instruction corresponding to a current instruction counter value is received. At 1910, an instruction dispatch table based at least in part on the current instruction counter value is selected. For example, an instruction dispatch table may be selected based at least in part on the result of performing a modulo n arithmetic operation on the current instruction counter value, where the value "n" is the number of dispatch tables. The instruction dispatch table may also be determined based at least in part on an obfuscation descriptor included with the received application program. Alternatively, the instruction dispatch table may be determined based at least in part on a configuration established at enrollment. At 1915, the application program instruction is executed using the selected instruction dispatch table. At 1920, a determination is made regarding whether there is another application program instruction to be executed. If there is another application program instruction to be executed, the current instruction counter is advanced at 1925 and the process continues at 1905.

Turning now to FIG. 20, a flow diagram that illustrates a method for transforming an application program into an application program having opcodes encoded based at least in part on an instruction counter value in accordance with one embodiment of the present invention is presented. At 2000, an application program request is received. At 2005, application program code corresponding to the request is read. At 2010, the dispatch tables associated with the application program are determined. At 2015, the application program code is transformed to utilize multiple instruction dispatch tables during application program execution to determine the location of instruction implementation methods to be executed based at least in part on the current instruction counter value. According to one embodiment of the present invention, a cryptographic process is applied to the obfuscated application program together with a cryptographic key, to create an encrypted obfuscated application program. At 2020, the application program code is sent. According to one embodiment of the present invention, an application program provider performs processes 2005-2020 without receiving an application program request (2000). By way of example, the application program provider may provide a particular user device with an obfuscated application program at predetermined intervals.

According to one embodiment of the present invention, the determining process (2010) is based at least in part on the relative frequency of instructions. The multiple instruction dispatch tables are filtered so that the frequency distribution of opcode values over the whole set of instructions is flattened out, decreasing the magnitude of frequency spikes over the whole application program and thus making it more difficult to determine an opcode value-to-instruction implementation method mapping based on the number of times a particular opcode value occurs in an application program.

FIGS. 21A-30 illustrate application program obfuscation by nonlinear execution of an obfuscated application program in accordance with embodiments of the present invention. An application program provider determines instruction counter permutations to apply to application program instructions and rewrites an application program using the instruction counter permutations. A user device receives the obfuscated application program and applies the instruction counter permutations upon application program execution.

Turning now to FIG. 21A, a block diagram that illustrates a linear application program execution order is presented. As shown in FIG. 21A, the location of the next instruction to execute can be determined based at least in part on the current instruction. If the current instruction is a jump instruction (2155, 2160), the next instruction is the address specified in the jump instruction (2165, 2170). If the current instruction is not a jump instruction, the next instruction to execute is determined by advancing the current instruction address.

Turning now to FIG. 21B, a detailed block diagram that illustrates application program obfuscation by nonlinear application program execution order in accordance with one embodiment of the present invention is presented. User device 2135 comprises an instruction permuter 2110 that receives an instruction counter value 2195 and permutes it to create a permuted instruction counter value 2182. The permuted instruction counter value 2182 is used to access the address of the instruction to execute in instruction stream memory 2115. A dispatch table 2185 maintains an association between opcode values and references to instruction implementation methods 2190. According to one embodiment of the present invention, the instruction permutation may be based at least in part on the size of an instruction cache.

Turning now to FIG. 21C, a detailed block diagram that illustrates nonlinear execution of an obfuscated application program in accordance with one embodiment of the present invention is presented. User device 2140 comprises an instruction location permutation table 2125 that includes multiple entries, where each entry determines how instruction counter value 2192 is modified. The modified instruction counter value 2184 is used to access the address of the instruction to execute in interleaved instruction stream memory 2130. A dispatch table 2175 maintains an association between opcode values and references to instruction implementation methods 2180. Interleaved instruction stream memory 2130 is interspersed with executable instructions of an application program, and other data. The other data may be formatted to look like valid instructions.

An application program configured for nonlinear execution makes it relatively difficult for an attacker to determine the execution order of instructions in an application program, merely by examining the application program instructions. This is because the order that instructions appear in a program file has nothing to do with the order the instructions are executed. Using FIG. 21B as an example, examination of instruction stream memory 2115 reveals the instructions that are executed but not the order in which they are executed.

According to one embodiment of the present invention, a single dispatch table 2175 is used to determine the instruction implementation method 2180, regardless of the instruction permutation. According to another embodiment of the present invention, application program obfuscation includes both nonlinear execution and opcodes encoded corresponding to one of multiple dispatch tables. According to another embodiment of the present invention, application program obfuscation includes both nonlinear execution and opcodes encoded corresponding to one of multiple instruction tables based at least in part on an instruction counter value.

Figure 22:
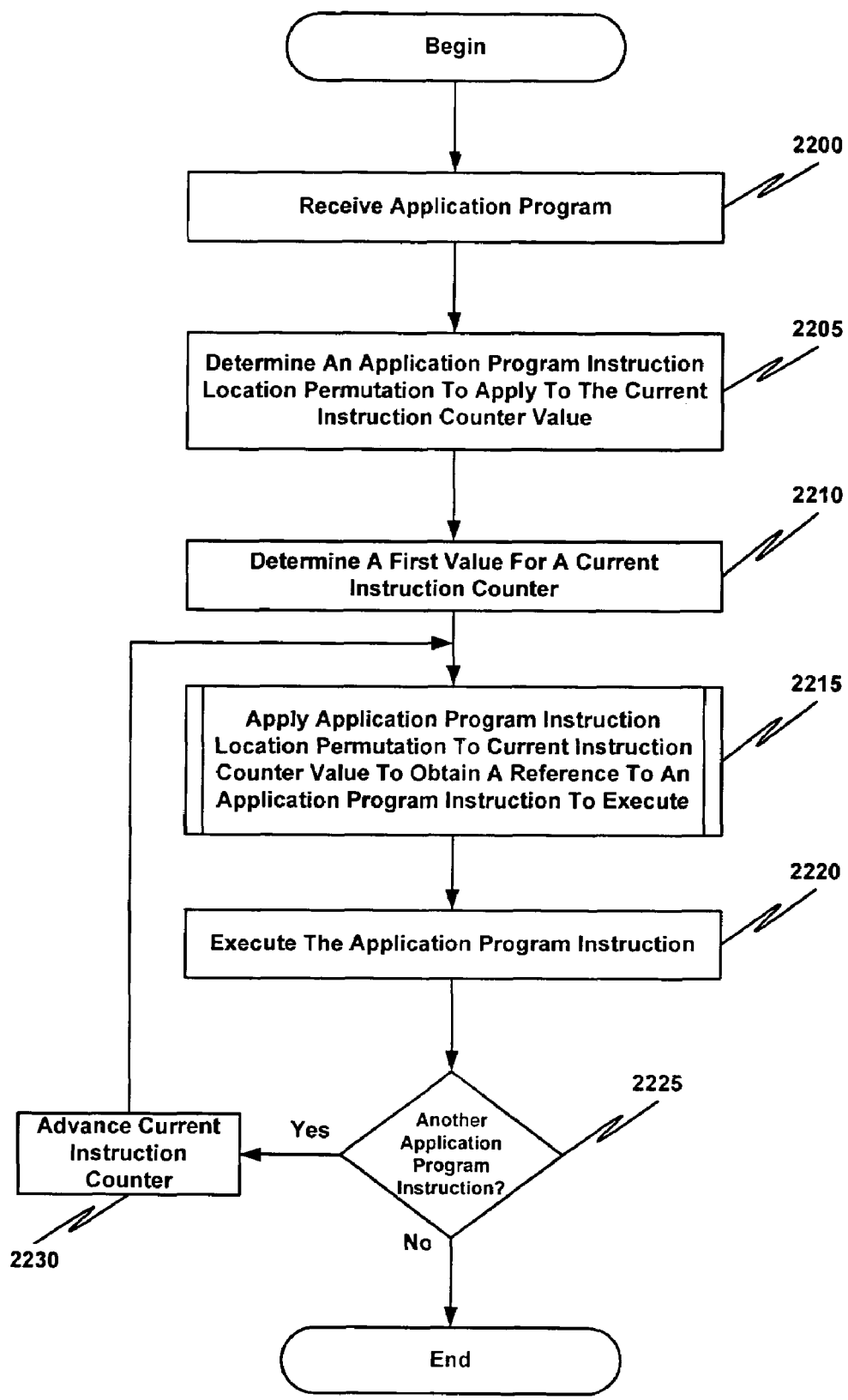
FIG. 22 is a flow diagram that illustrates a method for nonlinear execution of an obfuscated application program in accordance with one embodiment of the present invention.

Turning now to FIG. 22, a flow diagram that illustrates nonlinear execution of an obfuscated application program in accordance with one embodiment of the present invention is presented. At 2200, an application program is received. At 2205, an application program instruction location permutation to apply to the current instruction counter value is determined. The application program instruction location permutation may be determined based at least in part on an obfuscation descriptor included with the received application program. Alternatively, the application program instruction location permutation may be determined based at least in part on a configuration established at enrollment. At 2210, a first value for a current instruction counter is determined. At 2215, the application program instruction location permutation is applied to the current instruction counter value to obtain a reference to an application program instruction to execute. At 2220, the application program instruction to execute is executed. At 2225, a determination is made regarding whether there is another application program instruction to execute. If there is another application program instruction to be executed, the current instruction counter is advanced at 2230 and the process continues at 2215.

Figure 23:
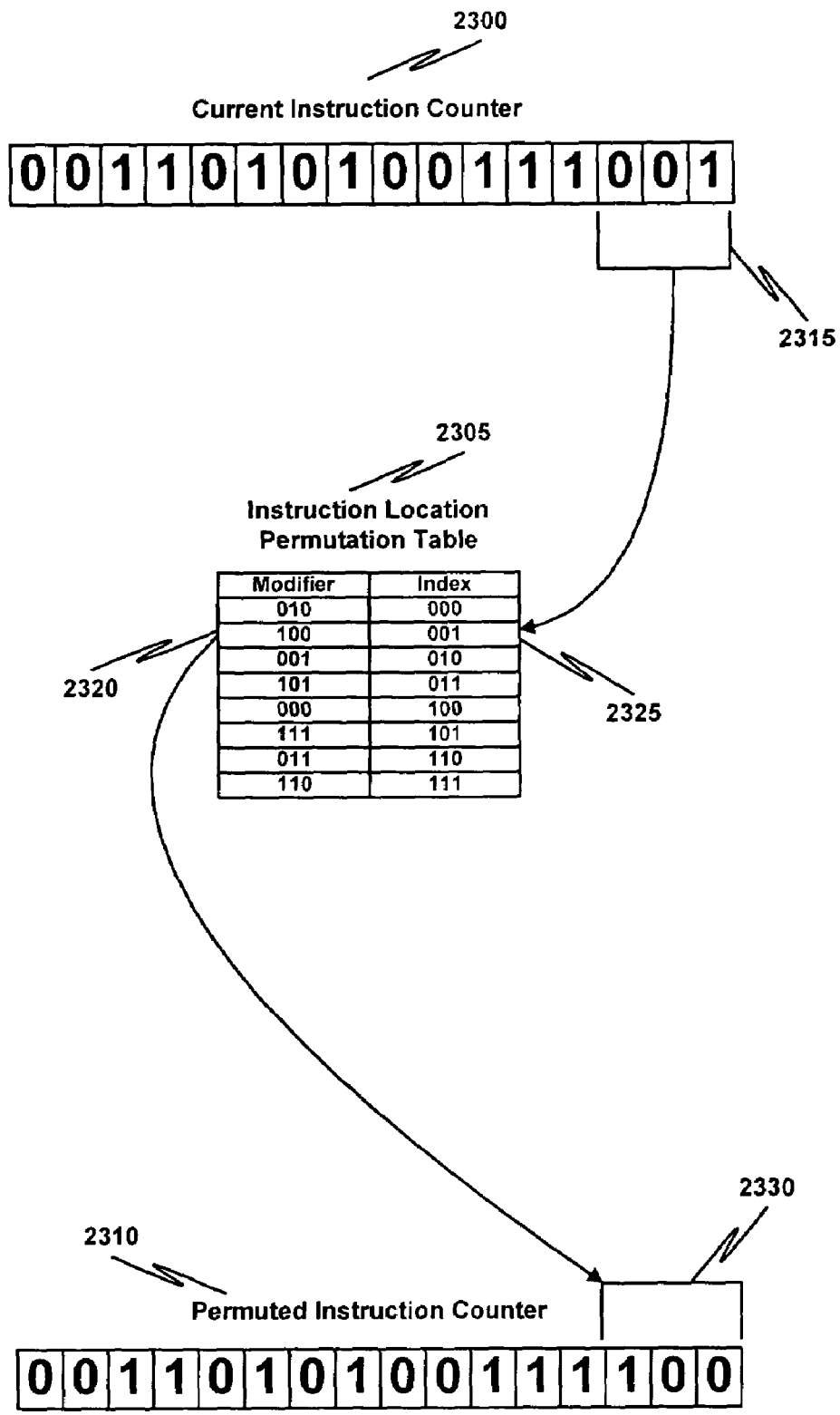
FIG. 23 is a block diagram that illustrates applying an application program instruction location permutation that substitutes the low order bits of the current instruction counter value to obtain a reference to an application program instruction to execute, in accordance with one embodiment of the present invention.
Figure 24:
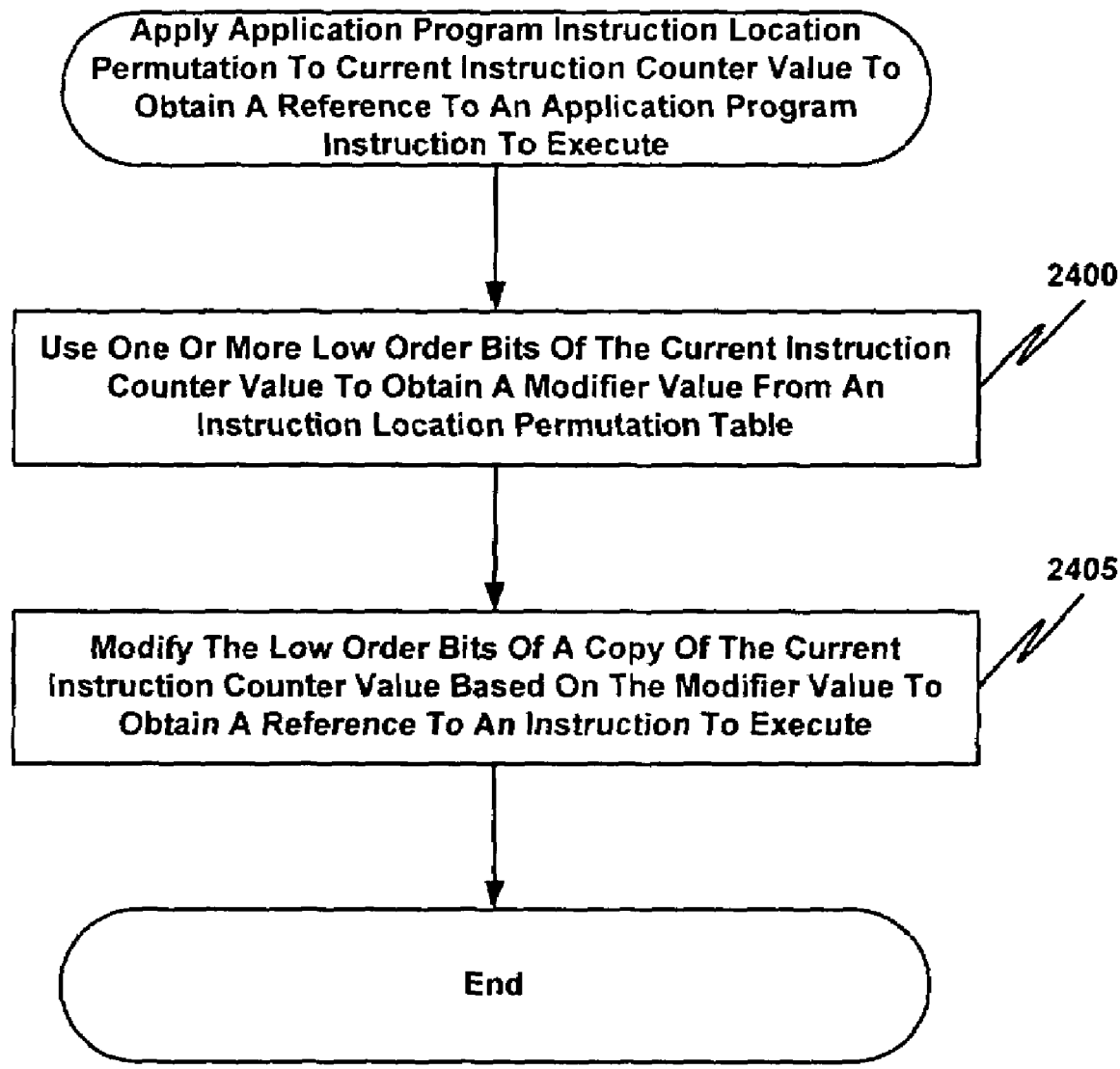
FIG. 24 is a flow diagram that illustrates a method for applying an application program instruction location permutation that substitutes the low order bits of the current instruction counter value to obtain a reference to an application program instruction to execute, in accordance with one embodiment of the present invention.
Figure 25:
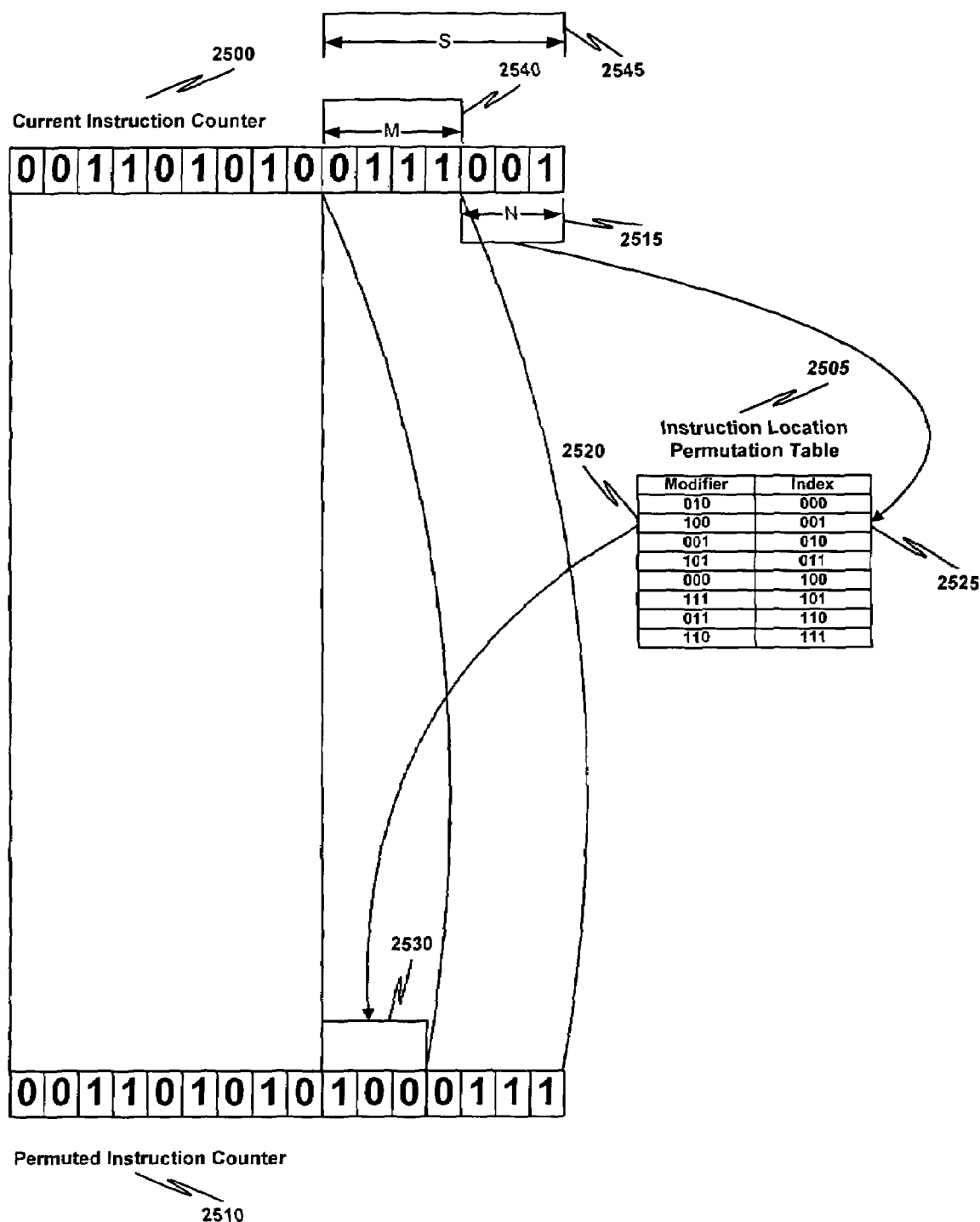
FIG. 25 is a block diagram that illustrates applying an application program instruction location permutation that uses low order bits of the current instruction counter value to determine how to modify high order bits of the instruction counter value to obtain a reference to an application program instruction to execute, in accordance with one embodiment of the present invention.
Figure 26:
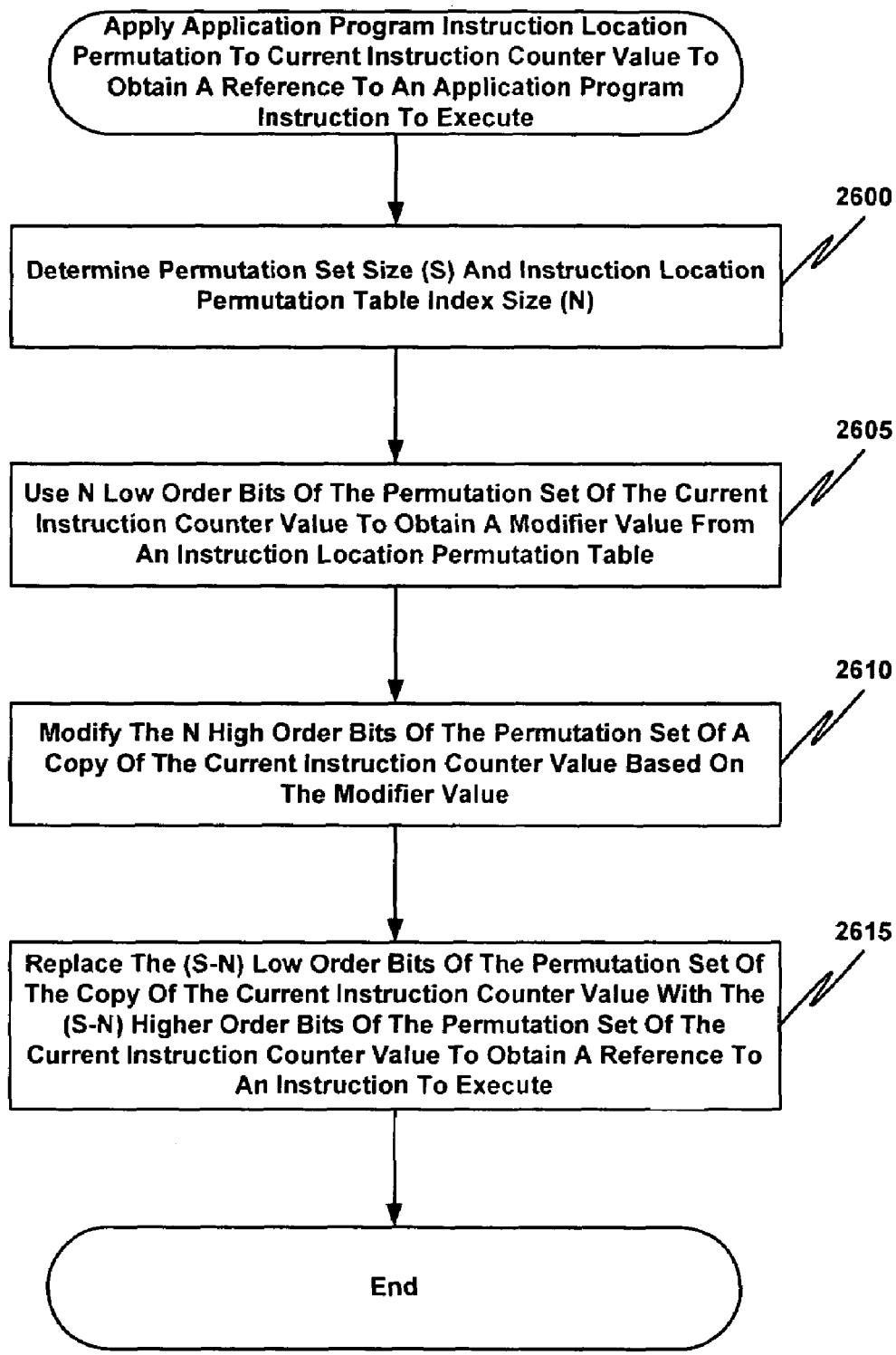
FIG. 26 is a flow diagram that illustrates a method for applying an application program instruction location permutation that uses low order bits of the current instruction counter value to determine how to modify high order bits of the instruction counter value to obtain a reference to an application program instruction to execute, in accordance with one embodiment of the present invention.
Figure 27:
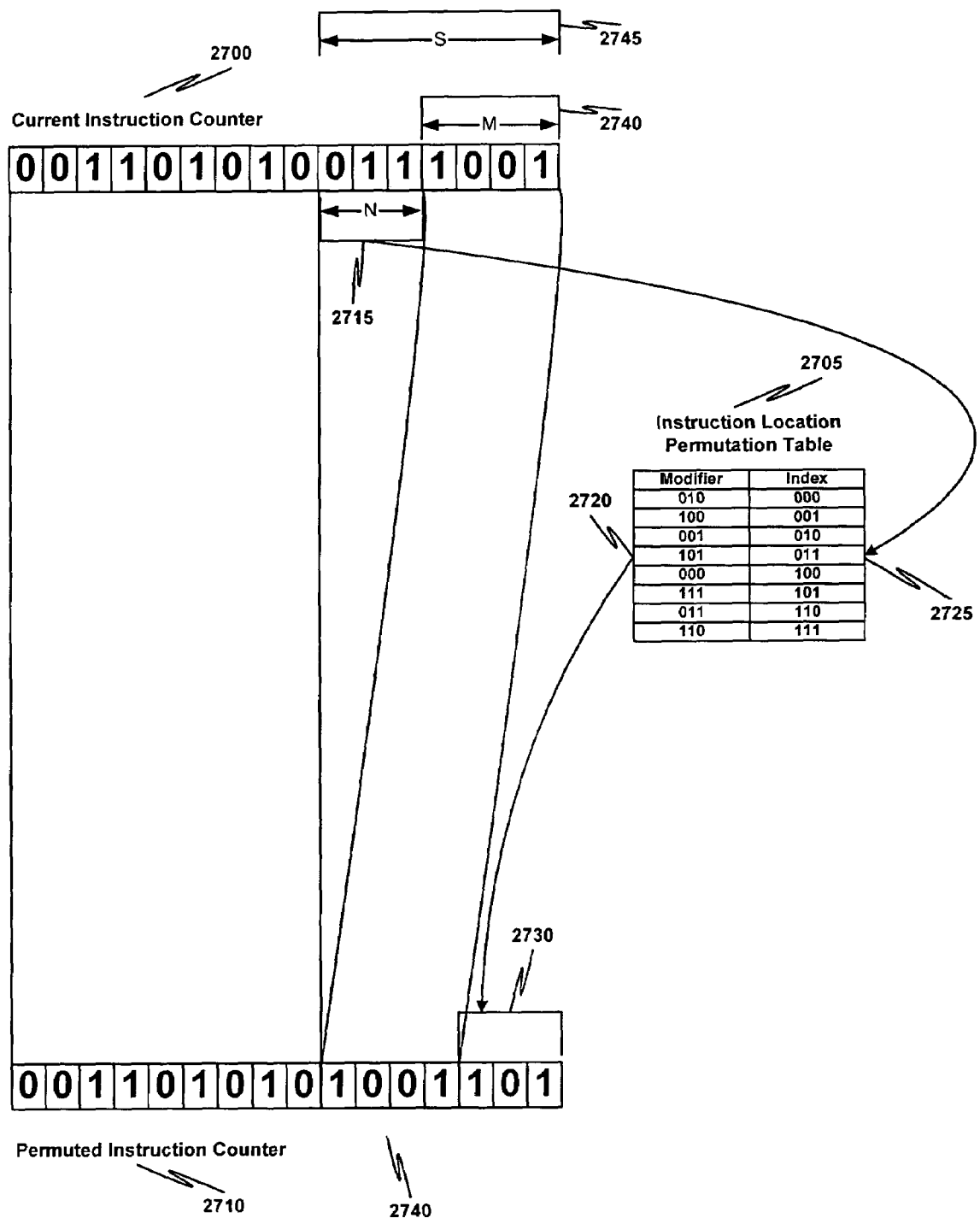
FIG. 27 is a block diagram that illustrates applying an application program instruction location permutation that uses high order bits of the current instruction counter value to determine how to modify low order bits of the instruction counter value to obtain a reference to an application program instruction to execute, in accordance with one embodiment of the present invention.
Figure 28:
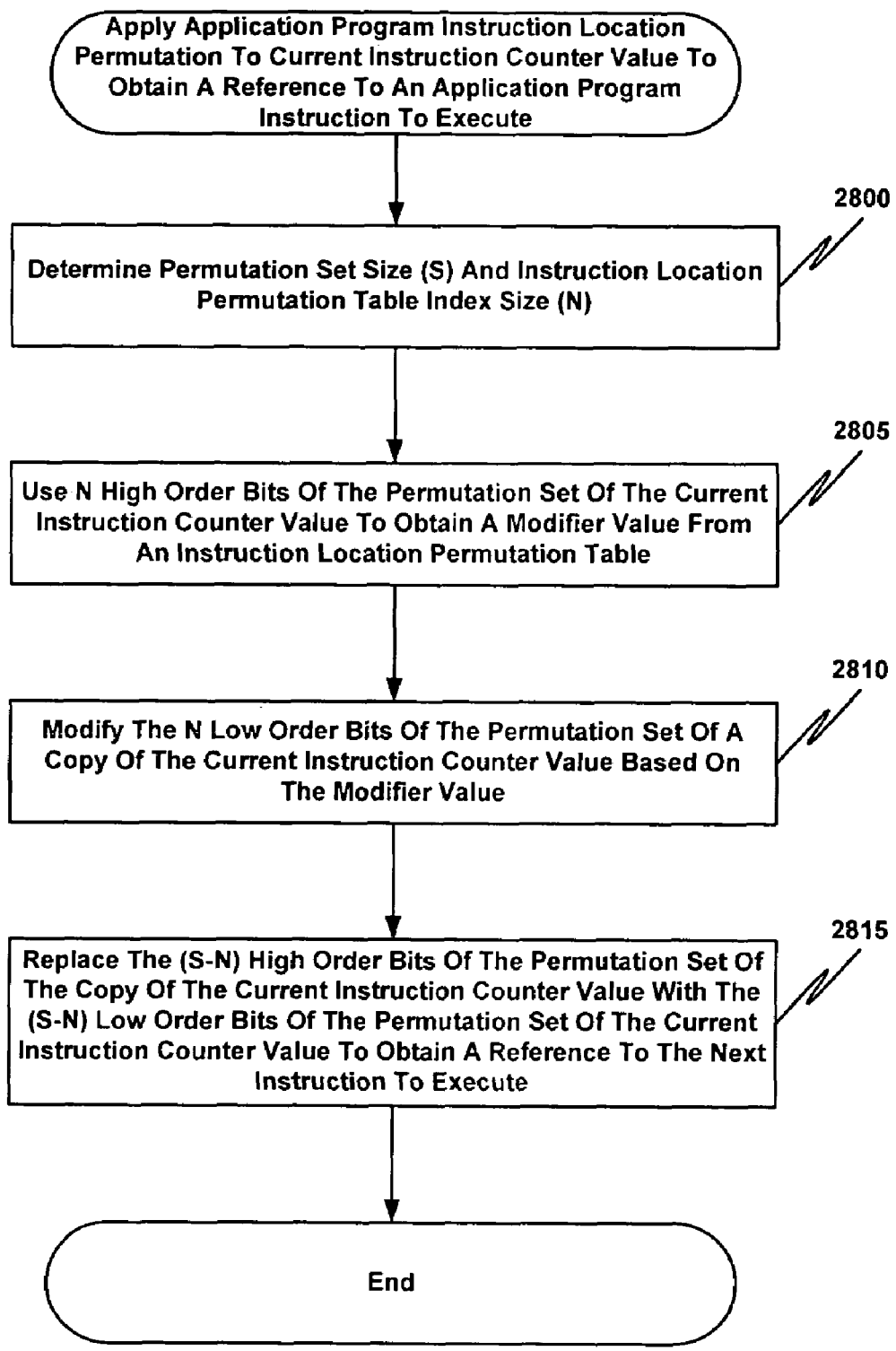
FIG. 28 is a flow diagram that illustrates a method for applying an application program instruction location permutation that uses high order bits of the current instruction counter value to determine how to modify low order bits of the instruction counter value to obtain a reference to an application program instruction to execute, in accordance with one embodiment of the present invention.
Figure 29:
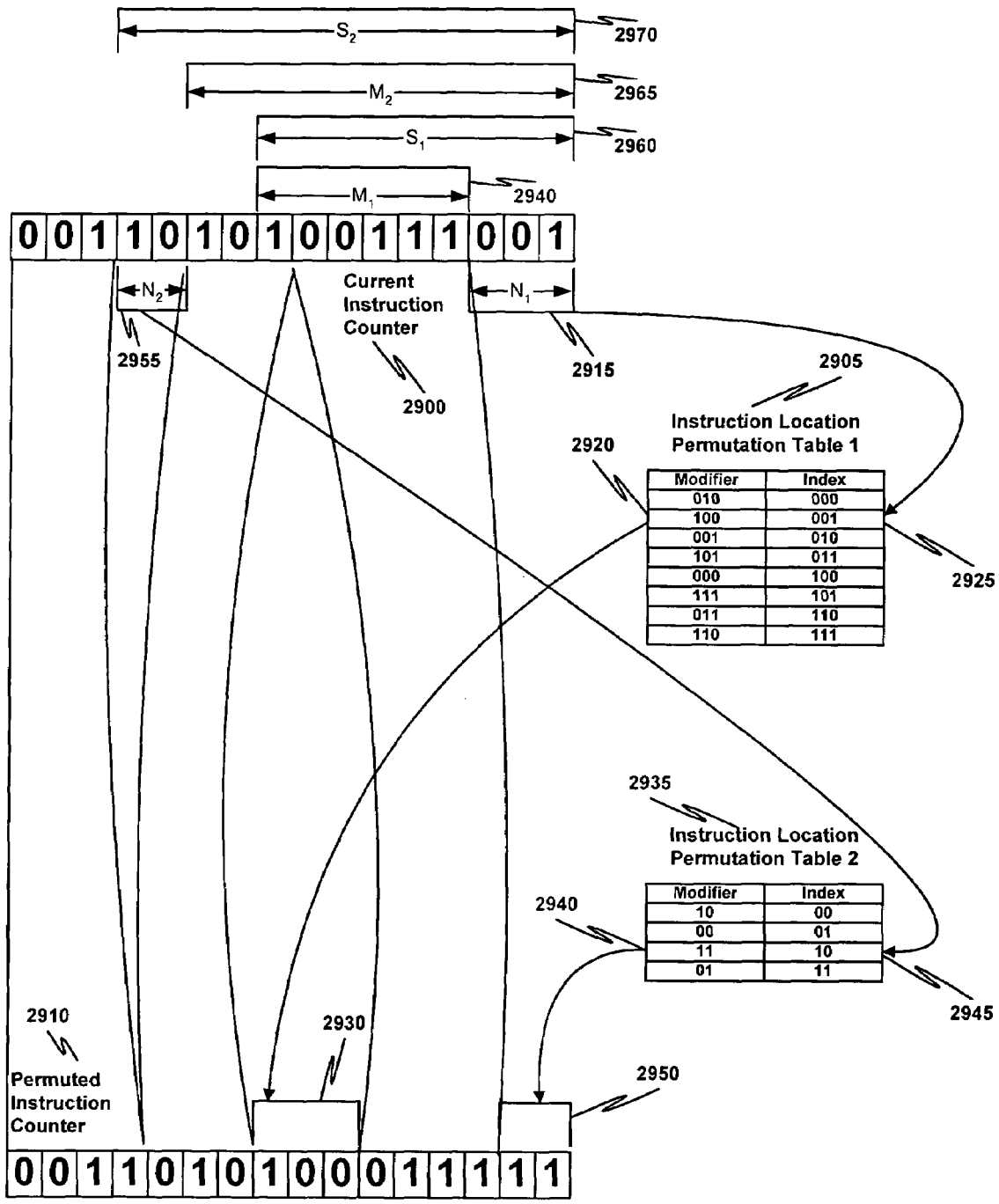
FIG. 29 is a block diagram that illustrates applying an application program instruction location permutation that both (1) uses low order bits of the current instruction counter value to determine how to modify high order bits of the instruction counter value and (2) uses high order bits of the current instruction counter value to determine how to modify low order bits of the instruction counter value to obtain a reference to an application program instruction to execute, in accordance with one embodiment of the present invention.

FIGS. 23-29 illustrate applying an application program instruction location permutation to a current instruction counter value to obtain a reference to an application program instruction to execute, in accordance with embodiments of the present invention. FIGS. 23-24 illustrate an application program instruction location permutation that substitutes the low order bits of the current instruction counter value. FIGS. 25-26 illustrate an application program instruction location permutation that uses low order bits of the current instruction counter value to determine how to modify high order bits of the instruction counter value. FIGS. 27-28 illustrate an application program instruction location permutation that uses high order bits of the current instruction counter value to determine how to modify low order bits of the instruction counter value. FIG. 29 illustrates an application instruction location permutation that both (1) uses low order bits of the current instruction counter value to determine how to modify high order bits of the instruction counter value and (2) uses high order bits of the current instruction counter value to determine how to modify low order bits of the instruction counter value.

Referring now to FIG. 23, the low order bits 2315 of current instruction counter 2300 are used as an index into an instruction location permutation table 2305. Instruction location permutation table 2305 comprises indexed entries that indicate a modifier value 2320 to substitute for the low order bits 2315 of the current instruction counter 2300. As shown in FIG. 23, the value of low order bits "001" (2315) is associated with modifier value "100" (2320). Thus, low order bits 2315 of current instruction counter 2300 are replaced with modifier value 2320 to create a permuted instruction counter 2310 that is the same as the current instruction counter 2300 except for the low order bits 2330.

FIG. 24 is a flow diagram that illustrates a method for applying an application program instruction location permutation that substitutes the low order bits of the current instruction counter value to obtain a reference to an application program instruction to execute, in accordance with one embodiment of the present invention. FIG. 24 corresponds with FIG. 23. At 2400, one or more low order bits of the current instruction counter value are used to obtain a modifier value from an instruction location permutation table. At 2405, the low order bits of a copy of the current instruction counter value are modified based on the modifier value to obtain a reference to an instruction to execute. According to one embodiment of the present invention, the low order bits of a copy of the current instruction counter value are replaced by the modifier value. According to another embodiment of the present invention, the modifier value is added to the low order bits of a copy of the current instruction counter value. According to another embodiment of the present invention, the modifier value is subtracted from the low order bits of a copy of the current instruction counter value. Those of ordinary skill in the art will recognize that other modifications are possible.

Referring now to FIG. 25, a permutation set 2545 comprises N low order bits 2515 and M high order bits 2540 of current instruction counter 2500. The low order bits 2515 are used as an index into an instruction location permutation table 2505. Instruction location permutation table 2505 comprises indexed entries that indicate a modifier value 2520 to use for the high order bits 2530 of the permuted instruction counter 2510. Permuted instruction counter 2510 is initialized to the same value as current instruction counter 2500. The M high order bits 2540 in the current instruction counter 2540 are shifted or moved to the M low order bits of permuted instruction counter 2510. As shown in FIG. 25, the value of the N low order bits "001" (252) is associated with modifier value "100" (2520). Thus, the N high order bits 2530 of permuted instruction counter 2510 are replaced with modifier value "100" (2520).

FIG. 26 is a flow diagram that illustrates a method for applying an application program instruction location permutation that uses low order bits of the current instruction counter value to determine how to modify high order bits of the instruction counter value to obtain a reference to an application program instruction to execute, in accordance with one embodiment of the present invention. FIG. 26 corresponds with FIG. 25. At 2600, a permutation set size (S) and an instruction location permutation table index size (N) are determined. At 2605, the N low order bits of the permutation set of the current instruction counter value are used to obtain a modifier value from an instruction location permutation table. At 2610, the N high order bits of the permutation set of a copy of the current instruction counter value are modified based on the modifier value. According to one embodiment of the present invention, the N high order bits of the permutation set of a copy of the current instruction counter value are replaced by the modifier value. According to another embodiment of the present invention, the modifier value is added to the N high order bits of the permutation set of a copy of the current instruction counter value. According to another embodiment of the present invention, the modifier value is subtracted from the N high order bits of the permutation set of a copy of the current instruction counter value. At 2615, the (S-N) lower order bits of the permutation set of the current instruction counter value are replaced with the (S-N) higher order bits of the permutation set of the current instruction counter value to obtain a reference to an instruction to execute.

Referring now to FIG. 27, a permutation set 2745 comprises N high order bits 2715 and M low order bits 2740 of current instruction counter 2700. The high order bits 2715 are used as an index into an instruction location permutation table 2705. Instruction location permutation table 2705 comprises indexed entries that indicate a modifier value 2720 to use for the low order bits 2730 of the permuted instruction counter 2710. Permuted instruction counter 2710 is initialized to the same value as current instruction counter 2700. The M low order bits 2740 in the current instruction counter 2740 are shifted or moved to the M high order bits of permuted instruction counter 2710. As shown in FIG. 27, the value of the N high order bits "011" (2725) is associated with modifier value "101" (2720). Thus, the N low order bits 2730 of permuted instruction counter 2710 are replaced with modifier value "101" (2720).

FIG. 28 is a flow diagram that illustrates a method for applying an application program instruction location permutation that uses high order bits of the current instruction counter value to determine how to modify low order bits of the instruction counter value to obtain a reference to an application program instruction to execute, in accordance with one embodiment of the present invention. FIG. 28 corresponds with FIG. 27. At 2800, a permutation set size (S) and an instruction location permutation table index size (N) are determined. At 2805, the N high order bits of the permutation set of the current instruction counter value are used to obtain a modifier value from an instruction location permutation table. At 2810, the N low order bits of the permutation set of a copy of the current instruction counter value are modified based on the modifier value. According to one embodiment of the present invention, the N low order bits of the permutation set of a copy of the current instruction counter value are replaced by the modifier value. According to another embodiment of the present invention, the modifier value is added to the N low order bits of the permutation set of a copy of the current instruction counter value. According to another embodiment of the present invention, the modifier value is subtracted from the N low order bits of the permutation set of a copy of the current instruction counter value. At 2815, the (S-N) higher order bits of the permutation set of the current instruction counter value are replaced with the (S-N) lower order bits of the permutation set of the current instruction counter value to obtain a reference to an instruction to execute.

FIG. 29 illustrates using multiple instruction location permutation tables to create a permuted instruction counter. As shown in FIG. 29, a first permutation set 2960 comprises $N_1$ low order bits 2915 and $M_1$ high order bits 2940 of current instruction counter 2900. The low order bits 2915 are used as an index into a first instruction location permutation table 2905. Instruction location permutation table 2905 comprises indexed entries that indicate a modifier value 2920 to use for the high order bits 2930 of the permuted instruction counter 2910. Permuted instruction counter 2910 is initialized to the same value as current instruction counter 2900. The $M_1$ high order bits 2940 in the current instruction counter 2940 are shifted or moved to the $M_1$ low order bits of permuted instruction counter 2910. As shown in FIG. 29, the value of the $N_1$ low order bits "001" (2925) is associated with modifier value "100" (2920). Thus, the $N_1$ high order bits 2930 of permuted instruction counter 2910 are replaced with modifier value "100" (2920).

Still referring to FIG. 29, a second permutation set 2970 comprises $N_2$ high order bits 2955 and $M_2$ low order bits 2965 of current instruction counter 2900. The high order bits 2955 are used as an index into a second instruction location permutation table 2935. Instruction location permutation table 2935 comprises indexed entries that indicate a modifier value 2920 to use for the low order bits 2950 of the permuted instruction counter 2910. Permuted instruction counter 2910 is initialized to the same value as current instruction counter 2900. The $M_2$ low order bits 2965 in the current instruction counter 2900 are shifted or moved to the $M_2$ high order bits of permuted instruction counter 2910. As shown in FIG. 29, the value of the $N_2$ high order bits "10" (2945) is associated with modifier value "11" (2940). Thus, the $N_2$ low order bits 2950 of permuted instruction counter 2910 are replaced with modifier value "11" (2940).

According to one embodiment of the present invention, an instruction counter permutation operation comprises an increment operation. In other words, the instruction counter is implicitly incremented by performing a permutation on the previous address.

FIGS. 23-29 are for purposes of illustration only and are not intended to be limiting in any way. Those of ordinary skill in the art will recognize that the number of bits used to index an instruction location permutation table 2305 (FIG. 23) may be more than or less than what is illustrated. Furthermore, the particular bits selected to index the instruction location permutation table 2305, as well as the particular bits selected to be modified may differ from what is shown in FIGS. 23-29. Additionally, more than two instruction location permutation tables may be used.

Figure 30:
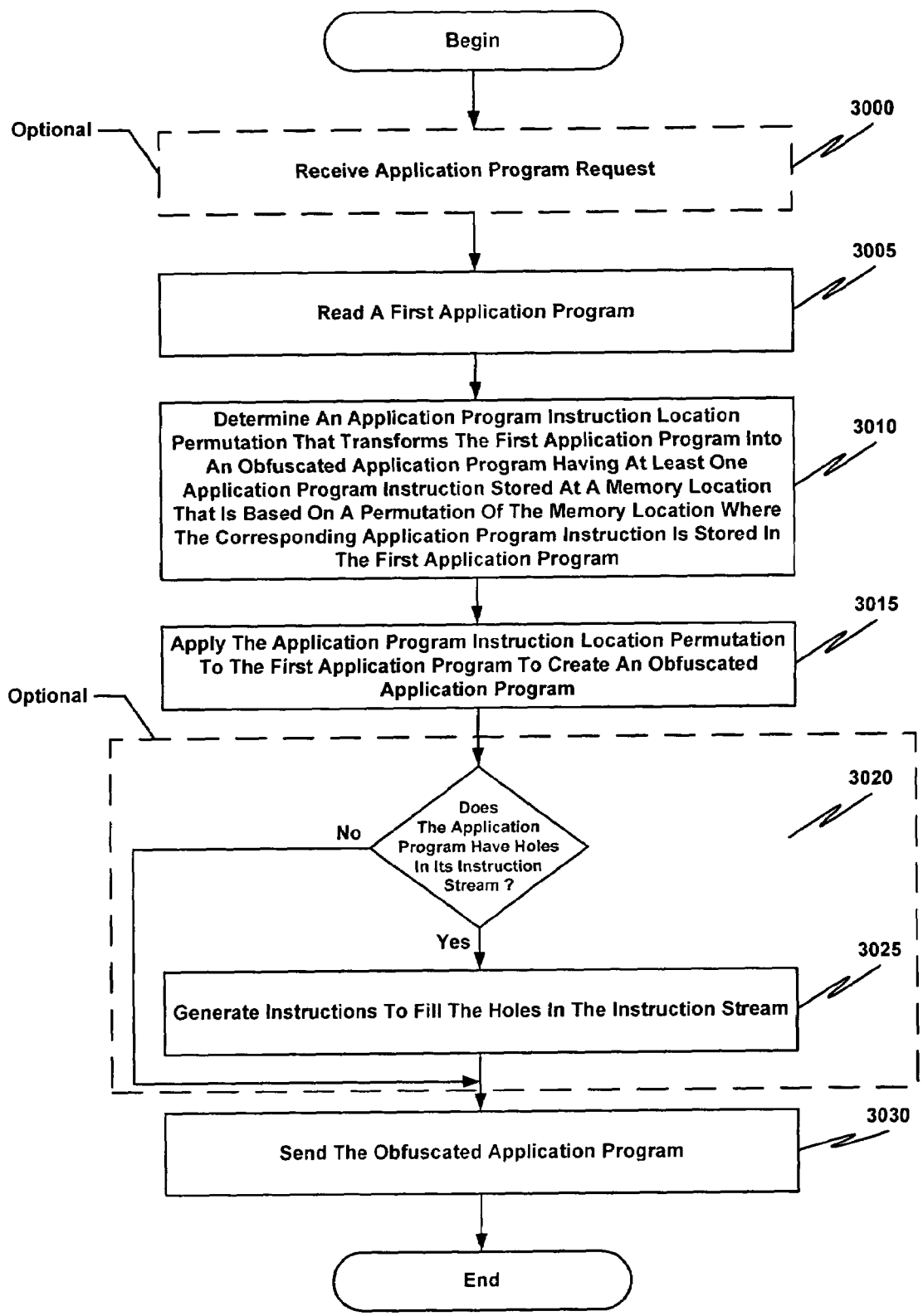
FIG. 30 is a flow diagram that illustrates a method for transforming an application program into an obfuscated application program for nonlinear execution in accordance with one embodiment of the present invention.

Turning now to FIG. 30, a flow diagram that illustrates a method for transforming an application program into an obfuscated application program for nonlinear execution in accordance with one embodiment of the present invention is presented. At 3000, an application program request is received. At 3005, application program code corresponding to the request is read. At 3010, an application program instruction location permutation that transforms the application program into an obfuscated application program having at least one application program instruction stored at a memory location that is based at least in part on a permutation of the memory location where the corresponding application program instruction is stored in the deobfuscated application program is determined. At 3015, the application program instruction location permutation is applied to the application program to create an obfuscated application program.

According to one embodiment of the present invention, an application program is obfuscated by inserting one or more "holes" in the instruction stream of the application program. A "hole" in this context denotes a part of an instruction stream that is not executed during normal execution of the application program. A hole may comprise valid instructions. A hole may also comprise randomized data.

Referring again to FIG. 30, reference numerals 3020 and 3025 apply if the obfuscation method used includes inserting holes in an instruction stream. At 3020, a determination is made regarding whether the application program has holes in the instruction stream. If the application program has holes in the instruction stream, at 3025 instructions are generated to fill the holes. According to one embodiment of the present invention, a randomized process is used to generate instructions to fill the holes. According to another embodiment of the present invention, the instructions generated to fill the holes are selected so as to appear as valid code segments. By way of example, improbable or nonsensical instruction sequences are avoided. According to one embodiment of the present invention, a cryptographic process is applied to the obfuscated application program together with a cryptographic key, to create an encrypted obfuscated application program. At 3030, the obfuscated application program is sent. According to one embodiment of the present invention, an application program provider performs processes 3005-3030 without receiving an application program request (3000). By way of example, the application program provider may provide a particular user device with an obfuscated application program at predetermined intervals.

FIGS. 31-35 illustrate application program obfuscation by nonlinear execution of an obfuscated application program having application program instructions interleaved with application program data in an instruction stream in accordance with embodiments of the present invention. An application program provider determines instruction counter permutations to apply to application program instructions. The application program provider also determines data location counter permutations to apply to data location counter values. The application program provider rewrites the application program using the chosen instruction counter permutations and data location counter permutations. A user device receives the obfuscated application program and applies the instruction counter permutations and data location permutations upon application program execution.

Figure 31:
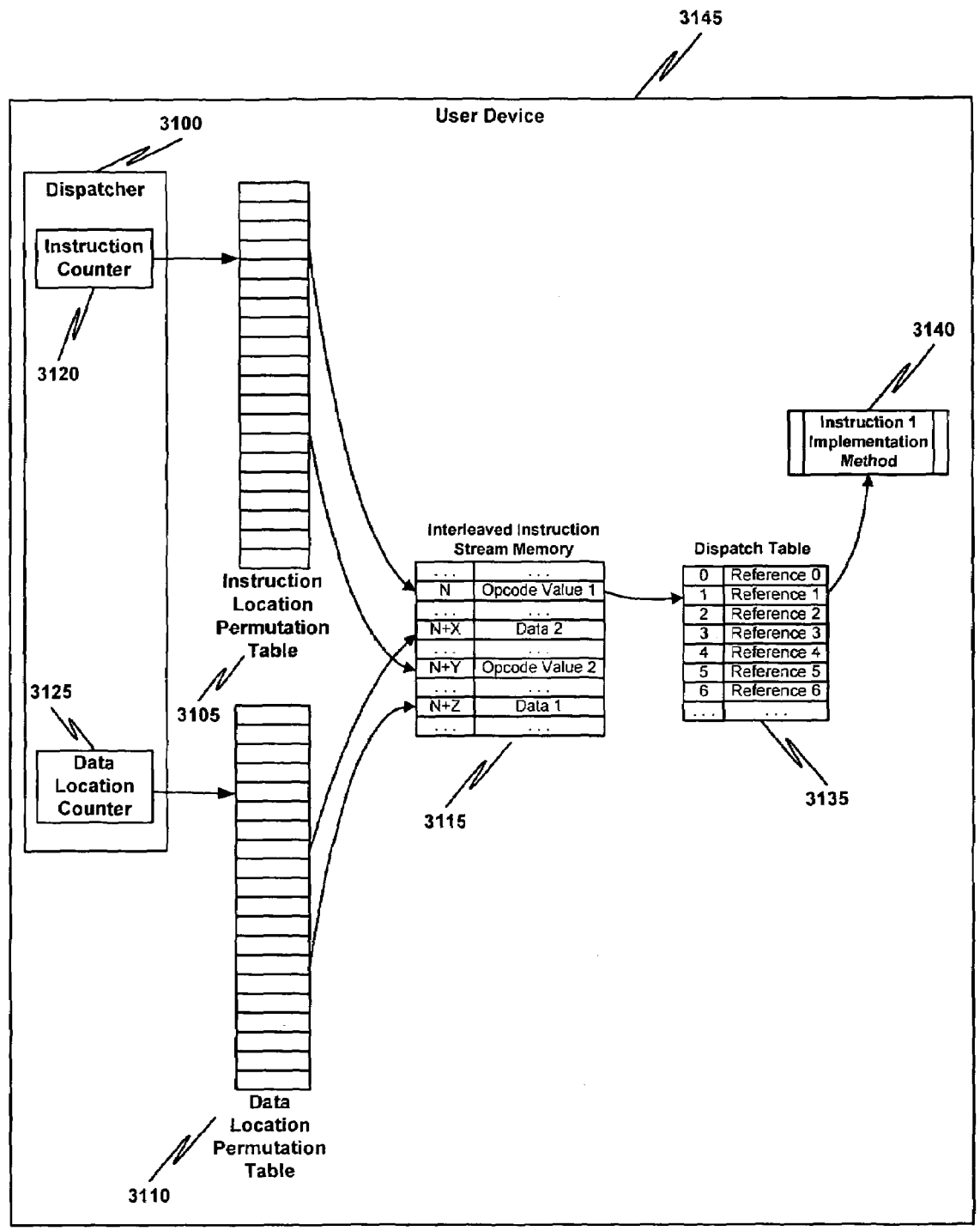
FIG. 31 is a detailed block diagram that illustrates a nonlinear application program execution order having application program instructions interleaved with application program data in an instruction stream in accordance with one embodiment of the present invention.

Turning now to FIG. 31, a detailed block diagram that illustrates application program obfuscation by nonlinear execution of an application program having application program instructions interleaved with application program data in an instruction stream in accordance with one embodiment of the present invention is presented. User device 3145 comprises an instruction location permutation table 3105 that includes multiple entries, where each entry determines how instruction counter 3120 is modified to create a modified instruction counter. The modified instruction counter is used to access an instruction to execute. Similarly, data location permutation table 3110 includes multiple entries, where each entry determines how data location counter 3125 is modified to create a modified data location counter. The modified data location counter is used to access the data referenced by the instruction to execute.

According to one embodiment of the present invention, an operating system provides an application level application program access to the data within the interleaved instruction stream memory. A special data naming convention may be used to indicate an application level request for data comprises a request for data within the interleaved instruction memory.

According to one embodiment of the present invention, the application program data interleaved into instruction stream memory 3115 comprises at least one cryptographic key for use in decrypting protected data. The protected data may be stored elsewhere within the interleaved instruction stream memory 3115. The protected data may also be stored in another memory on the user device.

According to one embodiment of the present invention, the data within the interleaved instruction stream memory comprises data formatted to appear like one or more valid instructions. According to another embodiment of the present invention, the data within the interleaved instruction stream memory comprises randomized data. According to another embodiment of the present invention, the randomized data comprises randomized data formatted to appear like one or more valid instructions.

According to one embodiment of the present invention, a single dispatch table 3135 is used to determine the instruction implementation method 3140, regardless of the instruction permutation. According to another embodiment of the present invention, application program obfuscation includes both nonlinear execution of an obfuscated application program having application program instructions interleaved with application program data in an instruction stream, and transforming the application program into an application program having opcodes corresponding to one of multiple dispatch tables. According to another embodiment of the present invention, application program obfuscation includes both nonlinear execution of an obfuscated application program having application program instructions interleaved with application program data in an instruction stream, and transforming the application program into an application program having opcodes encoded based at least in part on an instruction counter value.

Figure 32:
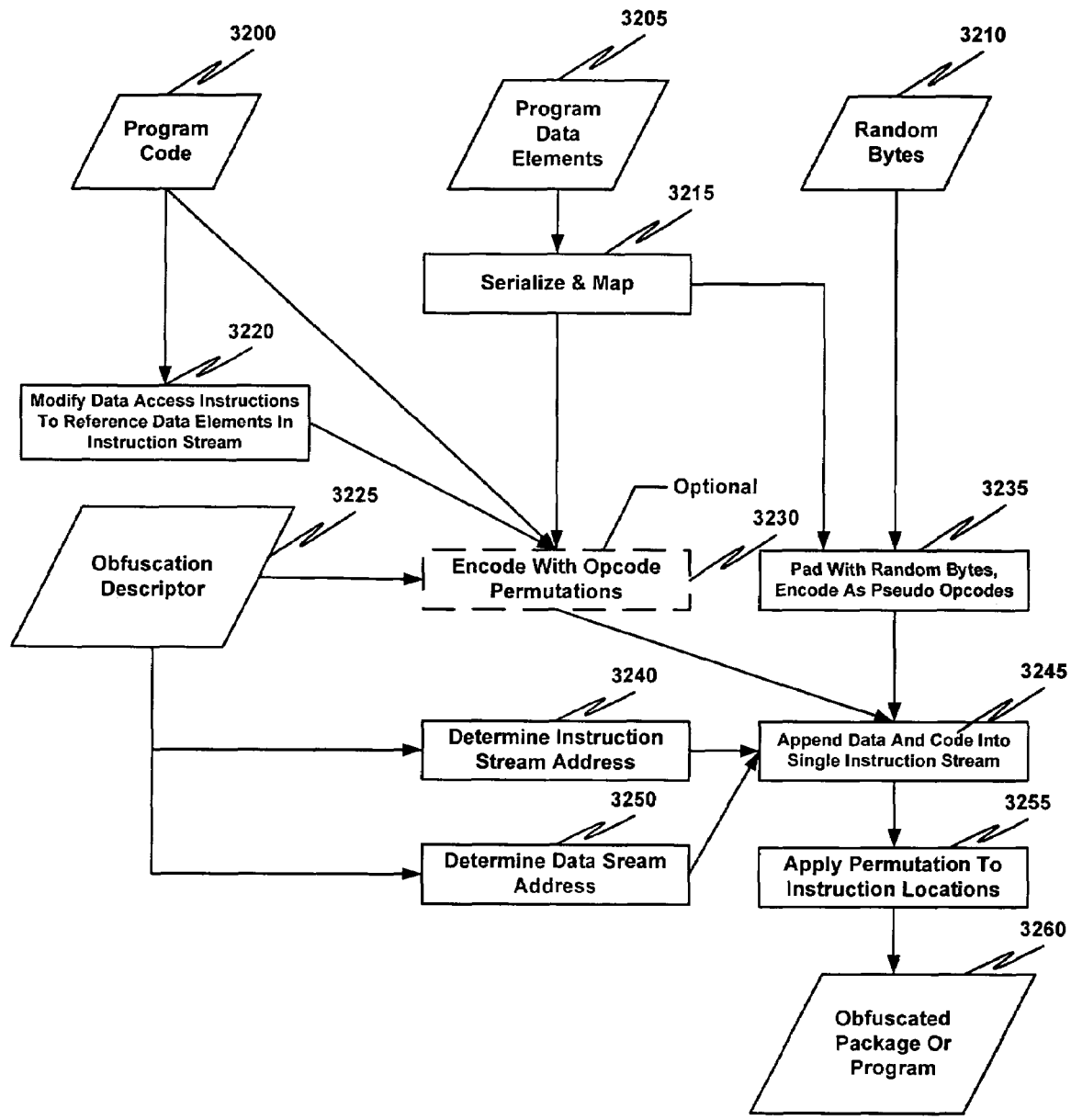
FIG. 32 is a high level flow diagram that illustrates a method for applying multiple application program obfuscation methods to create an obfuscated program in accordance with one embodiment of the present invention.

Turning now to FIG. 32, a high level flow diagram that illustrates a method for applying multiple application program obfuscation methods to create an obfuscated program in accordance with one embodiment of the present invention is presented. FIG. 32 illustrates applying one or more application program obfuscation methods, including opcode permutation, instruction location permutation, and interleaving code and data into a single instruction stream.

At 3215, program data elements 3205 are serialized and mapped to locations. According to one embodiment of the present invention, the program data elements 3205 are class static initialization values, ordered based on access order by a program, such that program data elements accessed by the program relatively early are placed relatively early in the map, and program data elements accessed relatively late are placed relatively late in the map. Ordering program data elements in this way optimizes the map by decreasing the amount of scanning required to locate program data elements in the map file.

At 3230, program code 3200 and serialized program data elements from process 3215 are optionally encoded with one or more opcode permutations. If data elements are interleaved in the instruction stream, the program code received at 3230 is first modified at 3220 so the data access instructions reference data elements in the instruction stream. The particular encoding method used at 3230 is determined by an obfuscation descriptor 3225. The obfuscation descriptor 3225 also determines an instruction stack address 3240 and a data stack address 3250. At 3235, the serialized program data elements are padded with one or more randomized bytes 3210 and encoded as pseudo opcodes. At 3245, the encoded code from 3230 and the encoded data from 3235 are appended into a single instruction stream. At 3255, an instruction location permutation is applied to one or more instruction locations to create an obfuscated package or program 3260.

Figure 33:
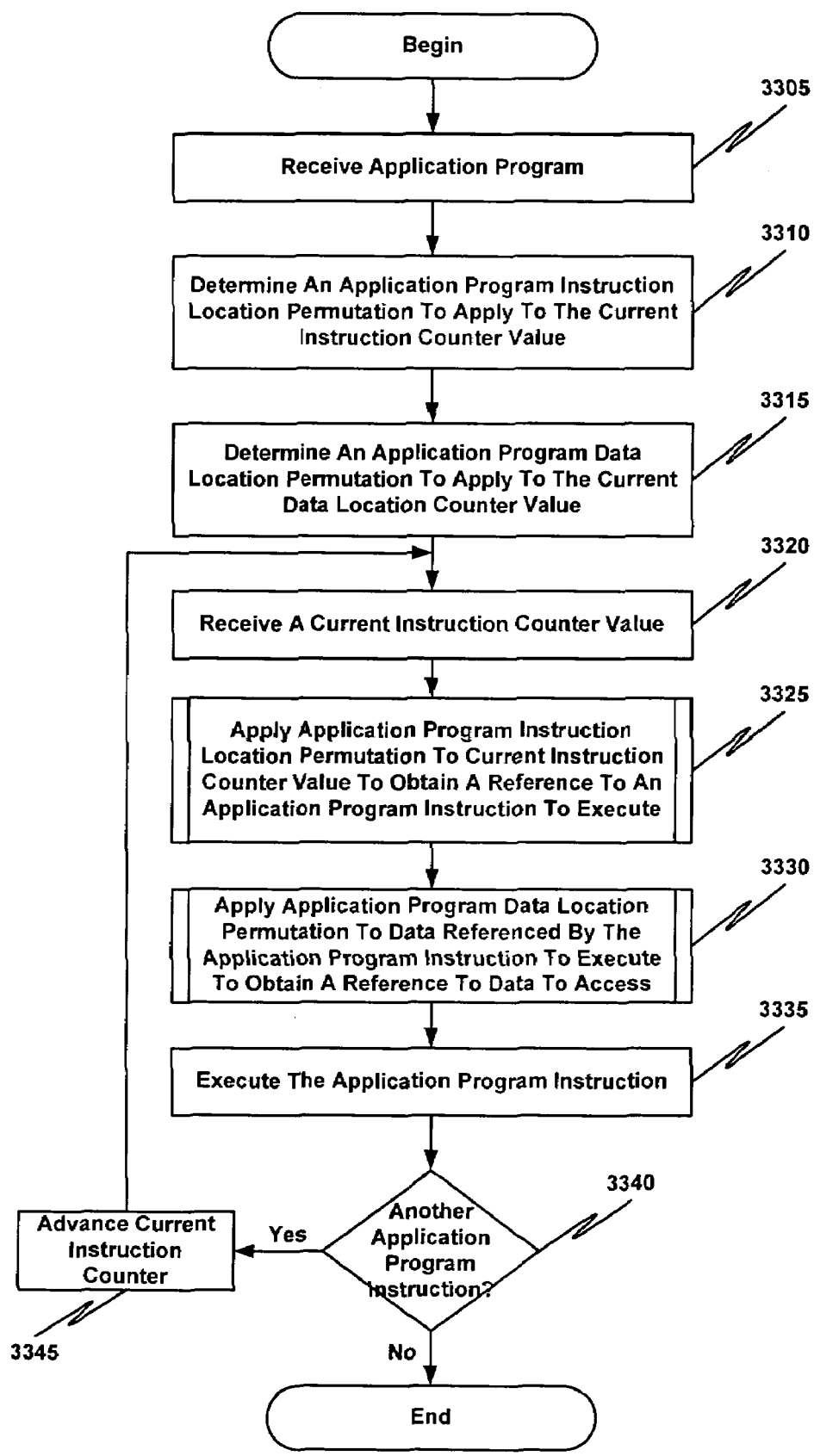
FIG. 33 is a flow diagram that illustrates a method for nonlinear execution of an obfuscated application program having application program instructions interleaved with application program data in an instruction stream in accordance with one embodiment of the present invention.

Turning now to FIG. 33, a flow diagram that illustrates a method for nonlinear execution of an obfuscated application program having application program instructions interleaved with application program data in an instruction stream in accordance with one embodiment of the present invention is presented. At 3305, an application program is received. At 3310, an application program instruction location permutation to apply to the current instruction counter value is determined. The application program instruction location permutation may also be determined based at least in part on any obfuscation descriptor included with the received application program. Alternatively, the application program instruction location permutation may be determined based at least in part on a configuration established at enrollment. At 3315, an application program data location permutation to apply to the current data location counter value is determined. The application program data location permutation may also be determined based at least in part on any obfuscation descriptor included with the received application program. Alternatively, the application program data location permutation may be determined based at least in part on a configuration established at enrollment. At 3320, a current instruction counter value is received. At 3325, the application program instruction location permutation is applied to the current instruction counter value to obtain a reference to an application program instruction to execute. At 3330, the application program data location permutation is applied to data referenced by the application program instruction to obtain a reference to data to access. At 3335, the next application program instruction is executed. At 3340, a determination is made regarding whether there is another application program instruction to execute. If there is another application program instruction to be executed, the current instruction counter is advanced at 3345 and the process continues at 3320.

According to one embodiment of the present invention, the application program data interleaved in the instruction stream comprises at least one cryptographic key for use in decrypting data protected by the program.

According to one embodiment of the present invention, the data within the interleaved instruction stream memory comprises data formatted to appear like one or more valid instructions. According to another embodiment of the present invention, the application program data interleaved in the instruction stream comprises randomized data. According to another embodiment of the present invention, the randomized data is formatted to appear like one or more valid instructions.

Figure 34:
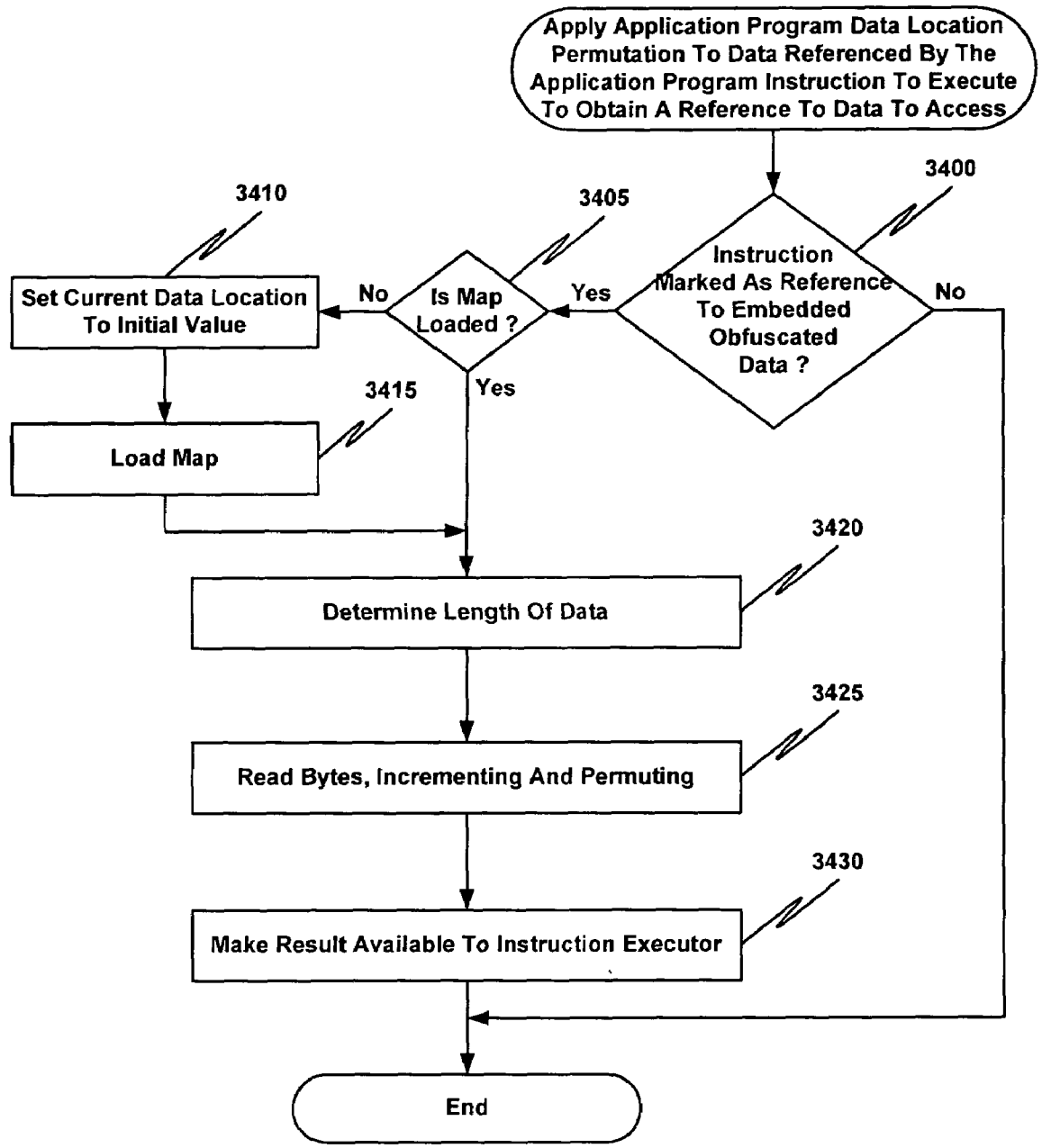
FIG. 34 is a flow diagram that illustrates a method for applying an application program data location permutation to data referenced by the next application program instruction to obtain a reference to data to access in accordance with one embodiment of the present invention.

Turning now to FIG. 34, a flow diagram that illustrates a method for applying an application program data location permutation to data referenced by the application program instruction to execute to obtain a reference to data to access in accordance with one embodiment of the present invention is presented. FIG. 34 provides more detail for reference numeral 3330 of FIG. 33. At 3400, a determination is made regarding whether the instruction to execute is marked as referencing embedded obfuscated data. If the instruction is marked as referencing embedded obfuscated data, at 3405 a determination is made regarding whether the program map is loaded. The program map indicates the address and length of program data values. If the map is not loaded, the current data location variable is initialized (3410) and the map is loaded (3415). At 3420, the program map is used to determine the length of the embedded obfuscated data. At 3425, the embedded obfuscated data is read, starting at the location indicated by the current data location variable. The current data location variable is then advanced and permuted according to a data location permutation. At 3430, the result of process 3425 is made available to the instruction executor.

Figure 35:
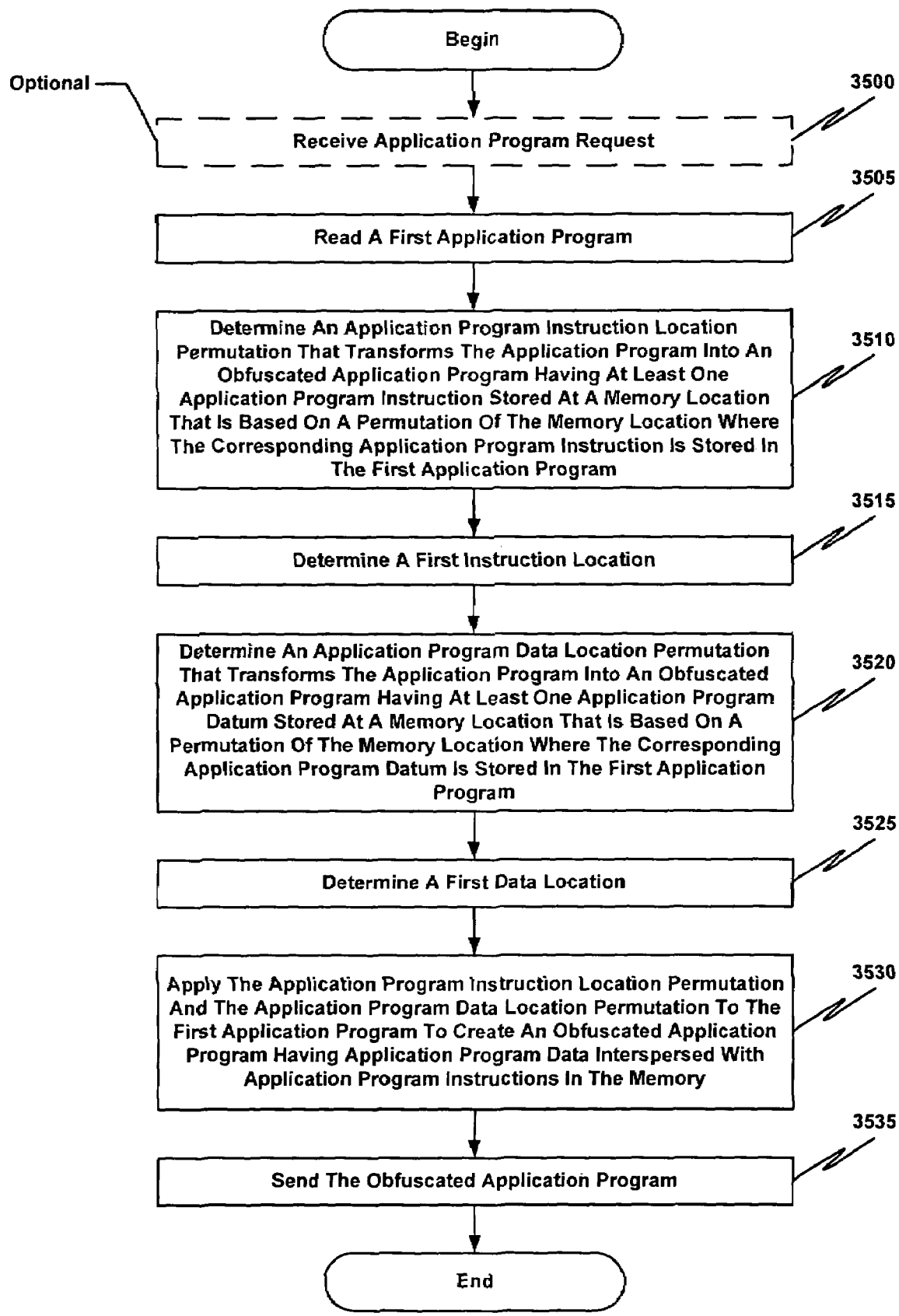
FIG. 35 is a flow diagram that illustrates a method for transforming a first application program into an obfuscated application program for nonlinear execution and having application program instructions interleaved with application program data in an instruction stream in accordance with one embodiment of the present invention.

Turning now to FIG. 35, a flow diagram that illustrates a method for transforming a first application program into an obfuscated application program for nonlinear execution and having application program instructions interleaved with application program data in an instruction stream in accordance with one embodiment of the present invention is presented. At 3500, an application program request is received.

At 3505, application program code corresponding to the request is read. At 3510, an application program instruction location permutation that transforms the first application program into an obfuscated application program having at least one application program instruction stored at a memory location that is based at least in part on a permutation of the memory location where the corresponding instruction is stored in the first application program is determined. At 3515, a first instruction location is determined. The first instruction location may comprise an offset into the first application program, indicating a starting point for transforming the first application program. At 3520, an application program data location permutation that transforms the first application program into an obfuscated application program having at least one application program datum stored at a memory location that is based at least in part on a permutation of the memory location where the corresponding application program datum is stored in the first application program is determined. At 3525, a first data location is determined. The first data location may comprise an offset into the first application program, indicating a starting point for transforming the first application program.

Still referring to FIG. 35, at 3530 the application program instruction location permutation and the application program data location permutations are applied to the first application program to create an obfuscated application program having application program data interspersed with application program instructions in the memory. According to one embodiment of the present invention, a cryptographic process is applied to the obfuscated application program together with a cryptographic key, to create an encrypted obfuscated application program. At 3535, the obfuscated application program is sent. According to one embodiment of the present invention, an application program provider performs processes 3505-3535 without receiving an application program request (3500). By way of example, the application program provider may provide a particular user device with an obfuscated application program at predetermined intervals.

FIGS. 36-39 illustrate a self-bootstrapping mechanism for sending a cryptographic key in accordance with embodiments of the present invention. An application program provider uses a program generator to create a decryption program that performs a decryption operation for a first cryptographic key upon execution. One or more application program obfuscation methods are applied to the decryption program, including scrambling an encrypted second cryptographic key in the instruction stream of the decryption program. The obfuscated decryption program is sent to a target device for execution. Execution of the decryption program results in the decryption of the second cryptographic key scrambled in the instruction stream. The second cryptographic key is used to access protected digital content. This is explained in more detail below.

Figure 36:
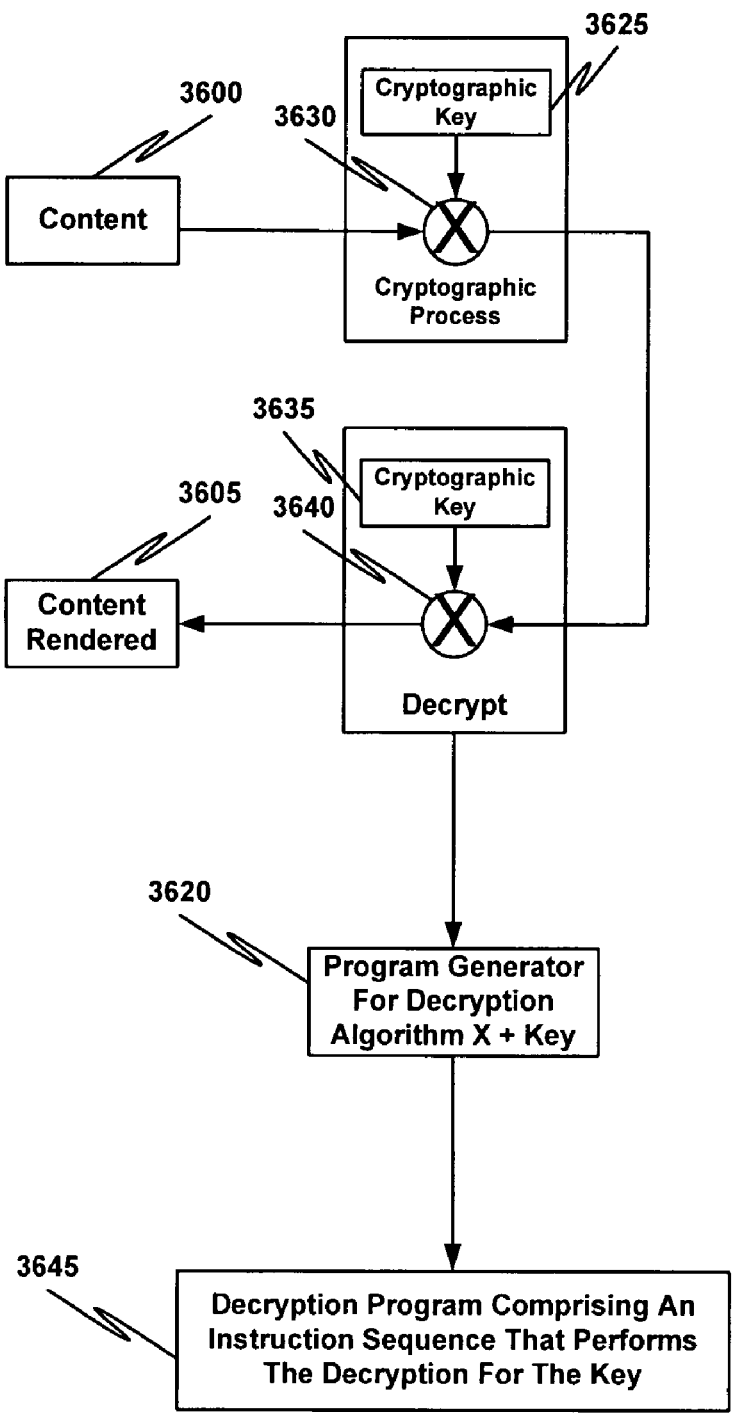
FIG. 36 is a block diagram that illustrates creating an application program generator configured to create an instruction stream that performs a decryption operation for a cryptographic key in accordance with one embodiment of the present invention.

Turning now to FIG. 36, a block diagram that illustrates creating an application program generator configured to create an instruction stream that performs a decryption operation for a cryptographic key in accordance with one embodiment of the present invention is presented. A cryptographic process (3630) is applied to digital content 3600 together with a cryptographic key 3625 to create encrypted digital content. The encrypted digital content may be decrypted (3640) using the cryptographic key 3635 to create rendered digital content 3605. According to embodiments of the present invention, the decryption algorithm 3640 and the cryptographic key 3635 are input to a program generator 3620 that creates a decryption program 3645 that performs the decryption algorithm 3640 for the cryptographic key 3635.

Figure 37:
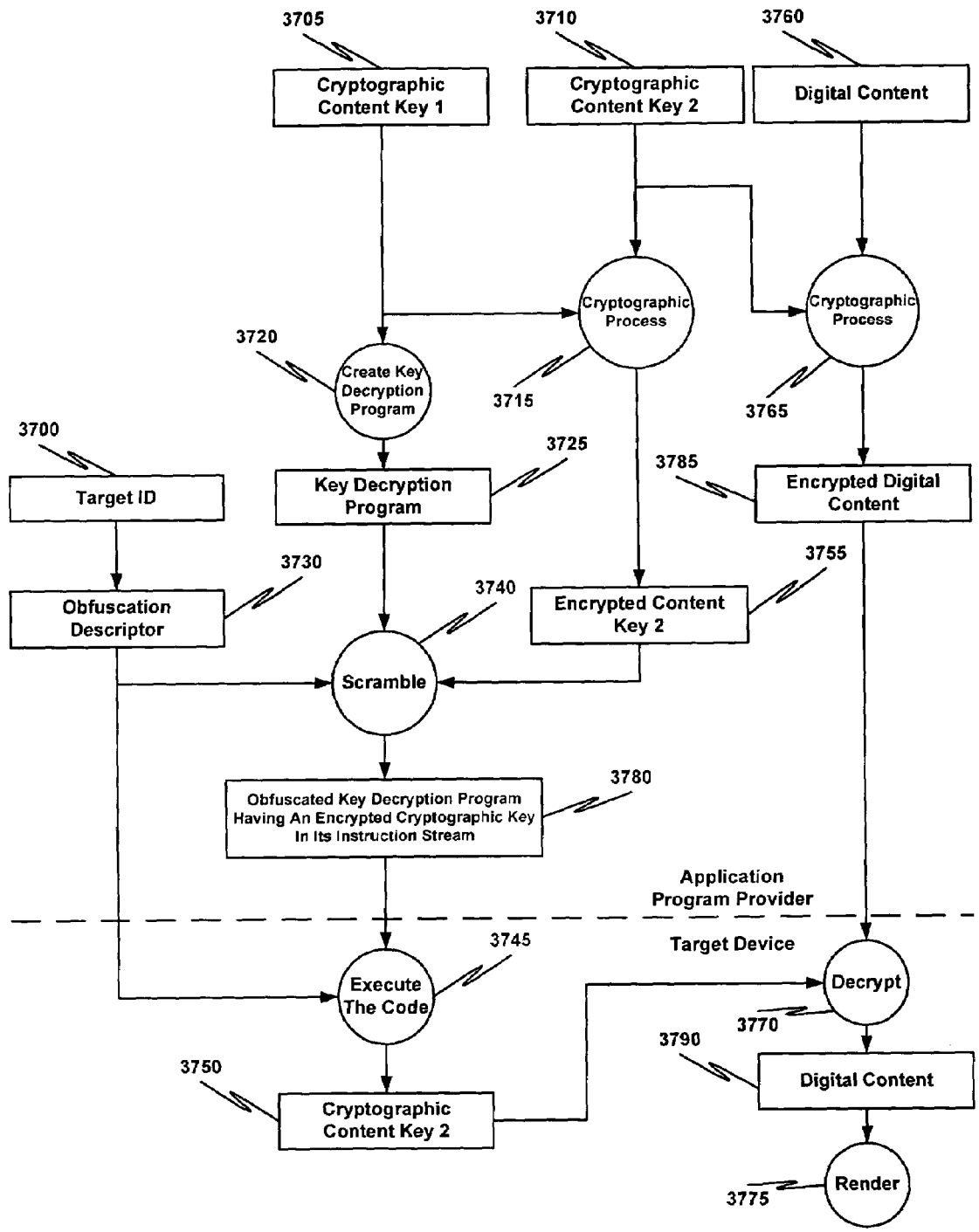
FIG. 37 is a data flow diagram that illustrates a self-bootstrapping mechanism for sending a cryptographic key in accordance with one embodiment of the present invention.

Turning now to FIG. 37, a data flow diagram that illustrates a self-bootstrapping mechanism for sending a cryptographic key in accordance with one embodiment of the present invention is presented. A first cryptographic content key 3705 is used to create a key decryption program 3725 and is used to protect a second cryptographic content key 3710. The second cryptographic content key 3710 is used to protect digital content 3760. According to one embodiment of the present invention, the first cryptographic content key 3705 and the second cryptographic content key 3710 are based at least in part on a target ID 3700. According to another embodiment of the present invention, the target ID 3700 comprises a VM ID. At 3720, an application program provider creates a key decryption program 3725 that performs a decryption algorithm for the first cryptographic content key 3705. At 3715, a cryptographic process is applied to the second cryptographic content key 3710 together with the first cryptographic content key 3705 to create an encrypted second content key 3755. At 3740, an application program obfuscation method is applied to the key decryption program 3725 together with the encrypted second cryptographic content key 3755 to create an obfuscated key decryption program having an encrypted cryptographic content key in its instruction stream 3780. The application program obfuscation method to apply is based at least in part on an obfuscation descriptor 3730, which is based at least in part on the target ID 3700. The application program provider then sends the obfuscated key decryption program 3780 to a target device. The application program provider applies a cryptographic process 3765 to digital content 3760 to create encrypted digital content 3785. The application provider then sends the encrypted digital content 3785 to the target device.

Still referring to FIG. 37, at 3745 the target device executes the obfuscated key decryption program to obtain a decrypted second cryptographic content key 3750. At 3770, the second cryptographic content key 3750 is used to decrypt the encrypted digital content 3785, producing digital content 3790. At 3775, the digital content 3790 is rendered to a user.

Figure 38:
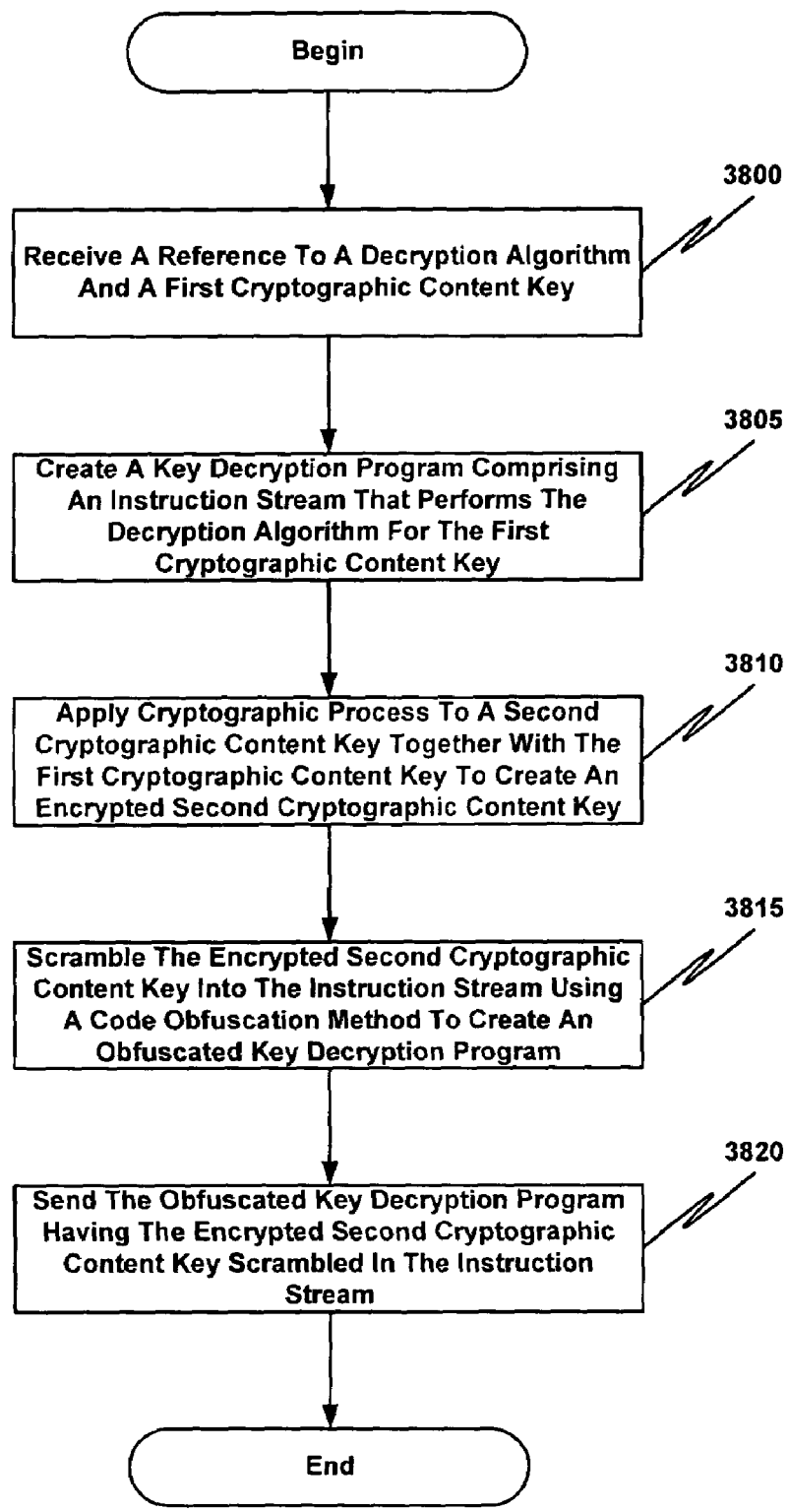
FIG. 38 is a flow diagram that illustrates a method for application program obfuscation from the perspective of an application program provider in accordance with one embodiment of the present invention.
Figure 39:
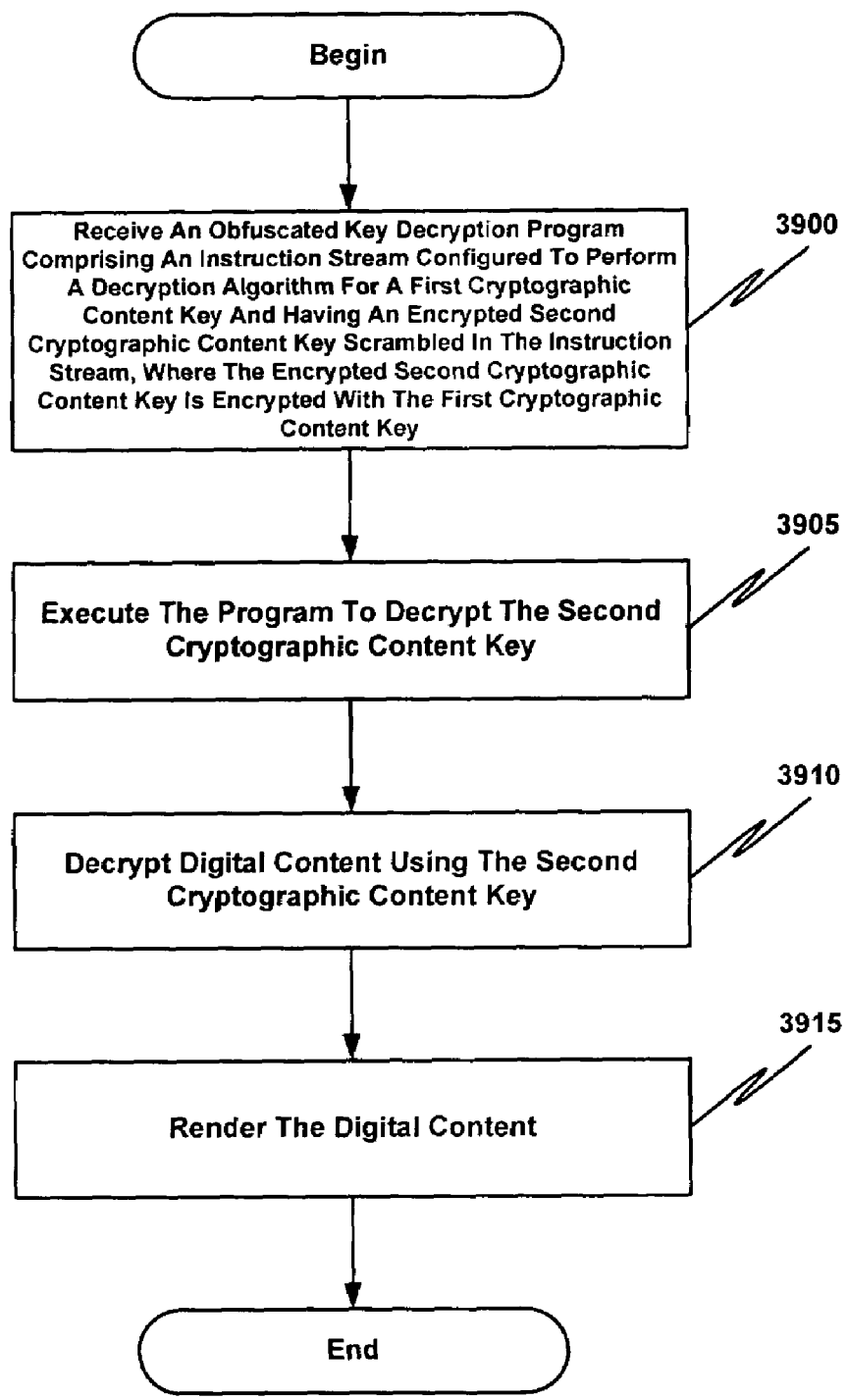
FIG. 39 is a flow diagram that illustrates a method for application program obfuscation from the perspective of a user device in accordance with one embodiment of the present invention.

FIGS. 38 and 39 provide more detail for FIG. 37. FIG. 38 provides more detail for the process used by an application program provider to create and send and obfuscated key decryption program, and FIG. 39 provides more detail for the process used by a target device to use the key decryption program to obtain a cryptographic content key for decrypting encrypted digital content.

Turning now to FIG. 38, a flow diagram that illustrates a method for application program obfuscation from the perspective of an application program provider in accordance with one embodiment of the present invention is presented. At 3800, a reference to a decryption algorithm and a first cryptographic content key are received. The decryption algorithm may be any decryption algorithm known in the art. At 3805, a key decryption program that performs the decryption algorithm for the first cryptographic content key is created. At 3810, a cryptographic process is applied to a second cryptographic content key together with the first cryptographic content key to create an encrypted second cryptographic content key. At 3815, the encrypted second cryptographic content key is scrambled into the instruction stream using a code obfuscation method to create an obfuscated key decryption program. The code obfuscation method may be indicated by an obfuscation descriptor. The second cryptographic content key may be scrambled into the instruction stream as was described above with reference to FIGS. 31-35. According to one embodiment of the present invention, a cryptographic process is applied to the obfuscated application program together with a cryptographic key, to create an encrypted obfuscated application program. At 3820, the obfuscated key decryption program having the encrypted second cryptographic content key scrambled in the instruction is sent to a target device. The obfuscated key decryption program may be sent together with digital content protected by the second cryptographic content key. Alternatively, the obfuscated key decryption program and the protected digital content may be sent separately.

Turning now to FIG. 39, a flow diagram that illustrates a method for application program obfuscation from the perspective of a user device in accordance with one embodiment of the present invention is presented. At 3900, an obfuscated key decryption program configured to perform a decryption algorithm for a first cryptographic content key and having an encrypted second cryptographic content key scrambled in the instruction stream is received. A cryptographic process is applied to the encrypted second cryptographic content key together with the first cryptographic content key. At 3905, the obfuscated key decryption program is executed to decrypt the second cryptographic content key. At 3910, digital content is decrypted using the second cryptographic content key. The digital content may comprise renderable data. By way of example, the digital content may comprise visual images, application program data, application program code, or both. Additionally, the digital content may comprise digital content obfuscated using any of the obfuscation methods described above. At 3915, the digital content is rendered.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for executing an obfuscated application program, the method comprising:

receiving an obfuscated application program, said obfuscated application program comprising at least one instruction opcode value encoded using one of a plurality of instruction set opcode value encoding schemes, wherein each of said instruction set opcode value encoding schemes includes an entry corresponding to said at least one instruction opcode value, each of said instruction opcode value encoding schemes is represented in a different dispatch table in a plurality of dispatch tables;

each dispatch table in said plurality of dispatch tables permutes instruction implementation methods in a same instruction set; and each of said instruction opcode value encoding schemes creates a different one-to-one mapping between a set of numbers and said instruction implementation methods in said same instruction set so that each of said instruction set opcode value encoding schemes uses a different opcode value encoding for said entry;

determining a dispatch table associated with said application program, said dispatch table corresponding to said one of a plurality of instruction set opcode value encoding schemes; and executing said application program using said associated dispatch table.

2. The method of claim 1 wherein said determining comprises generating said dispatch table in response to said receiving.

3. The method of claim 1 wherein said determining comprises selecting a dispatch table from said plurality of dispatch tables in response to said receiving, said plurality of dispatch tables stored in a memory.

4. A method for executing an obfuscated application program, the method comprising:

receiving an obfuscated application program, said obfuscated application program comprising at least one instruction opcode value encoded using one of a plurality of non-standard instruction set opcode value encoding schemes, wherein each of said non-standard instruction set opcode value encoding schemes include an entry corresponding to said at least one instruction opcode value, each of said non-standard instruction opcode value encoding schemes is represented in a different dispatch table in a plurality of dispatch tables;

each dispatch table in said plurality of dispatch tables permutes instruction implementation methods in a same instruction set; and each of said instruction opcode value encoding schemes creates a different one-to-one mapping between a set of numbers and said instruction implementation methods in said same instruction set so that each of said non-standard instruction set opcode value encoding schemes uses a different opcode value encoding for said entry;

determining an instruction set opcode value encoding scheme associated with said obfuscated application program;

rewriting said application program using a standard opcode value encoding scheme if said received application program is not encoded using said standard opcode value encoding scheme; and executing said application program using a dispatch table associated with said standard opcode value encoding scheme.

5. A method for application program obfuscation, the method comprising:

reading an application program comprising code;

transforming said application program code into transformed application program code that uses one of a plurality of opcode value encoding schemes of a dispatch table associated with said application program, wherein each of said instruction set opcode value encoding schemes includes an entry corresponding to at least one instruction opcode value, each of said instruction opcode value encoding schemes is represented in a different dispatch table in a plurality of dispatch tables;

each dispatch table in said plurality of dispatch tables permutes instruction implementation methods in a same instruction set; and each of said instruction opcode value encoding schemes creates a different one-to-one mapping between a set of numbers and said instruction implementation methods in said same instruction set so that each of said instruction set opcode value encoding schemes uses a different opcode value encoding for said entry; and sending said transformed application program code.

6. The method of claim 5, further comprising receiving an application program request from a user device, said transforming occurring in response to said receiving.

7. The method of claim 5 wherein
said method further comprises, after said creating, applying a cryptographic process to said obfuscated application program together with a cryptographic key to create an encrypted obfuscated application program; and
said sending comprises sending said encrypted obfuscated application program.

8. A program storage device readable by a machine, embodying a program of instructions executable by the machine to perform a method for executing an obfuscated application program, the method comprising:
receiving an obfuscated application program, said obfuscated application program comprising at least one instruction opcode value encoded using one of a plurality of instruction set opcode value encoding schemes,
wherein each of said instruction set opcode value encoding schemes includes an entry corresponding to said at least one instruction opcode value,
each of said instruction opcode value encoding schemes is represented in a different dispatch table in a plurality of dispatch tables;
each dispatch table in said plurality of dispatch tables permutes instruction implementation methods in a same instruction set; and
each of said instruction opcode value encoding schemes creates a different one-to-one mapping between a set of numbers and said instruction implementation methods in said same instruction set so that each of said instruction set opcode value encoding schemes uses a different opcode value encoding for said entry;
determining a dispatch table associated with said application program, said dispatch table corresponding to said one of a plurality of instruction set opcode value encoding schemes; and
executing said application program using said associated dispatch table.

9. The program storage device of claim 8 wherein said determining comprises generating said dispatch table in response to said receiving.

10. The program storage device of claim 8 wherein said determining comprises selecting a dispatch table from said plurality of dispatch tables in response to said receiving, said plurality of dispatch tables stored in a memory.

11. A program storage device readable by a machine, embodying a program of instructions executable by the machine to perform a method for executing an obfuscated application program, the method comprising:
receiving an obfuscated application program, said obfuscated application program comprising at least one instruction opcode value encoded using one of a plurality of non-standard instruction set opcode value encoding schemes,
wherein each of said non-standard instruction set opcode value encoding schemes include an entry corresponding to said at least one instruction opcode value,
each of said non-standard instruction opcode value encoding schemes is represented in a different dispatch table in a plurality of dispatch tables;
each dispatch table in said plurality of dispatch tables permutes instruction implementation methods in a same instruction set; and
each of said instruction opcode value encoding schemes creates a different one-to-one mapping between a set of numbers and said instruction implementation methods in said same instruction set so that each of said non-standard instruction set opcode value encoding schemes uses a different opcode value encoding for said entry;
determining an instruction set opcode value encoding scheme associated with said obfuscated application program;
rewriting said application program using a standard opcode value encoding scheme if said received application program is not encoded using said standard opcode value encoding scheme; and
executing said application program using a dispatch table associated with said standard opcode value encoding scheme.

12. A program storage device readable by a machine, embodying a program of instructions executable by the machine to perform a method for application program obfuscation, the method comprising:
reading an application program comprising code;
transforming said application program code into transformed application program code that uses one of a plurality of opcode value encoding schemes of a dispatch table associated with said application program,
wherein each of said instruction set opcode value encoding schemes includes an entry corresponding to at least one instruction opcode value,
each of said instruction opcode value encoding schemes is represented in a different dispatch table in a plurality of dispatch tables;
each dispatch table in said plurality of dispatch tables permutes instruction implementation methods in a same instruction set; and
each of said instruction opcode value encoding schemes creates a different one-to-one mapping between a set of numbers and said instruction implementation methods in said same instruction set so that each of said instruction set opcode value encoding schemes uses a different opcode value encoding for said entry; and
sending said transformed application program code.

13. The program storage device of claim 12, the method further comprising receiving an application program request from a user device, said transforming occurring in response to said receiving.

14. The program storage device of claim 12 wherein
said method further comprises, after said creating, applying a cryptographic process to said obfuscated application program together with a cryptographic key to create an encrypted obfuscated application program; and
said sending comprises sending said encrypted obfuscated application program.

15. An apparatus for executing an obfuscated application program, the apparatus comprising:
a processor; and
a memory, coupled to said processor, having stored therein computer readable instructions wherein executing said computer readable instructions on said processor provides:
means for receiving an obfuscated application program, said obfuscated application program comprising at least one instruction opcode value encoded using one of a plurality of instruction set opcode value encoding schemes,
wherein each of said instruction set opcode value encoding schemes includes an entry corresponding to said at least one instruction opcode value, each of said instruction opcode value encoding schemes is represented in a different dispatch table in a plurality of dispatch tables;

each dispatch table in said plurality of dispatch tables permutes instruction implementation methods in a same instruction set; and each of said instruction opcode value encoding schemes creates a different one-to-one mapping between a set of numbers and said instruction implementation methods in said same instruction set so that each of said instruction set opcode value encoding schemes uses a different opcode value encoding for said entry;

means for determining a dispatch table associated with said application program, said dispatch table corresponding to said one of a plurality of instruction set opcode value encoding schemes; and means for executing said application program using said associated dispatch table.

16. The apparatus of claim 15 wherein said means for determining comprises means for generating said dispatch table in response to said receiving.

17. The apparatus of claim 15 wherein said means for determining comprises means for selecting a dispatch table from said plurality of dispatch tables in response to said receiving, said plurality of dispatch tables stored in a memory.

18. An apparatus for executing an obfuscated application program, the apparatus comprising:

a processor; and a memory, coupled to said processor, having stored therein computer readable instructions wherein executing said computer readable instructions on said processor provides:

means for receiving an obfuscated application program, said obfuscated application program comprising at least one instruction opcode value encoded using one of a plurality of non-standard instruction set opcode value encoding schemes, wherein each of said non-standard instructions set opcode value encoding schemes include an entry corresponding to said at least one instruction opcode value, each of said non-standard instruction opcode value encoding schemes is represented in a different dispatch table in a plurality of dispatch tables;

each dispatch table in said plurality of dispatch tables permutes instruction implementation methods in a same instruction set; and each of said instruction opcode value encoding schemes creates a different one-to-one mapping between a set of numbers and said instruction implementation methods in said same instruction set so that each of said non-standard instruction set opcode value encoding schemes uses a different opcode value encoding for said entry;

means for determining an instruction set opcode value encoding scheme associated with said obfuscated application program;

means for rewriting said application program using a standard opcode value encoding scheme if said received application program is not encoded using said standard opcode value encoding scheme; and means for executing said application program using a dispatch table associated with said standard opcode value encoding scheme.

19. An apparatus for application program obfuscation, the apparatus comprising:

a processor; and a memory, coupled to said processor, having stored therein computer readable instructions wherein executing said computer readable instructions on said processor provides:

means for reading an application program comprising code;

means for transforming said application program code into transformed application program code that uses one of a plurality of opcode value encoding schemes of a dispatch table associated with said application program, wherein each of said instruction set opcode value encoding schemes includes an entry corresponding to at least one instruction opcode value, each of said instruction opcode value encoding schemes is represented in a different dispatch table in a plurality of dispatch tables;

each dispatch table in said plurality of dispatch tables permutes instruction implementation methods in a same instruction set; and each of said instruction opcode value encoding schemes creates a different one-to-one mapping between a set of numbers and said instruction implementation methods in said same instruction set so that each of said instruction set opcode value encoding schemes uses a different opcode value encoding for said entry; and means for sending said transformed application program code.

20. The apparatus of claim 19, further comprising means for receiving an application program request from a user device, said transforming occurring in response to said receiving.

21. The apparatus of claim 19 wherein said apparatus further comprises means for applying a cryptographic process to said obfuscated application program together with a cryptographic key to create an encrypted obfuscated application program after said creating; and said means for sending comprises means for sending said encrypted obfuscated application program.

22. An apparatus for executing an obfuscated application program, the apparatus comprising a user device configured to:

receive an obfuscated application program, said obfuscated application program comprising at least one instruction opcode value encoded using one of a plurality of instruction set opcode value encoding schemes, wherein each of said instruction set opcode value encoding schemes includes an entry corresponding to said at least one instruction opcode value, each of said instruction opcode value encoding schemes is represented in a different dispatch table in a plurality of dispatch tables;

each dispatch table in said plurality of dispatch tables permutes instruction implementation methods in a same instruction set; and each of said instruction opcode value encoding schemes creates a different one-to-one mapping between a set of numbers and said instruction implementation methods in said same instruction set so that each of said instruction set opcode value encoding schemes uses a different opcode value encoding for said entry;

determine a dispatch table associated with said application program, said dispatch table corresponding to said one of a plurality of instruction set opcode value encoding schemes; and execute said application program using said associated dispatch table.

23. The apparatus of claim 22 wherein said user device is further configured to generate said dispatch table in response to said receiving.

24. The apparatus of claim 22 wherein user device is further configured to select a dispatch table from a plurality of dispatch tables in response to said receiving, said plurality of dispatch tables stored in a memory.

25. An apparatus for executing an obfuscated application program, the apparatus comprising a user device configured to:

receive an obfuscated application program, said obfuscated application program comprising at least one instruction opcode value encoded using one of a plurality of non-standard instruction set opcode value encoding schemes, wherein each of said non-standard instruction set opcode value encoding schemes include an entry corresponding to said at least one instruction opcode value, each of said non-standard instruction opcode value encoding schemes is represented in a different dispatch table in a plurality of dispatch tables;

each dispatch table in said plurality of dispatch tables permutes instruction implementation methods in a same instruction set; and each of said instruction opcode value encoding schemes creates a different one-to-one mapping between a set of numbers and said instruction implementation methods in said same instruction set so that each of said non-standard instruction set opcode value encoding schemes uses a different opcode value encoding for said entry;

determine an instruction set opcode value encoding scheme associated with said obfuscated application program;

rewrite said application program using a standard opcode value encoding scheme if said received application program is not encoded using said standard opcode value encoding scheme; and execute said application program using a dispatch table associated with said standard opcode value encoding scheme.

26. An apparatus for application program obfuscation, the apparatus comprising an application program provider configured to:

read an application program comprising code;

transform said application program code into transformed application program code that uses one of a plurality of opcode value encoding schemes of a dispatch table associated with said application program, wherein each of said instruction set opcode value encoding schemes includes an entry corresponding to at least one instruction opcode value, each of said instruction opcode value encoding schemes is represented in a different dispatch table in a plurality of dispatch tables;

each dispatch table in said plurality of dispatch tables permutes instruction implementation methods in a same instruction set; and each of said instruction opcode value encoding schemes creates a different one-to-one mapping between a set of numbers and said instruction implementation methods in said same instruction set so that each of said instruction set opcode value encoding schemes uses a different opcode value encoding for said entry; and send said transformed application program code.

27. The apparatus of claim 26, said application program provider further configured to receive an application program request from a user device, said transforming responsive to said receiving.

28. The apparatus of claim 26 wherein said application program provider is further configured to apply a cryptographic process to said obfuscated application program together with a cryptographic key to create an encrypted obfuscated application program after said creating; and said application program provider is further configured to send said encrypted obfuscated application program.

* * * * *